United States Patent
Tanibuchi et al.

(10) Patent No.: US 9,931,569 B2
(45) Date of Patent: Apr. 3, 2018

(54) GAME MANAGEMENT DEVICE, GAME SYSTEM, AND COMPUTER-READABLE STORAGE MEDIUM HAVING PROGRAM RECORDED THEREON

(71) Applicant: KONAMI DIGITAL ENTERTAINMENT CO., LTD., Tokyo (JP)

(72) Inventors: Hiroshi Tanibuchi, Tokyo (JP); Toyomu Okishio, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 657 days.

(21) Appl. No.: 14/561,516

(22) Filed: Dec. 5, 2014

(65) Prior Publication Data
US 2015/0080130 A1 Mar. 19, 2015

Related U.S. Application Data

(63) Continuation of application No. PCT/JP2013/060393, filed on Apr. 4, 2013.

(30) Foreign Application Priority Data

Jun. 20, 2012 (JP) .............................. 2012-139229

(51) Int. Cl.
*A63F 13/12* (2006.01)
*A63F 13/65* (2014.01)

(52) U.S. Cl.
CPC ........ *A63F 13/65* (2014.09); *A63F 2300/638* (2013.01); *A63F 2300/65* (2013.01); *A63F 2300/69* (2013.01)

(58) Field of Classification Search
CPC ....................................................... A63F 13/12
See application file for complete search history.

(56) References Cited

U.S. PATENT DOCUMENTS

| 6,394,895 | B1 | 5/2002 | Mino |
| 2008/0274815 | A1 | 11/2008 | Root |

(Continued)

FOREIGN PATENT DOCUMENTS

| JP | 2000-308757 A | 11/2000 |
| JP | 2001-137556 A | 5/2001 |

(Continued)

OTHER PUBLICATIONS

International Search Report dated Jul. 9, 2013 issued in correspondig application No. PCT/JP2013/060393.

*Primary Examiner* — Omkar Deodhar
(74) *Attorney, Agent, or Firm* — Westerman, Hattori, Daniels & Adrian, LLP

(57) ABSTRACT

A game management device includes an automatically setting unit that automatically sets an automatic setting point to the registered character that produces a prescribed game result when an operation of selecting a prescribed number of characters from the characters owned by the user is performed by a prescribed time limit and a game, in which the registered character is applied, is performed by a prescribed time limit, on a basis of a result of executing the game; a real event accepting unit that accepts an information on a real event produced by the existent object after the prescribed time limit; and a game information change unit that changes a user's game information on a basis of the automatic setting point set to the registered character when it is determined that the existent object corresponding to the registered character produced a prescribed real event based on the information on the real event accepted by the real event accepting unit.

11 Claims, 62 Drawing Sheets

(56) References Cited

U.S. PATENT DOCUMENTS

2010/0035672 A1    2/2010  Root
2011/0183735 A1    7/2011  Root

FOREIGN PATENT DOCUMENTS

| | | |
|---|---|---|
| JP | 2002-28375 A | 1/2002 |
| JP | 2002-102543 A | 4/2002 |
| JP | 2003-19357 A | 1/2003 |
| JP | 2008-113808 A | 5/2008 |
| WO | 2011/019392 A1 | 2/2011 |

FIG. 5

| PL ID | EXTENT PLAYER ||| PLAYER CHARACTER |||||||
| | NAME | BACK NO. | POS | TEAM | INDIVIDUAL ABILITY ||| COST | COND. | RESULT ||
| | | | | | B | R | F | | | BA | RBI | HR |
|---|---|---|---|---|---|---|---|---|---|---|---|---|
| 0001 | A | 54 | 3rd | Y | 72 | 73 | 81 | 35 | 3 | 297 | 48 | 6 |
| 0002 | B | 12 | 1st | M | 63 | 65 | 73 | 21 | 2 | 253 | 26 | 3 |
| 0003 | C | 25 | OF | R | 81 | 63 | 62 | 48 | 4 | 325 | 57 | 22 |
| 0004 | D | 33 | C | Y | 85 | 60 | 59 | 53 | 5 | 312 | 68 | 36 |
| ... | | | | | | | | | | | | |

FIRST RELATIONSHIP INFO.

FIG. 7

| USER ID | 0 0 0 0 0 1 | | | |
|---|---|---|---|---|
| USER INFO. | LOG-IN ID | PASSWORD | USER NAME | TEAM |
|  | x x x x | x x x x | x x x x | x x x x |
| LEVEL INFO. | USER LEVEL | | AFILIATED BLOCK RANKING | |
|  | Lv. 14 | | 3 | |
| PL. CHAR. | PLAYER ID | | ABILITY LANK | |
|  | 0001 | | 4 | |
|  | 0007 | | 1 | |
|  | 0015 | | 3 | |
|  | 0028 | | 2 | |
|  | 0041 | | 5 | |
|  | ⋮ | | | |
| POINT | EX/V | R/P | | P/P |
|  | 350 | 3420 | | 108 |
|  | ACTION POINT | | TOTAL COST | |
|  | PRESENT | MAX. | PRESNET | MAX |
|  | 34 | 50 | 324 | 350 |
| COIN | 2000 | | | |
| ITEM | RECOVERY ITEM | | COATING | |
|  | 10 | | 3 | |
| GAME RESULT | MATCH ID | | | |
|  | 5641 | | | |
|  | 6132 | | | |
|  | ⋮ | | | |

FIG. 10

| FELLOW USER INFO.ID | USER ID REQUESTING FELLOW USER | APPROVED USER ID |
|---|---|---|
| 1 | 000001 | 000002 |
| 2 | 000001 | 000005 |
| 3 | 000001 | 000035 |
| 4 | 000002 | 000032 |
| 5 | 000002 | 000038 |
| 6 | 000012 | 000001 |
| 7 | 000007 | 000021 |
| 8 | 000018 | 000034 |
| 9 | 000025 | 000003 |
| 10 | 000031 | 000006 |
| ⋮ | ⋮ | ⋮ |

FIG. 11A

| USER ID | 000001 |
|---|---|
| FELLOW USER LIMIT | 12 |
| FELLOW USER ID | 000005, 000110, 000012, 000035, 000010, 000352, 000230, 000163, 000321, 000212 |
| USER ID OF USERS WITH PENDING FELLOW USER REQUEST | 000002 |
| USER ID OF USERS WHO HAVE NOT APPROVED FELLOW USER REQUEST | |

FIG. 11B

| USER ID | 000001 |
|---|---|
| FELLOW USER LIMIT | 12 |
| FELLOW USER ID | 000005, 000110, 000012, 000035, 000010, 000352, 000230, 000163, 000321, 000212, 000002 |
| USER ID OF USERS WITH PENDING FELLOW USER REQUEST | |
| USER ID OF USERS WHO HAVE NOT APPROVED FELLOW USER REQUEST | |

FIG. 12A

| USER ID | 000002 |
|---|---|
| FELLOW USER LIMIT | 12 |
| FELLOW USER ID | 000038, 000145, 000052, 000032, 000248, 000205, 000331, 000316, 000130, 000087 |
| USER ID OF USERS WITH PENDING FELLOW USER REQUEST | |
| USER ID OF USERS WHO HAVE NOT APPROVED FELLOW USER REQUEST | 000001 |

FIG. 12B

| USER ID | 000002 |
|---|---|
| FELLOW USER LIMIT | 12 |
| FELLOW USER ID | 000038, 000145, 000052, 000032, 000248, 000205, 000331, 000316, 000130, 000087, 000001 |
| USER ID OF USERS WITH PENDING FELLOW USER REQUEST | |
| USER ID OF USERS WHO HAVE NOT APPROVED FELLOW USER REQUEST | |

FIG. 15

ROSTER

| | | | | | | |
|---|---|---|---|---|---|---|
| 1 | C | | PLAYER A 391870 ☺ ✦ | | | |
| 2 | 1B | | PLAYER B 16053 ☺ ☆ | | | |
| 3 | 2B | | PLAYER C 526033 ☺ ✦ | | | |
| 4 | 3B | | PLAYER D 25683 ☺ ☆ | | | |
| 5 | SS | | PLAYER E 753 ☺ ☆ | | | |
| 6 | OF | | PLAYER F 8900031 ☺ ✦ | | | |
| 7 | OF | | PLAYER G 65847 ☺ ☆ | | | |
| 8 | OF | | PLAYER H 548004 ☺ ☆ | | | |
| 9 | DH | | PLAYER I 1023587 ☺ ☆ | | | |

| | SP | | PLAYER J 3658 ☺ ☆ |
| | SP | | PLAYER K 57012 ☺ ☆ |
| | RP | | PLAYER L 935 ☺ ☆ |
| | RP | | PLAYER M 685771 ☺ ☆ |
| | P | | PLAYER N 25683 ☺ ☆ |
| | P | | PLAYER O 992 ☺ ☆ |
| | P | | PLAYER P 2510238 ☺ ☆ |

121a  121b  121c  121d

USER A

LEVEL 14
A/F    34/50
T/C    324/350
No./P  38/40
R/P    3420
P/P    267
F/U    6/12

AUTO. SETTING

P/P
108

Total invest  85

5 hr. and 43 min. BEFORE TIME LIMIT 81, 121, 135, 131, 134, 132, 133, 136, 86

FIG. 16

| July 5, 2012 MLB ||||
|---|---|---|---|
| USER ID || 000001 ||
| ROSTER NO. | POS. | PL. ID | PREDICTION POINT |
| 1 | C | 0057 | 15 |
| 2 | 1B | 0076 | 1 |
| 3 | 2B | 0035 | 10 |
| 4 | 3B | 0001 | 1 |
| 5 | SS | 0093 | 1 |
| 6 | OF | 0153 | 15 |
| 7 | OF | 0225 | 1 |
| 8 | OF | 0088 | 1 |
| 9 | DH | 0315 | 5 |
| 10 | P | 0509 | 1 |
| ⋮ | | | |

FIG. 17

| SECOND RELATIONSHIP INFO. | | | |
|---|---|---|---|
| CATEGORY | EVENT ID | REAL EVENT | E/V |
| F | 01 | 1B | 1 P |
| | 02 | 2B | 2 P |
| | 03 | 3B | 3 P |
| | 04 | HR | 4 P |
| | 05 | RBI (/RUN) | 1 P |
| | 06 | SB | 1 P |
| | ⋮ | | |
| P | 31 | K | 0. 5 P |
| | 32 | NO RUN/INNING | 0. 5 P |
| | ⋮ | | |

FIG. 22

| July 5, 2012 MLB | | | |
|---|---|---|---|
| PL. ID | EVENT ID | REAL EVENT | E/V |
| 0005 | 01 | 1B | 1 P |
| 0153 | 01 | 1B | 1 P |
| 0548 | 31 | K | 0.5 P |
| 0265 | 02 | 2B | 2 P |
| 0548 | 31 | K | 0.5 P |
| 0076 | 04 | HR | 4 P |
| 0076 | 05 | 1RBI | 1 P |
| 0467 | 01 | 1B | 1 P |
| 0467 | 06 | SB | 1 P |
|  | ⋮ |  |  |

FIG. 29

| SECOND RELATIONSHIP INFO. | | | |
|---|---|---|---|
| CATEGORY | EVENT ID | REAL EVENT | EVALUATION VALUE |
| F | 01 | 1B | +1 P |
| | 02 | 2B | +2 P |
| | 03 | 3B | +3 P |
| | 04 | HR | +4 P |
| | 05 | RBI(/RUN) | +1 P |
| | 06 | SB | +1 P |
| | 07 | GET K | −1 P |
| | 08 | GDP | −1 P |
| | 09 | FIELDING ERROR | −1 P |
| | ⋮ | | |
| P | 31 | K | +0.5 P |
| | 32 | NO RUN/INNING | +0.5 P |
| | 33 | HR ALLOWED | −1 P |
| | ⋮ | | |

FIG. 33

| July 5, 2012 MLB ||
|---|---|
| USER ID | 0 0 0 0 0 1 |
| FELLOW USER ID | PREDICTION POINT |
| 000002 | 8 |
| 000005 | 10 |
| 000010 | 1 |
| 000012 | 0 |
| 000035 | 0 |
| 000110 | 0 |
| 000163 | 15 |
| ⋮ | |

FIG. 34

| FELLOW USER INFO. ID | USER ID | USER ID | INTIMACY | PREDICTION POINT LIMIT |
|---|---|---|---|---|
| 1 | 000001 | 000002 | 18 | 10 |
| 2 | 000001 | 000005 | 28 | 15 |
| 3 | 000001 | 000035 | 6 | 5 |
| 4 | 000002 | 000032 | 33 | 20 |
| 5 | 000002 | 000038 | 58 | 30 |
| 6 | 000012 | 000001 | 42 | 25 |
| ⋮ | | | | |

FIG. 38

| ACTIVITY DETERMINATION INFO. | | |
|---|---|---|
| CATEGORY | EVENT ID | REAL EVENT |
| F | 01 | 1B |
| | 02 | 2B |
| | 03 | 3B |
| | 04 | HR |
| | 05 | RBI |
| | 06 | SB |
| | ⋮ | |
| P | 31 | K |
| | 41 | W |
| | 42 | SV |
| | ⋮ | |

FIG. 47

| ACTIVITY LEVEL | SECOND RELATIONSHIP INFO. (FIELDER) | |
|---|---|---|
| | REAL EVENT (ACTIVITY CONTENT) | E/V (B/P) |
| 1 | H, SB, BB | 15 |
| 2 | 2H, 2B, 2RBI | 30 |
| 3 | 3H OR MORE, 2RBI, 3B, HR | 60 |
| 4 | 2 OR MORE HR, RB 3I, WINNING RBI | 120 |
| 5 | 4 OR MORE RBI, CYCLE | 240 |

FIG. 48

| SECOND RELATIONSHIP INFO. (STARTING PITCHER) | | |
|---|---|---|
| A/L | REAL EVENT (ACTIVITY CONTENT) | E/V (B/P) |
| 1 | K | 15 |
| 2 | K ≧ 9 | 30 |
| 3 | WIN | 60 |
| 4 | ERA < 3.00 AND WIN | 120 |
| 5 | ERA < 2.00 AND WIN | 240 |

FIG. 49

| SECOND RELATIONSHIP INFO. (RELIEF PITCHER) | | |
|---|---|---|
| A/L | REAL EVENT (ACTIVITY CONTENT) | E/V (B/P) |
| 1 | K | 15 |
| 2 | INNING PITCHED > 1 AND WHIP ≦ 1.00 | 30 |
| 3 | SV | 60 |
| 4 | INNING PITCHED > 1 AND SV WITH WHIP 0.00 | 120 |

FIG. 50

| USER ID | | | 000001 | | | | | |
|---|---|---|---|---|---|---|---|---|
| ROSTER NO. | POS | T | P/ID | COST | E/V (B/P) | P/P | O/P | C/P |
| 1 | C | 1 | 0057 | 20 | 60 | 15 | 900 | 3.0 |
| 2 | 1B | 3 | 0076 | 10 | 15 | 1 | 15 | 1.5 |
| 3 | 2B | 25 | 0035 | 15 | 15 | 10 | 150 | 1.0 |
| 4 | 3B | 18 | 0001 | 12 | 60 | 1 | 60 | 5.0 |
| 5 | SS | 5 | 0093 | 15 | 240 | 1 | 240 | 16.0 |
| 6 | OF | 7 | 0153 | 10 | 0 | 15 | 0 | 0.0 |
| 7 | OF | 30 | 0225 | 5 | 15 | 1 | 15 | 3.0 |
| 8 | OF | 27 | 0088 | 5 | 15 | 1 | 15 | 3.0 |
| 9 | DH | 16 | 0315 | 9 | 0 | 5 | 0 | 0.0 |
| 10 | SP | 1 | 0509 | 12 | 30 | 1 | 30 | 2.5 |
| 11 | SP | 24 | 0467 | 15 | 60 | 5 | 60 | 4.0 |
| 12 | SP | 9 | 0518 | 5 | 120 | 3 | 360 | 24.0 |
| 13 | SP | 5 | 0488 | 5 | 15 | 1 | 15 | 3.0 |
| 14 | RP | 1 | 0657 | 8 | 120 | 3 | 360 | 15.0 |
| 15 | RP | 14 | 0597 | 3 | 0 | 1 | 0 | 0.0 |
| 16 | RP | 22 | 0663 | 3 | 15 | 1 | 15 | 5.0 |
| TOTAL | | | | 780 | 65 | | 2235 | 86.0 |

FIG. 51A

| RANKING INFO.(BASIC P) | | |
|---|---|---|
| RANKING | USER ID | OVERALL EVALUATION VALUE (BASIC P) |
| 1 | 002671 | 1252 |
| 2 | 000358 | 1176 |
| 3 | 000054 | 1065 |
| 4 | 003875 | 1038 |
| 5 | 000017 | 998 |
| 6 | 001186 | 973 |
| 7 | 000001 | 960 |
| ⋮ | | |

FIG. 51B

| RANKING INFO.(BASIC P) | | |
|---|---|---|
| RANKING | USER ID | OVERALL P TOTAL |
| 1 | 001186 | 2342 |
| 2 | 000001 | 2235 |
| 3 | 000017 | 2018 |
| 4 | 003875 | 2007 |
| 5 | 000063 | 1985 |
| 6 | 000054 | 1973 |
| 7 | 000358 | 1951 |
| ⋮ | | |

FIG. 58

| COND. FOR SETTING AUTO SETTING POINT TO ROSTER (GAME RESULT) ||
|---|---|
| CATEGORY | GAME RESULT (SIMULATION RESULT) |
| F | 1B |
| | 2B |
| | 3B |
| | HR |
| | RBI |
| | SB |
| | ⋮ |
| P | K |
| | W |
| | SV |
| | ⋮ |

FIG. 61

| POS. | RESULT ID | GAME RESULT (ACTIVITY CONTENT) | AUTOMATIC SETTING POINT |
|---|---|---|---|
| AUTOMATIC SETTING POINT INFO. ||||
| F | 1 | 1B | 1 |
| | 2 | 2B | 2 |
| | 3 | 3B | 3 |
| | 4 | HR | 4 |
| | 5 | SH | 1 |
| | 6 | RUN BATTED IN (/RUN) | 2 |
| | 7 | SB | 1 |
| | 8 | BB | 1 |
| STARTING P | 9 | GET OUT | 1 |
| | 10 | STRIKE OUT | 1 |
| | 11 | WIN | 5 |
| | 12 | WIN AND ERA<3.00 | 7 |
| | 13 | WIN AND ERA<2.00 | 10 |
| RELIEF P | 14 | GET OUT | 2 |
| | 15 | STRIKE OUT | 2 |
| | 16 | SV | 5 |
| | 17 | NO. OF PITCHED ≧1 AND WHIP≦1.00 | 7 |
| | 18 | SV AND WHIP=0.00 | 9 |

GAME MANAGEMENT DEVICE, GAME SYSTEM, AND COMPUTER-READABLE STORAGE MEDIUM HAVING PROGRAM RECORDED THEREON

TECHNICAL FIELD

This application is based on Japanese Patent Application Serial No. 2012-139229, filed in the Japan Patent Office on Jun. 20, 2012, the contents of which are hereby incorporated by reference.

The present invention relates to a game management device, a game system, and a computer-readable recording medium having recorded thereon program, which manage game information for each user.

BACKGROUND ART

Conventionally, a game system which reflects the sports data etc., in the real world into the game has been proposed. For instance, there is a game system that can reproduce a scene with two outs and the bases loaded in a baseball game in the real world, wherein the batting average etc. of the batter in the real world is reflected into a character in the game when a user wishes to start playing the game from the above scene with two outs and the bases loaded (refer to Japanese Laid-open Patent Publication No. 2000-308757).

In the above-mentioned conventional game system, an attempt is made to realize an interesting game by reflecting a batting average etc., of the baseball player in the real world into the character in the game. However, in this game, since the situation in the real world is merely projected as it is into the game, it is not possible to further improve the game properties. It is therefore desired to realize a game with greater amusement properties by further improving the game properties.

SUMMARY OF THE INVENTION

An object of this invention is to provide a game management device, a game system, and a computer-readable storage medium having a program recorded thereon that can realize a game with great amusement properties in which the game and the real world are integrated.

A game management device according to one aspect of the present invention is a game management device which manages a game, and which comprises: a first relationship information storage control unit that stores in a storage device, a first relationship information associating an existent object in real world with a character corresponding to the existent object;

a character storage control unit that stores in a storage device, an information on characters owned by a user; a prior registration unit that sets a registered character, according to an information on an operation of selecting a prescribed number of characters from the characters owned by the user when the operation is performed by a prescribed time limit; an automatically setting unit that automatically sets an automatic setting point to the registered character that produces a prescribed game result when the game, in which the registered character is applied, is performed by the prescribed time limit, on a basis of a result of executing the game; a real event accepting unit that accepts an information on a real event produced by the existent object after the prescribed time limit; and a game information change unit that changes a user's game information on a basis of the automatic setting point set to the registered character when it is determined that the existent object corresponding to the registered character produced a prescribed real event based on the information on the real event accepted by the real event accepting unit.

A game system according to another aspect of the present invention includes a game management device that manages a game, and a terminal device that communicates with the game management device, wherein either the game management device or the terminal device comprises: a first relationship information storage control unit that stores in a storage device, a first relationship information associating an existent object in real world with a character corresponding to the existent object; a character storage control unit that stores in a storage device, an information on characters owned by a user; a prior registration unit that sets for setting a registered character, according to an information on an operation of selecting a prescribed number of characters from the characters owned by the user when the operation is performed by a prescribed time limit; an automatically setting unit that automatically sets an automatic setting point to the registered character that produces a prescribed game result when the game, in which the registered character is applied, is performed by the prescribed time limit, on a basis of a result of executing the game; a real event accepting unit that accepts an information on a real event produced by the existent object after the prescribed time limit; and a game information change unit that changes a user's game information on a basis of the automatic setting point set to the registered character when it is determined that the existent object corresponding to the registered character produced a prescribed real event based on the information on the real event accepted by the real event accepting unit.

The game management device and the game system according to the present invention can also be realized by a computer. In this case, by causing the computer to function as the foregoing respective units, a program and a computer-readable storage medium having recorded thereon the program, that enable the foregoing game management device and the game system by means of a computer would fall under the scope of the present invention.

The object, characteristics and advantages of the present invention become more evident by the detailed explanation and the attached diagrams below.

BRIEF DESCRIPTION OF THE DRAWINGS

FIG. 5 is an explanatory diagram showing an example of the first relationship information.

FIG. 7 is an explanatory diagram showing an example of game information managed by the game information management unit;

FIG. 10 is an explanatory diagram showing an example fellow user's information;

FIG. 11A is an explanatory diagram showing an example of information related to fellow users of user A;

FIG. 11B is an explanatory diagram showing another example of information related to fellow users of user A;

FIG. 12A is an explanatory diagram showing an example of information related to fellow users of user B;

FIG. 12B is an explanatory diagram showing another example of information related to fellow users of user B;

FIG. 15 is an explanatory diagram showing an example of the roster setting screen;

FIG. 16 is an explanatory diagram showing an example of the roster setting information;

FIG. 17 is an explanatory diagram showing an example of the second relationship information;

FIG. 22 is an explanatory diagram showing information related to real event and the like;

FIG. 29 is an explanatory diagram showing another example of the second relationship information;

FIG. 33 is an explanatory diagram showing an example of the setting information of a prediction point to a fellow user;

FIG. 34 is an explanatory diagram showing the intimacy level information;

FIG. 38 is an explanatory diagram showing an example of the activity judgment information;

FIG. 47 is an explanatory diagram showing another example of the second relationship information;

FIG. 48 is an explanatory diagram showing another example of the second relationship information;

FIG. 49 is an explanatory diagram showing another example of the second relationship information;

FIG. 50 is an explanatory diagram showing a calculation example of basic points and overall points related to roster players;

FIG. 51A is an explanatory diagram showing an example of the ranking information on the basic point;

FIG. 51B is an explanatory diagram showing an example of ranking information on the overall point;

FIG. 58 is explanatory diagram showing an example of the condition that a prediction point is set automatically (game result);

FIG. 61 is explanatory diagram showing an example of prediction point information;

BEST MODE FOR CARRYING OUT THE INVENTION

In the following, a game management device, a game system, and a computer-readable recording medium having recorded thereon program, according to one embodiment of the present invention are described with reference to the accompanying drawings.

[Outline of Game System]

Figure 1:
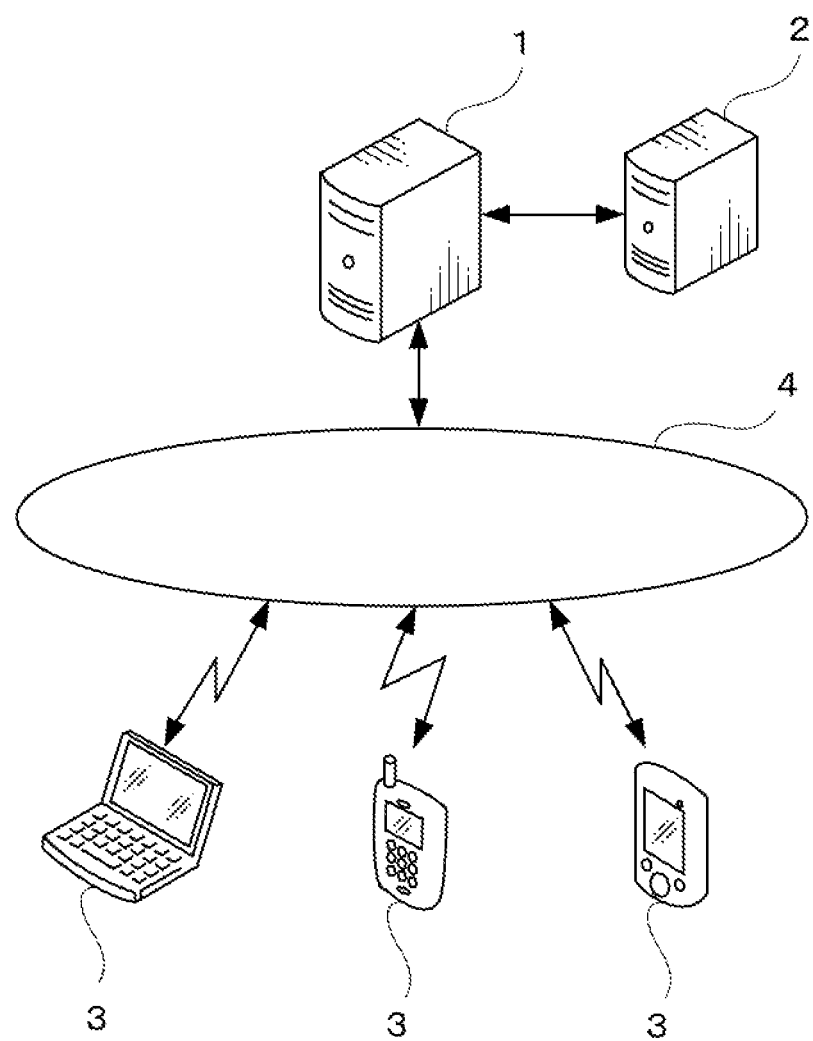
FIG. 1 is an explanatory diagram showing a configuration example of the game system according to an embodiment of the present invention.

A configuration example of the game system comprising the game management device according to an embodiment of the present invention is shown in FIG. 1. As shown in the diagram, this game system is configured from a game server 1 disposed on a network 4 such as the internet, a database server 2 communicably connected to the game server 1, and a terminal device 3 of each game user that can be communicably connected to the game server 1 via the network 4.

The network 4 of this embodiment is not limited to the internet, and may also be, for instance, a dedicated line, a public line (phone line, mobile communication line or the like), wired LAN (Local Region Network), wireless LAN or the like so as long as the game server 1 and the terminal device 3 of each game user can be connected to each other communicably, or the network may be a combination of these with the internet.

In the example of this game system, the game management device according to an embodiment of the present invention is configured from the game server 1 and the database server 2. The game server 1 receives, via the network 4, the access from the terminal device 3 of each game user to receive the game service, accumulates and manages the game information of each game user in the database server 2 (storage device), and provides the game service to each game user via the network 4.

In this embodiment, as one mode of the provision of the game service by the game server 1, explained is a case of providing a so-called browser game in which the game can be played using the web browser loaded in the terminal device 3 of each game user. In the service mode of providing this browser game, there is no need to download or install game-dedicated software to the terminal device 3 of the game user, and, so as long as the environment enables the terminal device 3 to be connected to the network 4, the game user can casually enjoy the game service provided by the game server 1 anywhere.

With this game system, a browser game program (application software) is loaded in the game server 1, and the game server 1 executes arithmetic processing and data processing for advancing the game according to the input operation in the terminal device 3 of each game user. In addition, the game server 1 updates the game information of each user in the database server 2 on the basis of the execution result of the arithmetic processing and the like, and sends the web page information (game screen data) to the terminal device 3 of each game user for displaying the execution result on the screen of the terminal device 3 of the game user.

The terminal device 3 of each game user is loaded with a web browser having a web site browsing function as the user agent, and the web page information sent from the game server 1 can thereby be displayed on the screen of the terminal device 3. The terminal device 3 may be various types of terminal which can receive game services by connection via the network 4 with the game server 1 as represented by portable phone terminals, personal handy-phone system (PHS) terminals, portable digital assistant (PDA) terminals, smartphones, which is synergy of portable phones and portable information terminals, and personal computers (hereinafter referred to as "PCs"), tablet-type computers, or game devices having communication function (console or portable game devices).

Moreover, the game provided by this embodiment has factors of a so-called social game that can be played by a game user while communicating with another game user who is also receiving the game service. For instance, by incorporating the game server 1 and the database server 2 of this embodiment into a system of a social networking service (SNS), it is possible to configure a game system that provides a social game service as one of the SNS services. While it is also possible to provide the game user with a game service on the basis of a game system that runs on an SNS platform as described above, it is also possible to create an independent game system without incorporating the game server 1 and the database server 2 into the SNS system. This game system can be applied also to the online gaming wherein it is not possible to communicate with other users. However, in this embodiment, explanations will be given through the case where this game system is applied to the game wherein it is possible to communicate with other users.

The game provided with this game server 1 uses characters in the game linked with an existent object (person or animal) in the real world. For instance, the character corresponding to the sports player of the real world is used in the game. Moreover, the character corresponding to the racehorse to run is used in the game for a horse race in the real world in the case of the horse racing game. Moreover, the character corresponding to a television personality or a celebrity who answers quizzes in a program broadcast by television, or the like is used in the case of a quiz game.

Games provided by the game server 1 of the present embodiment include a variety of games regardless of the game format and category, such as sports racing games, simulation games, training games, and role-playing games, based on baseball, soccer, tennis, American football, basketball, volleyball, golf, boxing, horse racing, and car racing, etc., or quiz games. In the present embodiment, explanations will be given in the following through the case where the game server 1 manages a baseball game as one example of such games, and the character corresponding to the existent player (existent object) of MLB (Major League Baseball) is used in the game.

The game server 1 of this embodiment provides a novel game that approaches from the game to the real world by enabling the user to make a prediction on the activity of the existent player in the game, and reflecting the result of prediction into the game. However, it does not mean that the user can make a prediction on the activities of all the existent players of MLB, and the user is required to select a target player(s) for the activity prediction among the existent players corresponding to the player characters owned by the user. Therefore, if the user does not own the character corresponding to the existent player who is expected to play an active role, the user needs to obtain that character first in the game. That is, a novel interesting game is realized which has not so far been achieved, that is, the player character is obtained in the game, a prediction is made on the activity of the existent player through the player character, and a reward is offered such as a reward of advantageously advancing the game according to the result of prediction. In the following, the detailed configuration of the game management device (game server 1, etc.) according to this embodiment is explained, that can realize a game with great amusement properties in which the game and the real world are integrated.

[Configuration of Game Management Device]

Figure 2:
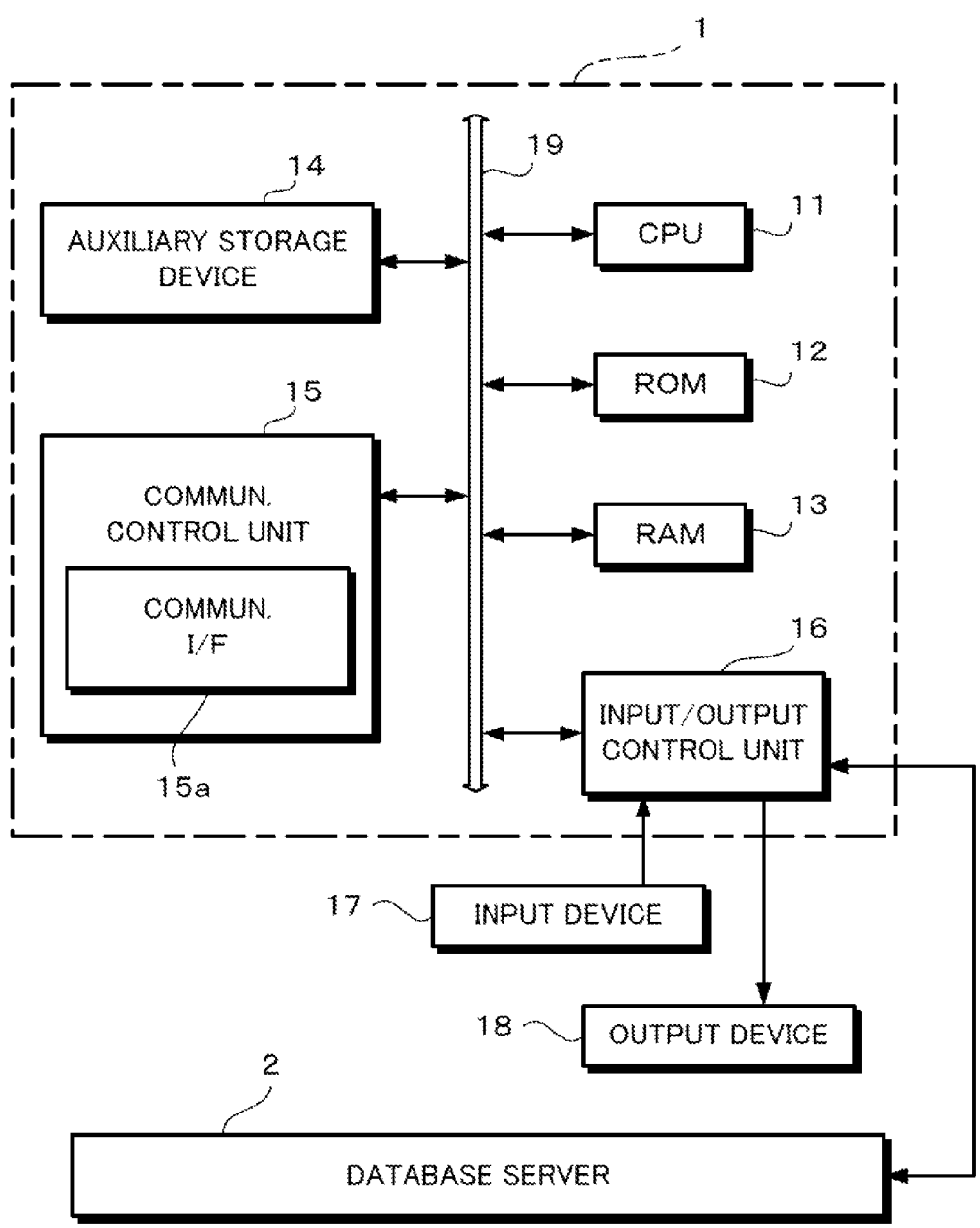
FIG. 2 is a block diagram showing an example of the hardware configuration of the game management device.

As described above, in this embodiment, the game management device is configured from the game server 1 and the database server 2. FIG. 2 shows an example of the hardware configuration of the game server 1. As shown in FIG. 2, the game server 1 mainly comprises a CPU (Central Processing Unit) 11, a ROM (Read Only Memory) 12 and a RAM (Random Access Memory) 13 as the main storage devices, an auxiliary storage device 14, a communication control unit 15, and an I/O control unit 16, and these components are mutually connected via a bus line 19 including an address bus, a data bus, a control bus and the like. Note that an interface circuit is interposed between the bus line 19 and the respective constituent elements as needed, but the illustration of such interface circuits may be omitted in the drawing.

The CPU 11 interprets and executes commands of application software such as system software or game programs, and controls the overall game server 1. The ROM 12 stores programs and the like required for the basic operational control of the game server 1. Moreover, the RAM 13 stores various programs and data, and ensures the work region for the CPU 11.

The auxiliary storage device 14 is a storage device for storing application software such as game programs and various types of data. As the auxiliary storage device 14, for instance, a hard disk drive or the like may be used. The program of this embodiment for causing the game server 1 (computer) to operate as the game management device is also stored in the auxiliary storage device 14, and the program is loaded from the auxiliary storage device 14 to the RAM 13 via the bus line 19 upon starting the game server 1, and executed by the CPU 11.

The communication control unit 15 comprises a communication interface 15a that is connected to the network 4, and controls the communication with the terminal device 3 of each user via the network 4. Moreover, the communication control unit 15 also controls the communication with a server (not shown) that is connected to the network 4. For instance, in the case of a system configuration where the game server 1 is incorporated into SNS, the communication control unit 15 of the game server 1 controls the communication with the SNS server. Moreover, the communication control unit 15 controls the communication with the server that provides information on the event that occurs in the baseball game in the real world to be described later.

The I/O control unit 16 is connected to the input device 17 such as a keyboard, a mouse, or a touch panel, and the output device 18 such as a display, and performs input/output control between these devices 17 and 18. Using the keyboard or the mouse, an operator can manually input information on the event produced in a baseball game into the game server 1. The I/O control unit 16 is communicably connected to the database server 2, and is a database interface for controlling the I/O when the CPU 11 executes the reading and writing of data (records) from and to the database server 2.

The database server 2 comprises, as the storage device having a region for storing the game information of each user managed by the game server 1, for instance a large-capacity hard disk device of a RAID (Redundant Arrays of Inexpensive Disks) configuration. The database server 2 can be configured as a relational database, an object database, an object relationship database or the like which associates identifying information (user ID) for uniquely identifying each user and various game information of each user (user name, level, game point, owned item and the like), and stores the association. Moreover, the database server 2 may be configured not to be connected with game server 1 directly but to be connected via the network 4.

In this embodiment, a case where the game management device is configured from the game server 1 and the database server 2 is explained, but the configuration is not limited thereto. For instance, the game management device may be configured only with the game server 1 by causing the game server 1 to comprise the function of the database server 2. Moreover, the respective functions of the game server 1 may be distributed to a plurality of servers, and configure the game server 1 as a plurality of servers. For instance, an authentication server with an authentication function of determining, when a user operates the terminal device 3 and accesses the game server 1, whether that user is an official user may be provided separately from the main server of the game server 1, and configure the game server 1 with the main server and the authentication server. As another configuration example, a billing management server for performing billing management when a user purchases a charged item within the game may be provided separately from the main server of the game server 1, and configure the game server 1 with the main server, the authentication server and the billing management server.

Moreover, if the number of users that use this game service becomes over hundred thousand or million or even more, the creation of a server system capable of withstanding enormous access from the terminal devices 3 of numerous users will be required. Thus, a load-balancing system configuration may be adopted by providing a plurality of game servers 1 on the network 4 to achieve redundancy (multiplexing). In the foregoing case, it is desirable to provide a load balancer for adjusting the load among a plurality of game servers 1.

The configuration of the user's terminal device 3 which accesses the game server 1 according to this embodiment and receives the provision of the game service is now explained.

[Configuration of Terminal Device]

As the terminal device 3 to be operated by the game user, various terminals including the foregoing PC, portable phone, smart phone, and the like comprising the web site browsing function may be used, and in this embodiment the PC is taken as an example and the configuration thereof is explained. Note that, with the terminal devices 3 other than a portable phone terminal, the basic configuration required for playing the game, such as the input operation for displaying the game screen or executing the game by using the web site browsing function is the same as the configuration of a portable phone terminal.

Figure 3:
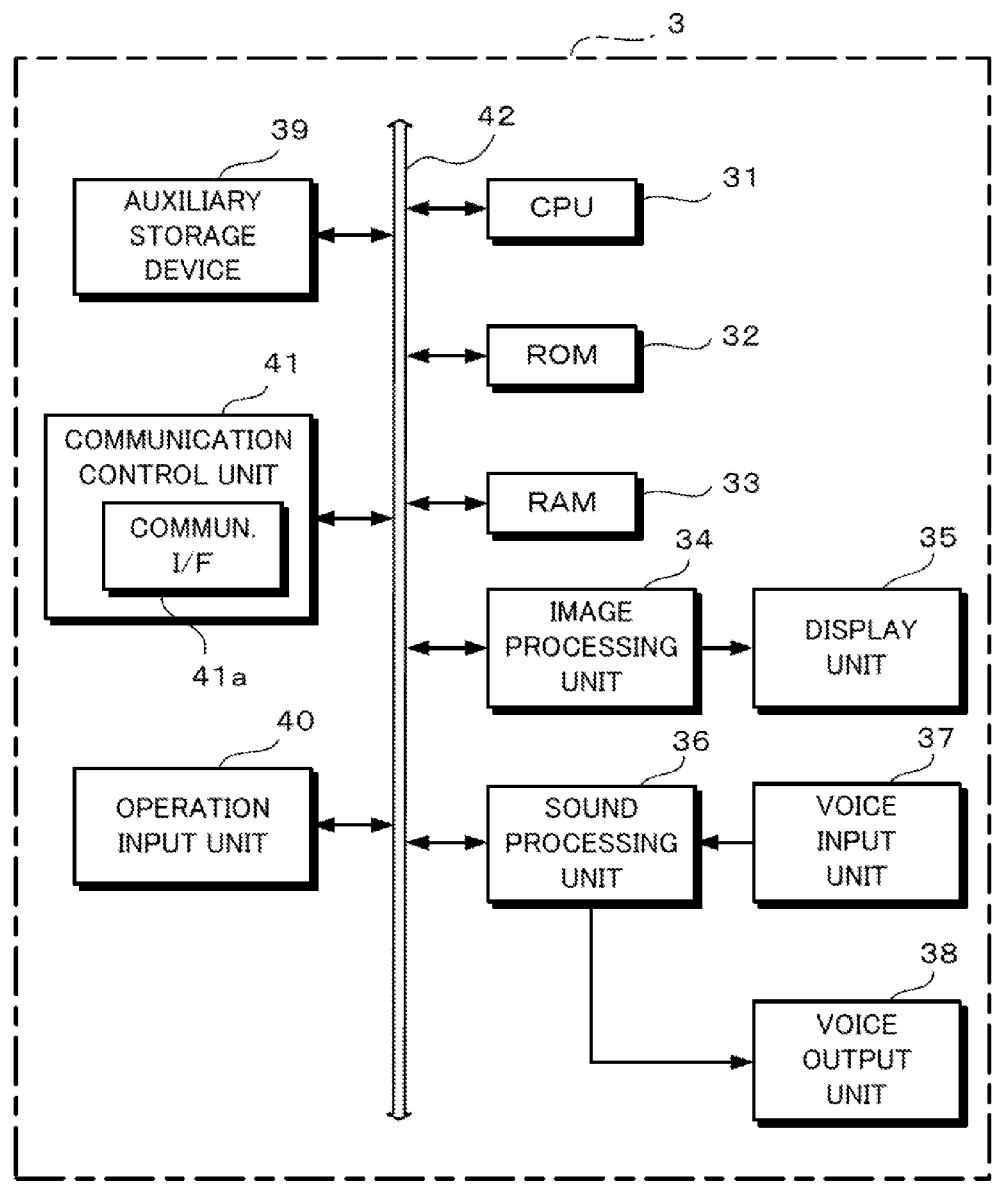
FIG. 3 is a block diagram showing an example of the hardware configuration of the terminal device.

A portable phone terminal comprising the web site browsing function is referred to as a feature phone or a smart-phone, and FIG. 3 shows a configuration example thereof. As shown in the diagram, the terminal device 3 mainly comprises a CPU 31, a ROM 32 and a RAM 33 as the main storage devices, an image processing unit 34, a display unit 35, a sound processing unit 36, a voice input unit 37, a voice output unit 38, an auxiliary storage device 39, an operation input unit 40, and a communication control unit 41, and the constituent elements 31 to 34, 36 and 39 to 41 are mutually connected via bus line 42. Note that an interface circuit is interposed between the bus line 42 and the respective constituent elements as needed, but the illustration of such interface circuits is omitted in the drawing.

The CPU 31 interprets and executes commands of various programs including the web browser, the software that works as the plug-in, and the like, and controls the overall terminal device 3. The ROM 32 stores programs and the like required for the basic operational control of the terminal device 3. Moreover, the RAM 33 stores various programs and data that are loaded from the ROM 32 or the auxiliary storage device 39, and ensures the work region for the CPU 31. The web browser that displays game screen data described in HTML or the like is stored in the ROM 32 or the auxiliary storage device 39, and loaded into the RAM 33 and then executed by the CPU 31. Moreover, various types of plug-in software for expanding the browser function of the web browser may also be stored in the ROM 32 or the auxiliary storage device 39 together with the web browser.

The image processing unit 34 drives the display unit 35 on the basis of the image display command from the CPU 31, and displays an image on the screen of the display unit 35. Applied as the display unit 35 may be various types of known display devices such as a liquid crystal display or an organic EL (Electro-Luminescence) display.

The sound processing unit 36 converts an analog voice signal into a digital voice signal when a voice is input from the voice input unit 37, and generates an analog voice signal based on pronunciation instructions from the CPU 31 and outputs the generated analog voice signal to the voice output unit 38. The voice input unit 37 is configured from a microphone built into the terminal device 3 and is used, for instance, when carrying out voice chat, etc. The voice output unit 38 is configured from a speaker that outputs sound effects or the like while a game is being executed.

The auxiliary storage device 39 is a storage device for storing various programs and data. As the auxiliary storage device 39, a flash memory drive, a hard disk drive or the like may be used as an internal memory of the portable phone terminal, and a memory card reader/writer or the like may be used as an external memory of the portable phone terminal.

The operation input unit 40 is used for receiving the game user's operation input and outputting an input signal corresponding to the operation input to the CPU 31 via the bus line 42. As examples of the operation input unit 40, there are pointing devices such as a keyboard, or a mouse. Moreover, in cases of the terminal device 3 where the display unit 35 is configured as a so-called touch screen by mounting a touch panel (contact input-type interface) on the screen of the display unit 35, the foregoing touch panel also becomes the operation input unit 40.

The communication control unit 41 comprises a communication interface 41a, and has a communication control function for data communication during the game operation and the like, and a communication control function for sending and receiving voice data as a portable phone terminal. Here, the communication control function for data communication includes, for instance, a wireless LAN connecting function, internet connecting function via a wireless LAN or portable phone line network, and a near-field wireless communication function using a predetermined frequency band (for instance, a 2.4 GHz frequency band). The communication control unit 41 emits connection signals for connecting the game server 1 to the wireless LAN or internet based on a command from the CPU 31, and receives information sent from the communication opponent side and supplies the received information to the CPU 31.

In the terminal device 3 configured as described above, the game user who wishes to receive a game service launches the web browser and accesses the game site managed by the game server 1. When this access is authenticated by the game server 1, the communication control unit 41 of the terminal device 3 receives game screen data described in HTML or the like which is sent from the game server 1, and the CPU 31 executes the web browser and displays the game screen on the display unit 35. Here, the game user operates the operation input unit 40 and selectively inputs the selectable button objects or hyperlinks displayed on the game screen. The game server 1 advances the game according to this selective input, and sends new game screen data to the terminal device 3. In addition, the new game screen is displayed on the display unit 35 of the terminal device 3, and, similar to the above, the game user can play the game provided by the game server 1 by selectively operating the button objects that are selectable on the game screen displayed on the display unit 35.

[Functional Configuration of Game Management Device]

Figure 37:
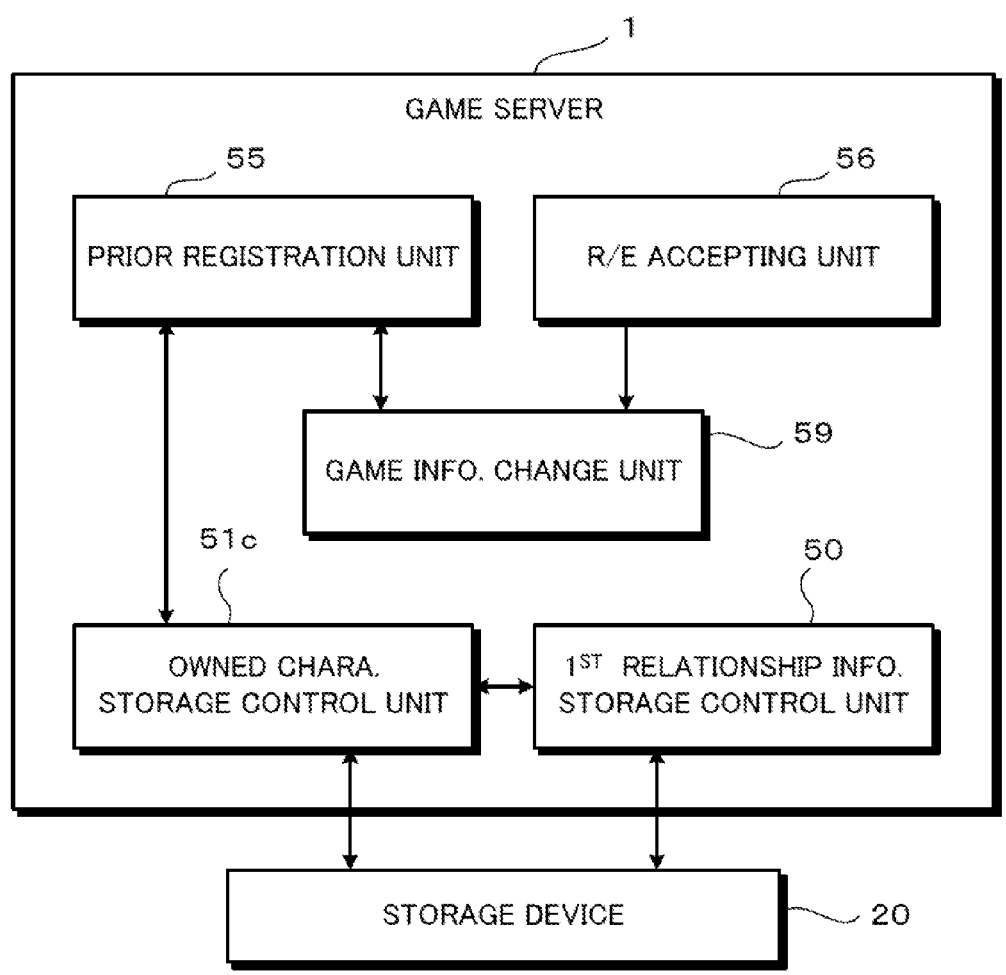
FIG. 37 is a functional block diagram showing an example of the functional configuration of the game management device.

The main functions of the game management device (game server 1 and database server 2) configured as described above are now explained. FIG. 37 is a main functional block diagram of the game management device.

As shown in FIG. 37, the game server 1 mainly comprises a first relationship information storage control unit 50, an owned character storage control unit 51c (character storage control unit), a prior registration unit 55, a real event accepting unit 56 and a game information change unit 59.

The first relationship information storage control unit 50 stores in the storage device (the database server 2, etc.) beforehand, the first relationship information associating the existent player in the real world with the player character corresponding to the existent player. FIG. 5 shows one example of the first relationship information that the first relationship information storage control unit 50 stores in the database server 2. In the example of FIG. 5, as the information on the existent player, stored are the information of the name, the information of the uniform number, the information of the defense position, the information of the belonging team, etc. Moreover, as the information on the player character corresponding to the existent player, stored are the information of "individual ability", the information of "cost", the information of "condition", the information of "result", etc. Moreover, the image information of the player character is also stored. Thus, to the first relationship information that associates the existent player and the player character on one-to-one correspondence, assigned is a player ID which uniquely identifies the existent player and the player character. The game server 1 manages the existent player and the player character with the player ID, and executes various processing. The existent player in the real world is linked with the player character in the game by this first relationship information.

In the case the player character is a fielder, as shown in FIG. 5, the individual ability can be "batting power", "running ability", "fielding skill", etc. In the case the player character is a pitcher, the individual ability can be "ball power", "ball control", "change", etc. Moreover, to each player character, a parameter (attribute) "cost" is set according to the level of the player character's ability. When forming the user's own team, he/she needs to perform a roster setting of the player characters within the maximum total cost. Here, the "roster" is defined to be a list of registered player (first team player) characters which can participate in the match of the game. In replace of the wording "roster", the other expression "deck", for instance, may be used.

To each player character, the parameter "condition" is also set for determining to what level, the player character's ability can be exercised. For instance, the ability of the player character is adjusted according to the condition within the range of 20% to 100%. Moreover, in the case the player character is a fielder, set are the parameters of results such as "batting average", "run(s) batted in", or "home run". In the case the player character is a pitcher, set are the parameters of results such as "earned run average", "wins", or "losses". As described later, the foregoing various parameters set to each player character are updated according to the actual activity and the result of the existent player in the real world.

Figure 6:
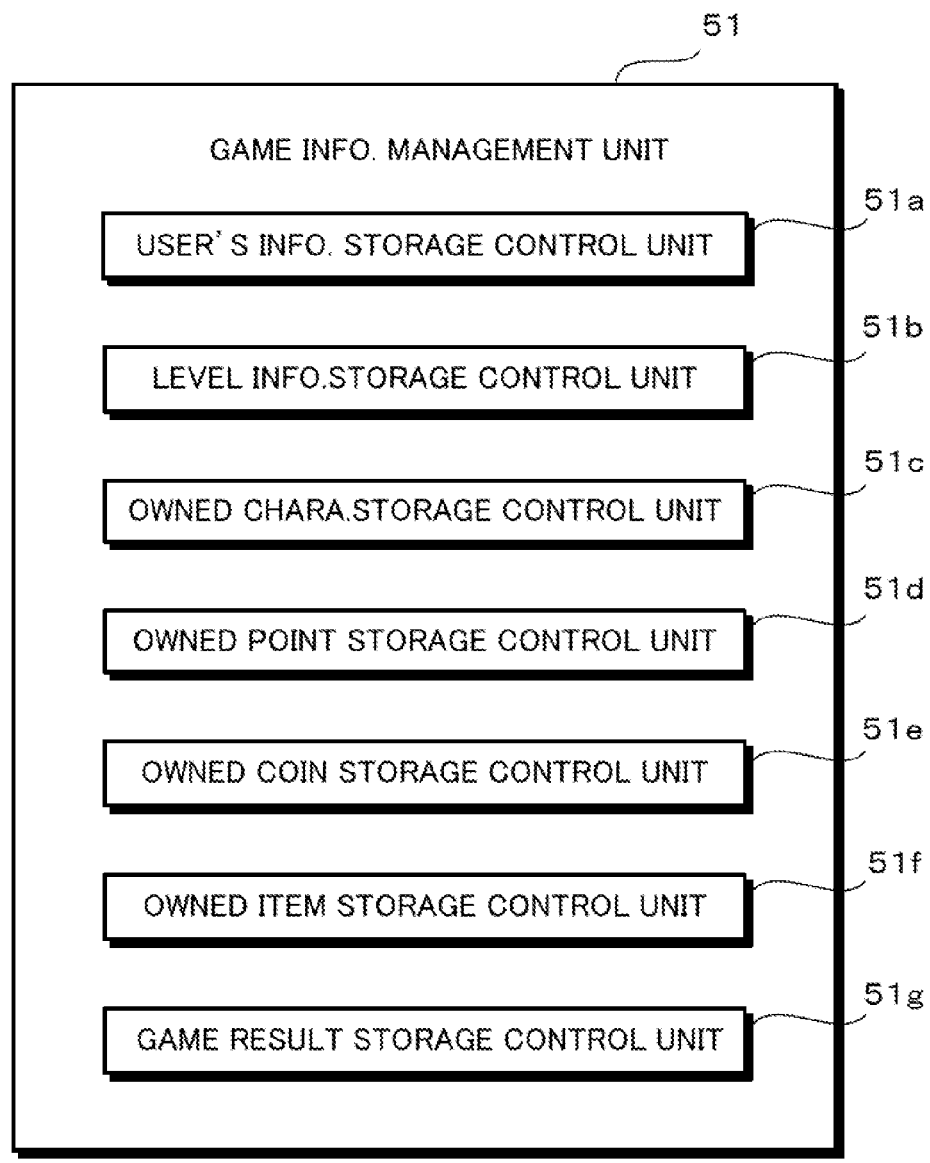
FIG. 6 is a functional block diagram showing an example of the functional configuration of a game information management unit.

Next, explanations will be given on the owned character storage control unit 51c, etc. As shown in FIG. 6, the owned character storage control unit 51c may be configured as one function of a game information management unit 51. The game information management unit 51 accumulates and manages the game information on each user in the database server 2. Items of the game information managed by the game information management unit 51 will differ depending on the content of the game service that is provided by this game server 1 to the user. As one such example, in this embodiment, explained is a case of a baseball game wherein a user owns player characters corresponding to the existent players of MLB in the game, and the user makes his/her own team using the player characters.

The player characters owned by the user may be in a card format in which the mode of the player characters can be visually recognized on the screen of the terminal device 3. In other words, the player characters are managed as digital player cards by the game server 1, and are displayed on the screen of the user's terminal device 3. The user can collect the player characters while advancing the game, form his/her own original team, and matches with another user. The user's player characters correspond to the existent players of MLB, and therefore, it is possible to enjoy a game by forming a user's own dream team by virtually active players in MLB. Moreover, the user can improve the capability of the player character (that is, train the player) by synthesizing the collected player characters, and enjoy the game by aiming to create a stronger team. Further, the user makes a prediction on the activity of the existent player by using his/her owned player character as explained above.

In this kind of baseball game, the game information management unit 51 which manages the game information on each user comprises, as shown in FIG. 6, a user's information storage control unit 51a, a level information storage control unit 51b, an owned character storage control unit 51c, an owned point storage control unit 51d (prediction point storage control unit), an owned coin storage control unit 51e, an owned item storage control unit 51f, and a match result storage control unit 51g. FIG. 7 shows an example of the game information on each user (in this example, game information on one user having a user ID="000001") that is stored and managed in the database server 2 by the respective storage control units 51a to 51g of the game information management units 51.

As shown in FIG. 7, the user's information storage control unit 51a associates the user's information related to each user such as log-in ID, password, user name (nickname or the like used in the game), team name and so on with a user ID for uniquely identifying each user, and stores the association in a predetermined storage region of the database server 2 for each user ID. Here, the log-in ID and the password are used for the log-in authentication when each user operates the terminal device 3 and accesses the game server 1. The information on the user name is arbitrary information that is independently set by the user upon the user registering as a member to receive the game service, or playing the game for the first time. The team information is the information of selecting the user's favorite team among thirty teams of MLB in the real world when the user executes the game for the first time. The user name and the team name are displayed on the game screen as needed.

The level information storage control unit 51b associates the information on the game level such as a user's level, the rank etc. of the block he/she belongs (including the information on rank, class, grade, degree, dan, and so on, corresponding to the level) with the user ID, and stores the association in a predetermined storage region of the database server 2 for each user ID. In this baseball game, for instance, the experience value is accumulated as the user advances the game, and the user's level is enhanced when the experience value reaches a specific value. Moreover, in this baseball game, for instance, there are blocks of a plurality of different levels. For instance, there are ten blocks from the first block of the bottom rank to the tenth block of the top rank, and each user's team belongs to any one of the block, and a match is automatically made with a team of other user in the same block (hereinafter referred to as "automatic match"). Furthermore, according to the result of this automatic match, a promotion and relegation match is automatically made between user's teams belonging to different blocks, and the rank to which the user's team belongs is thereby changed. The level information storage control unit 51b associates the foregoing user level and the affiliated block rank with the user ID and stores the association.

The owned character storage control unit 51c has a function of storing the information on the player characters owned by the user in the storage device 20 (database server 2 etc.). For instance, the owned character storage control unit 51c associates the information on player character acquired and owned by the user in the game with the user ID, and stores the association in a predetermined storage region of the database server 2 for each user ID. Examples of the information on the player characters include the player ID, the ability rank of each player character, etc. The game information management unit 51 can acquire various parameters and the image data etc., of the player character corresponding to the player ID from the first relationship information shown in FIG. 5 on the basis of the player ID stored in the owned character storage control unit 51c.

The ability rank shows the level of the basic ability of the player character, for instance, with five stages (the bottom rank 1 to the top rank 5). Here, the higher the ability rank is, the higher the rarity level is. Therefore, the ability rank may be shown as a rarity level. For instance, the ability ranks 1 to 5 can be expressed in the rarity level in the game, such as "normal", "normal+", "rare", "rare+", or "super-rare". The basic ability of the player character defined on the basis of the ability rank is a different parameter from the individual abilities of batting, running, and fielding, etc. shown in FIG. 5. As for the parameter of the player character, corresponding to the same existent player, the individual ability, the condition, and the result shown in FIG. 5 are identical irrespectively of the user who possesses the player character. However, the overall abilities of the player characters may differ even for the player characters corresponding to the same existent player, depending on the rank of user. For instance, when the user A and the user B both have the same player character (player ID="0001"), there can be the case where the one owned by the user A is "super rare", while the one owned by the user B is "normal", i.e., the player character owned by the user A has a higher overall ability. When the basic ability is Abasic, the individual ability is Aindiv, the condition is C and the result is R, the overall ability Atotal of the player character can be expressed by the following function of Abasic, Aindiv, C, and R $$Atotal=f(Abasic, Aindiv, C, R) \qquad (1).$$

Furthermore, each user is set with an upper limit regarding the number of player characters that can be owned in the game, and the game information management unit 51 manages such that the number of player character owned by each user does not exceed the upper limit. The upper limit to the number of player characters owned by each user is set to an arbitrary number, for instance, 40, 50, 100, etc.

The owned point storage control unit 51d associates various points (including values equivalent to points) owned by the user in the game with the user ID, and stores the association in a predetermined storage region of the database server 2 for each user ID. In this game, there are various game modes, in which various points can be acquired according to the game modes and the points as acquired can be used.

As shown in FIG. 7, examples of points include other than the above described experience value, an action point, an overall cost, a reinforcement point, a prediction point and the like. The action point is used in a "match mode" in which a match is executed with an opponent while consuming the action point. The upper limit for this action point can be increased by raising the user's level, or making a fellow user. For instance, the action point that can be consumed and decreased during the game can be recovered by a lapse of time (for instance, 1 point is recovered for every lapse of 3 minutes), or recovered instantaneously when the experience value reaches a prescribed value, and the user's level is raised.

The above overall cost is a total value of the costs for the player character when carrying out the roster setting of the player characters for forming a user's team. For this overall cost, the upper limit (upper limit overall cost) is set, and the user should carry out the roster setting of the player characters within the upper limit overall costs. This upper limit overall costs increase, for instance, every time the accumulated reinforcement point acquired in the "real MLB link mode" to be described later exceeds a prescribed value. This upper limit overall costs can be increased also when the user makes a fellow user.

The above described reinforcement point is used in a "store mode" in which a player character is acquired. The player character that can be acquired in the "store mode" is determined by drawing, on the basis of a prescribed the probability of drawing. Therefore, it is possible to acquire the player character already owned by the user. In this case, the user can sell the player character and acquire the reinforcement point, or trade such player character in the "player management mode". It is also possible to improve the ability rank (rarity level) by putting a plurality of same player characters into one by synthesizing these player characters. However, in order to improve the rarity level by one level, it is required to perform the synthesis a predetermined number of times. The reinforcement point can be acquired, for instance, according to the activity level of the existent player whom the user expected to play an active role in the "real MLB link mode".

Moreover, the above prediction point is a point that can be set to the player character corresponding to the existent player whom the user expects to play an active role in the "real MLB link mode", and the details are described later. This prediction point can be acquired, for instance, by winning a match with an opponent in the "match mode". As described, this prediction point can be acquired by playing a game in other mode in the game. Therefore, the user who makes an attempt to enjoy a merit by making a prediction on the match in the real world is motivated to actively play a game in other modes. It is therefore possible to activate the overall game through the prediction on matches in the real world. In particular, by configuring such that the prediction point can be acquired in the "match mode" as described above, it can be expect to perform many matches in the game, and it is therefore possible to improve communication activities in the game. For the user who plays the game for the first time, the expectation of winning in the "match mode" is a low. In view of this, it may be configured to offer a prescribed prediction point in advance to all the users to have an opportunity of enjoying a prediction in the real world (for instance, only one prediction point is offered in a day by default).

The owned coin storage control unit 51e associates a coin (a game coin distinguishably provided from the above point) owned by the user in the game with the user ID, and stores the association in a predetermined storage region of the database server 2 for each user ID. The coin is used, for instance, upon acquiring an item to be charged.

The owned item storage control unit 51f associates the items acquired by the user in the game with the user ID, and stores the association in a predetermined storage region of the database server 2 for each user ID. As shown in FIG. 7, as examples of items there are recovery items, coating, and so on. A recovery item is an item used for instantaneously recovering, up to an upper limit value, the foregoing action point that was consumed and reduced during the game, without having to wait for the lapse of time. The coating is an item that permits the player character to be kept at the point of coating by using it, without being affected neither by the updating of data on an individual ability and a result nor changes in condition. This coating is found useful, for instance, in the case the user wishes to keep the player character in his/her possession as it is at a certain point of time, or wishes to watch the peak of the individual ability, the batting average, or the like, and keep the player character active in the "match mode", etc. The above recovery item and the coating can be purchased, for instance, by consuming the coin, or acquired by satisfying the prescribed bonus conditions in the game.

The items that can be acquired and owned by the user in the game are not limited to the foregoing items, but various other items may be owned, for instance, treasure items that can be acquired when winning a match, equipment to characters such as weapons and defense tools, magic items and special items that generate various effects and performances, or the like.

The match result storage control unit 51g associates a match ID for uniquely identifying the result of the match played by the user's team against a team of other user or the computer (the CPU 11 of the game server 1) with the user ID, and stores the association in a predetermined storage region of the database server 2 for each user ID. Here, the matches that are uniquely identified by the respective match IDs include an individual match that is played against an opponent selected by the user, and an automatic match that is played automatically by the game server 1.

Moreover, the database server 2 comprises a match database storing an information related to a match result (game result), which is associated with a match ID. This information includes a match date and time, a user ID of a winning team, a user ID of a losing team, a match score, a winning pitcher character, a losing pitcher character, a player character that hit a homerun, a match brief comment information, etc. In addition, the game information management units 51 acquires, from the match database, the information related to the match result corresponding to the match ID on the basis of the match ID stored in the match result storage control unit 51g.

The game information management unit 51 also manages various ranking information etc. as other game information of the user.

Next, the prior registration unit 55 is explained. In the game of this embodiment, a prediction can be made for the existent player who is expected to be active in the match of MLB in the real world within a prescribed number of players (for instance, 16 player characters (9 fielders and 7 pitchers) in total). However, target existent players for the user's prediction on their activities are limited to existent players corresponding to the player characters owned by the user. Additionally, the user should select the player characters for the activity prediction within the maximum overall cost. Then, the user performs an operation of selecting as a registered character(s), the player character(s) in possession corresponding to the predicted existent player(s), using the terminal device 3 within a prescribed time limit (for instance, before a start time of a first match of MLB on that day). This time limit is referred to as a "prediction time limit". The prior registration unit 55 has a function of setting the registered character according to the operation using the terminal device 3. Hereinafter, the registered player character selected by the user on the basis of the prediction on an activity of the corresponding existent player, which is set by the prior registration unit 55, is referred to as a "roster player" in the present embodiment.

Namely, when an operation of selecting as the roster players, a prescribed number (16, for instance) of player characters from among the player characters owned by the user has been performed by the prediction time limit, the prior registration unit 55 has a function of receiving the information of the operation and setting the roster.

Figure 13:
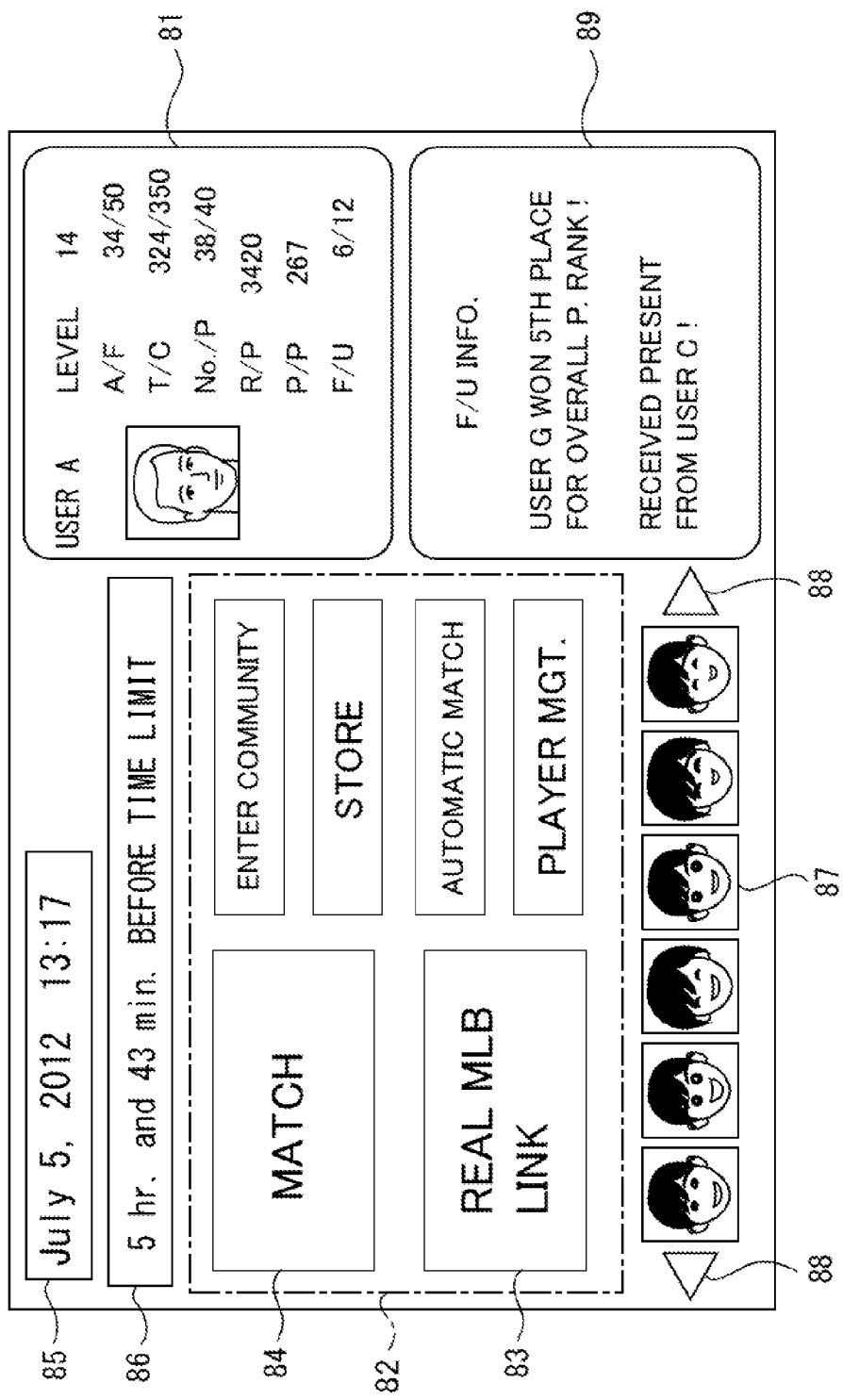
FIG. 13 is an explanatory diagram showing an example of the main screen.
Figure 14:
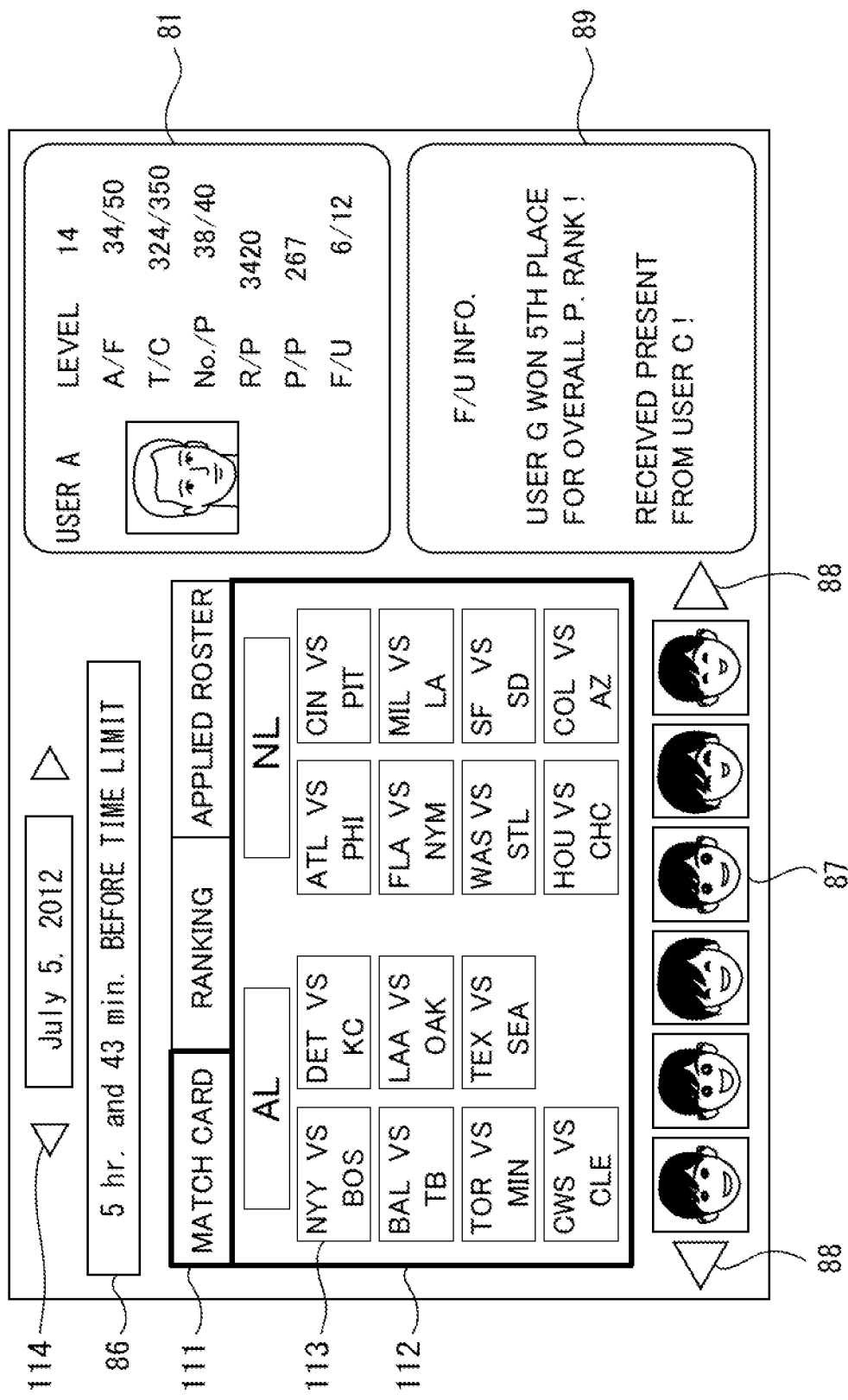
FIG. 14 is an explanatory diagram showing an example of the screen in real MLB link mode.

FIG. 13 to FIG. 15 respectively show screen examples for allowing the user to set the roster. The screen shown in FIG. 13 is a main screen (user's my page) displayed in the terminal device 3 of the user. By selecting a "real MLB link" button 83, a screen is changed to the screen in the "real MLB link" mode shown in FIG. 14. On the screen shown in FIG. 14, by selecting a match card button 113, it is possible to check the information in the real world such as matches of MLB on that day. Moreover, a screen switch tab 111 is displayed on the screen of FIG. 14, and by selecting the "roster application" tab from the screen switch tab 111, a screen is changed to the roster setting screen of FIG. 15. By operating this roster setting screen, the user can set roster players from the owned player characters. In the example of FIG. 15, player slots 121 of 9 fielders and 7 pitchers, 16 in total, are set, and the roster setting can be performed with the player characters, to the maximum of 16. For instance, a player character selection screen not shown in the figure is displayed by making a click (or double click) on each player slot 121, and the user is allowed to select an arbitrary player character from the owned player characters.

Here, the user's team (team order) in the game is constituted on the basis of the roster set by the user. However, it is not necessarily that the user's team in the game is constituted by the player characters corresponding to one particular existent team (the same baseball team of MLB). Namely, the user's team in the game may be constituted by player characters of any existent team (it can be a mixed team constituted by player characters from a plurality of existent teams).

In the player slots 121 for setting the roster players, displayed are a player character's face 121a, a player name 121b, a popularity index 121c, a condition mark 121d, and the like. Here, the popularity index 121c is a number of users who set the player character as a roster player, and indicates the popularity. The condition mark 121d is an object expressing the current condition level of the player character using a facial expression. The screens of FIG. 13 to FIG. 15 are described in details later.

In this embodiment, the fielder positions (including a designated hitter) that can be set as roster players are one catcher (C), one first baseman (1B), one second baseman (2B), one third baseman (3B), one shortstop (SS), one designated hitter (DH), and three outfielders (OF). Therefore, the user is allowed to set only the player characters corresponding to the specified positions. There are slots of three kinds for the player slots 121 for pitchers that can be set for the roster players, and these slots 121 include, for instance, two slots 121 for starting pitchers (SP), two slots 121 for relief pitchers (RP), and three slots 121 for any pitchers including a starting pitcher and a relief pitcher.

Moreover, an automatic setting button 131 is provided to save the user's trouble of selecting a player character from 16 player characters one by one. By selecting this automatic setting button 131, the game server 1 performs a roster setting by automatically selecting player characters from among the player characters owned by the user for the roster within the maximum overall cost based on the prescribed standard. By making good use of this automatic roster setting function, the user can skillfully perform the roster setting for the activity prediction. Namely, at first, using the automatic roster setting function, the roster of the player characters automatically selected by the game server 1 is displayed on the screen of terminal device 3. Afterwards, the user checks if the player characters corresponding to the existent players who are expected to be active are set as the roster players. Here, if the automatic setting of the roster is the one according to the activity prediction made by the user, the user approves the automatically set roster, and the roster setting of the activity prediction is completed. On the other hand, if a roster player that the user wants to change is included in the automatically set roster, the user manually changes only that roster player to another player character. As a result, the roster setting of the activity prediction can be completed in a short time without requiring much troublesome operations.

Furthermore, it may be configured to have such function that permits the user to select a priority standard at the time of automatic setting in addition to the automatic roster setting function of the game server 1. Examples of such additional functions can be "ability valuing", "condition valuing", "result valuing", "popularity valuing", and the like. In the "ability valuing" mode, player characters having high abilities (individual ability and basic ability) are set preferentially to the roster. In the "condition valuing" mode, player characters whose conditions are improved, or which are in the boost state (to be described later) are set preferentially to the roster. In the "result valuing" mode, player characters corresponding to the existent players with high evaluation values (to be described later) are set preferentially to the roster. In the "popularity valuing" mode, popular player characters (set as roster players by a larger number of users) are set preferentially to the roster.

The prior registration unit 55 has the storage control function of storing the user's roster setting information (registered character information) in the storage device. Here, the location of the storage device for storing the roster setting information is not particularly specified. For instance, the storage device can be the RAM13 or the auxiliary storage device 14 of the game sever 1, the database server 2, or a file server or the like having other configuration from the game management device on the network 4. In this embodiment, an example is given through the case where the prior registration unit 55 stores the roster setting information in the database server 2. FIG. 16 shows an example of the roster setting information of a user stored in a prescribed region of the database server 2. FIG. 16 shows the roster setting information of the user A with the user ID="000001". The roster setting information includes roster numbers (1 to 16), positions, and the player IDs of the roster players. In the configuration wherein a prediction point can be set to a roster player, the information on the prediction point set to the roster player is also stored.

Next, the real event accepting unit 56 is explained. The real event accepting unit 56 accepts after the prediction time limit, the information on the real event (hit and home run, etc.) that is the event in the real world produced by the existent player in the match of MLB. Namely, the real event accepting unit 56 has the function of taking the information on real event occurred in the real world into the game server 1. The concrete examples in the real event of the existent players of fielders include a single hit, a two-base hit, a three-base hit, a home run, runs batted in, stealing, etc. The concrete examples in the real event of the existent players of pitchers include strike out, no runs/inning, pitching the whole game, shut-out, no-hit and no-run, perfect match, etc.

The real event accepting unit 56 accepts the input of the information on real events by an operator's manual operation via, for instance, the input device 17 such as a keyboard or a mouse. Or the real event accepting unit 56 accepts the information on real events, by receiving the information on the real event input by means of a computer, or the like separately provided from the game server 1 via the communication control unit 15. Moreover, the real event accepting unit 56 accepts the information on real events, by receiving the information from the server which provides the information on events produced in the baseball match in the real world via the communication control unit 15. There are many servers which provide information as to who hits a home run in the baseball game or the like every after a pitch, every top and bottom battings, every inning, or every after the match. Therefore, using the information provided from the foregoing servers, it is possible to take in the information on the real event.

Next, the game information change unit 59 is explained. This game information change unit 59 has the function of changing the user's game information to give a reward on the basis of an real event information accepted by the above-mentioned real event accepting unit 56 when it is determined that the existent player corresponding to the roster player (registered character) produced a prescribed real event.

Next, explained is an example in which the game information change unit 59 determines that the existent player corresponding to the roster player played a prescribed active role. FIG. 38 shows an example of the real event information (hereinafter referred to as the activity determination information) based on which it is determined that the existent player played a prescribed active role. As shown in FIG. 38, in the case where the existent player corresponding to the roster player is a fielder, it can be determined that the existent player played a prescribed active role, when a real event is produced such as hitting a single, two-base, three-base or a home run, driving a runner in, or successful stealing. In the case where the existent player corresponding to the roster player is a pitcher, it can be determined that the existent player played a prescribed active role, when a real event is produced such as striking out, being a winning pitcher or a pitcher with a save. The game server 1 stored the activity determination information in the storage device 20 beforehand. To the real event, assigned is an event ID which uniquely identifies each event, and in the game server 1, each real event is managed with the event ID.

The game information change unit 59 can determine that the existent player corresponding to the roster player played an active role that produced a prescribed real event on the basis of the activity determination information of FIG. 38. Then, upon determining that the existent player corresponding to the roster player played an active role, the game information change unit 59 changes the user's game information to give a reward such as allowing the user to play the game advantageously. Here, playing the game advantageously indicates that as compared to the state before changing the game information, some merit is generated so that the user can advance the game more advantageously in some form. For the merit, various types of merits can be generated according to the kind and the content of the game. In the following, given is an example in which the game information change unit 59 changes the user's game information to allow the user to play the game advantageously.

Figure 9:
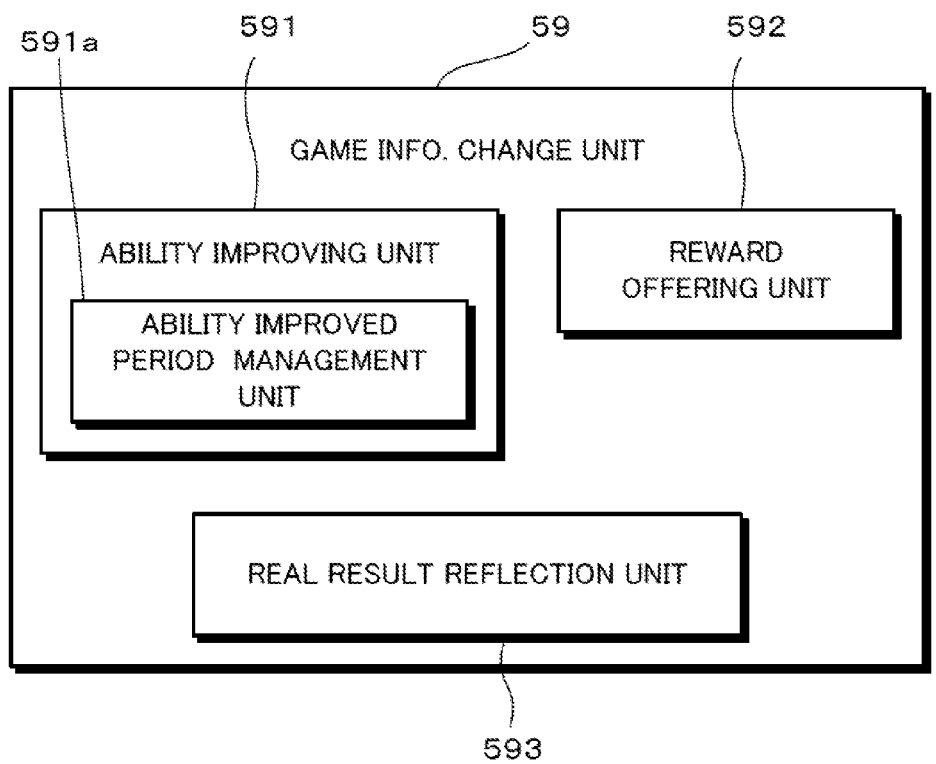
FIG. 9 is a functional block diagram showing an example of the functional configuration of the game information change unit.

The game information change unit 59 comprises an ability improving unit 591 as shown in FIG. 9. This ability improving unit 591 changes the user's game information to improve the ability of the player character corresponding to the existent player for a prescribed time period (for instance, 24 hours) when the existent player corresponding to the roster player played a prescribed active role (namely, the existent player whom the user predicted to play an active role). The state in which the ability of the player character is temporarily thus improved is hereinafter referred to as a "boost state". In the boost state, the ability of the player character is improved, for instance, by 150%. The ability improving unit 591 comprises an ability improved period managing unit 591a, and manages a prescribed period of maintaining the boost state. The ability improved period managing unit 591a counts the prescribed period, for instance, based on an internal clock of the CPU 11 of the game server 1. Then, after the prescribed time period has passed from the start of the boost state, the game information change unit 59 cancels the boost state, and changes the user's game information back to the original state of ability of the player character.

The prescribed time period of duration of the boost state is not limited to the prescribed time period, but may be set to, for instance within the day the real event occurred (for instance, until 24 o'clock etc., of that day), or to the next prediction time limit. Furthermore, the reward to be advantageous in a game can generate various merits in the game according to the kind or the content of the game without limited to the merit of improving the character's ability. For instance, a point or an item may be offered to a user, which permits the user to advance the game advantageously. Moreover, for the game in which the item can be acquired by drawing, considered may be a merit of increasing the probability of drawing a rare item, etc.

Figure 39:
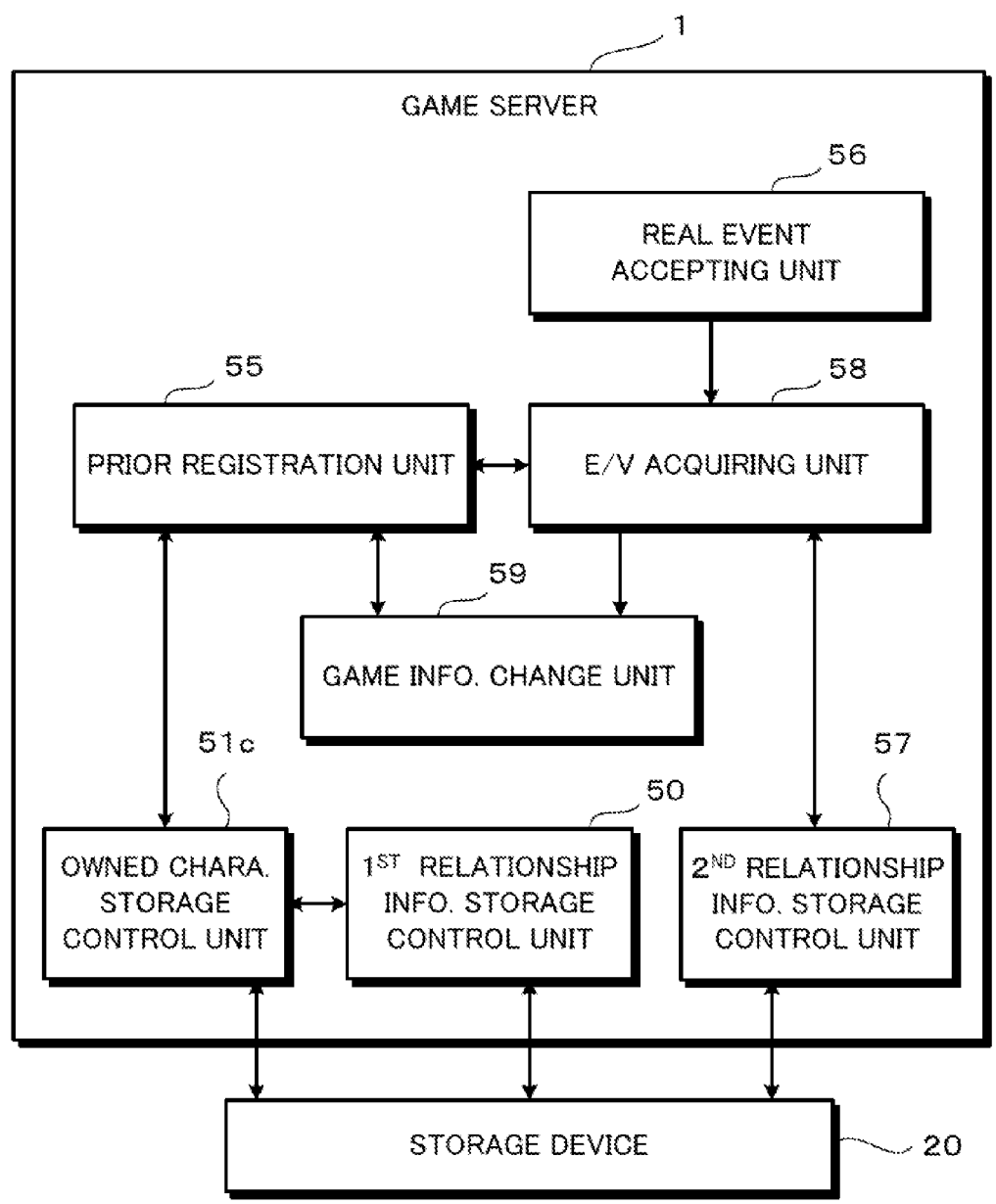
FIG. 39 a functional block diagram showing an example of the functional configuration of the game management device.

Next, explained is the constitution where it is determined that an existent player corresponding to a roster player played an active role that produced a prescribed real event on the basis of an evaluation value. As shown in FIG. 39, the game server 1 of this configuration comprises a second relationship information storage control unit 57 and an evaluation value acquiring unit 58 in addition to the first relationship information storage control unit 50, the owned character storage control unit 51c, the prior registration unit 55, the real event accepting unit 56 and the game information change unit 59.

The second relationship information storage control unit 57 stores in the database server 2 (storage device) beforehand, the second relationship information associating an evaluation value for evaluating the existent player who produced a real event with the real event. FIG. 17 shows an example of the second relationship information that the second relationship information storage control unit 57 stores in the database server 2. In the example of FIG. 17, as the information on real events, stored are the information on single hit, two-base hit, three-base hit, home run, runs batted in, stealing, strike out, no runs/inning, and other information. For the evaluation values corresponding to these events, for instance, an evaluation value 1 is set for single hit, 2 for two-base hit, 3 for three-base hit, 4 for home run, 1 for run batted in, 1 for stealing, 0.5 for strike out, and 0.5 for no runs/inning. To each real event, assigned is an event ID for uniquely identifying each event and each real event is managed with the event ID in the game server 1.

Next, the evaluation value acquiring unit 58 is explained. The evaluation value acquiring unit 58 has a function of acquiring the evaluation value of the existent player corresponding to the roster player, who is expected to be active by the user on the basis of a second relationship information. For instance, when the existent player set to the roster player takes the active role of 4 hits and 4 runs in the baseball match in the real world, as an evaluation value indicative of the active level of the existent player at that match on the basis of the second relationship information shown in FIG. 17 is 4 (hits)×1 point+4 (runs)×1 point=8 point. After the match of MLB ends, the evaluation value acquiring unit 58 acquires evaluation values of the existent players who played active roles corresponding to all of the roster players.

Then, the game information change unit 59 has the function of changing the user's game information to offer the user a reward on the basis of the evaluation value acquired by the evaluation value acquiring unit 58 when it is determined that the existent player corresponding to the roster player played an active role.

For instance, the ability improving unit 591 shown in FIG. 9 of the game information change unit 59 determines that the existent player played a prescribed active role when the evaluation value of the existent player (i.e., the existent player corresponding to the roster player) who is expected to be active by the user exceeds a threshold (for instance, 3 point), and changes the user's game information to improve the ability of the player character corresponding to the existent player only for a prescribed time period (for instance, 24 hours). Namely, it is changed to the boost state where the ability of the player character is temporarily improved.

Here, the foregoing threshold can be set to an arbitrary value, such as "1 point", "2 point", or "3 point". The threshold may be set to "0 point" for instance. In the case the threshold may be set to "0 point", it is determined that the target existent player played a prescribed active role when the evaluation value exceeds the "0 point" (i.e., when the evaluation value is not the "0 point"). In this case, when the existent player produced any of the real events included in the second relationship information shown in FIG. 17, it is determined that the existent player played a prescribed active role.

In this configuration, when it is determined that the existent player corresponding to the roster player played an active role, the game information change unit 59 changes the user's game information to improve the ability of the roster player only for a prescribed time period. Therefore, if the user plays a game actively in the period in which the ability of the roster player is improved (plays a larger number of matches), it is likely that good match results (a large number of wins or a high win rate) can be obtained. As described, by setting the limited period in which the game can be advanced advantageously for the user whose prediction is correct, it is possible to draw positive desire to challenge a game from the user, while giving a sort of tension to the user, thereby realizing and a game with great amusement properties.

The degree of the ability improvement in the boost state can be a fixed rate of improvement (for instance, 150%), or variable within a prescribed range (for instance, from 110% to 200%) according to the evaluation value. When the degree of the ability improvement is set variable, it is configured such that the higher is the evaluation value of the existent player who was predicted to be active by the user, the higher is the degree of the ability improvement of the player character (roster player) corresponding to the existent player.

The overall ability Atotal of the player character can be expressed by the function f (Abasic, Aindiv, C, R) as shown in the above formula (1). Here, when assuming that the correction factor for correcting this overall ability Atotal is set to a1, the overall ability Atotal can be expressed by the following formula (2):

$$A\text{total} = f(A\text{basic}, A\text{indiv}, C, R) \times a1 \quad (2),$$

wherein the correction factor $a1$ satisfies the condition of $1 < a1$.

The ability improving unit 591 changes the level of the ability improvement in the boost state such that the larger the evaluation value is, the larger the correction factor a1 is. For instance, when E denotes the evaluation value is E, for $4 \leq E < 5$, a1=1.1; for $5 \leq E < 6$, a1=1.2; for $6 \leq E < 7$, A1=1.4 for $7 \leq E < 8$, A1=1.6; for $8 \leq E < 9$, a1=1.8; and $9 \leq E$ for a1=2.0. Then, by controlling the database server 2 to store the correction factor a1 in association with the player ID of the player character in the boost state, the user's game information can be changed to be advantageous in the game.

In the configuration in which the prediction point can be set to a roster player to be described later, it may be arranged such that the larger the prediction point set to the roster player is, the larger the degree of the ability improvement of the roster player in the boost state is. It may be also arranged such that the larger the evaluation value of the existent player corresponding to the roster player and the prediction point set to the roster player are, the larger the degree of the ability improvement of the roster player in the boost state is.

As described, the degree of improvement of the ability of the roster player is affected by the result of the activity prediction made by the user (whether or not the existent player corresponding to the roster player played an active role). Therefore, even among the users who own the same player character, it is possible to have different abilities of that player character depending on whether the activity prediction is made or not (whether the player character is set to the roster player or not), or the degree of the prediction point additionally set to the roster player. With this configuration, it is possible to make an activity prediction more interesting, thereby realizing a game with greater amusement properties.

The game information change unit 59 comprises a reward offering unit 592 as shown in FIG. 9. This reward offering unit 592 changes the user's game information so as to add an object to be used in the game (character, point, item or the like) as a reward, on the basis of the evaluation value of the existent player predicted to be active by the user. In this embodiment, explained is an example in which the larger the evaluation value is, the larger the reinforcement point to be offered to the user is. For instance, when the evaluation value of the existent player whose activity was predicted by the user is 8 point, 8 point is offered to the user as the reinforcement point. In this embodiment, the respective activities (evaluation values) of 16 existent players corresponding to 16 player characters of the roster are subjected to the offering of the reinforcement point. In the case where the game information change unit 59 offers the reinforcement point to the user as a reward, the game information change unit 59 changes the game information by increasing the reinforcement point owned by the user stored in the database server 2 according to the evaluation value.

The game information change unit 59 may change the user's game information to be advantageous in the game in a manner other than improving the ability of the player character corresponding to the existent player, offering a point, and the like, on the basis of the evaluation value of the existent player corresponding to the roster player. For instance, for the game in which an item can be acquired by drawing, considered may be the configuration wherein the probability of drawing a rare item is increased by a prescribed number of times on the basis of the evaluation value. In this case, for the user's game information, stored is the number of times the probability of drawing the rare item is increased. Then, a game advancement unit 52 of the game server 1 temporarily increases the probability of acquiring a rare item when performing the drawing for a rare item. Moreover, other examples are as follows. That is, where it is configured that the point such as an action point consumed in the game is recovered by a point at every 3 minutes, for instance, this point recovery time can be reduced (to be recovered by a point at every 2 minutes, for instance). In this case, as the user's game information, stored is the information on the effective time period in which the point recovery time is reduced.

Moreover, the game information change unit 59 may be configured to change the user's game information to offer the user an item with a high rarity value that is hard to obtain (a rare item for collection etc.) though it will not directly affect the advancement of the game.

Figure 40:
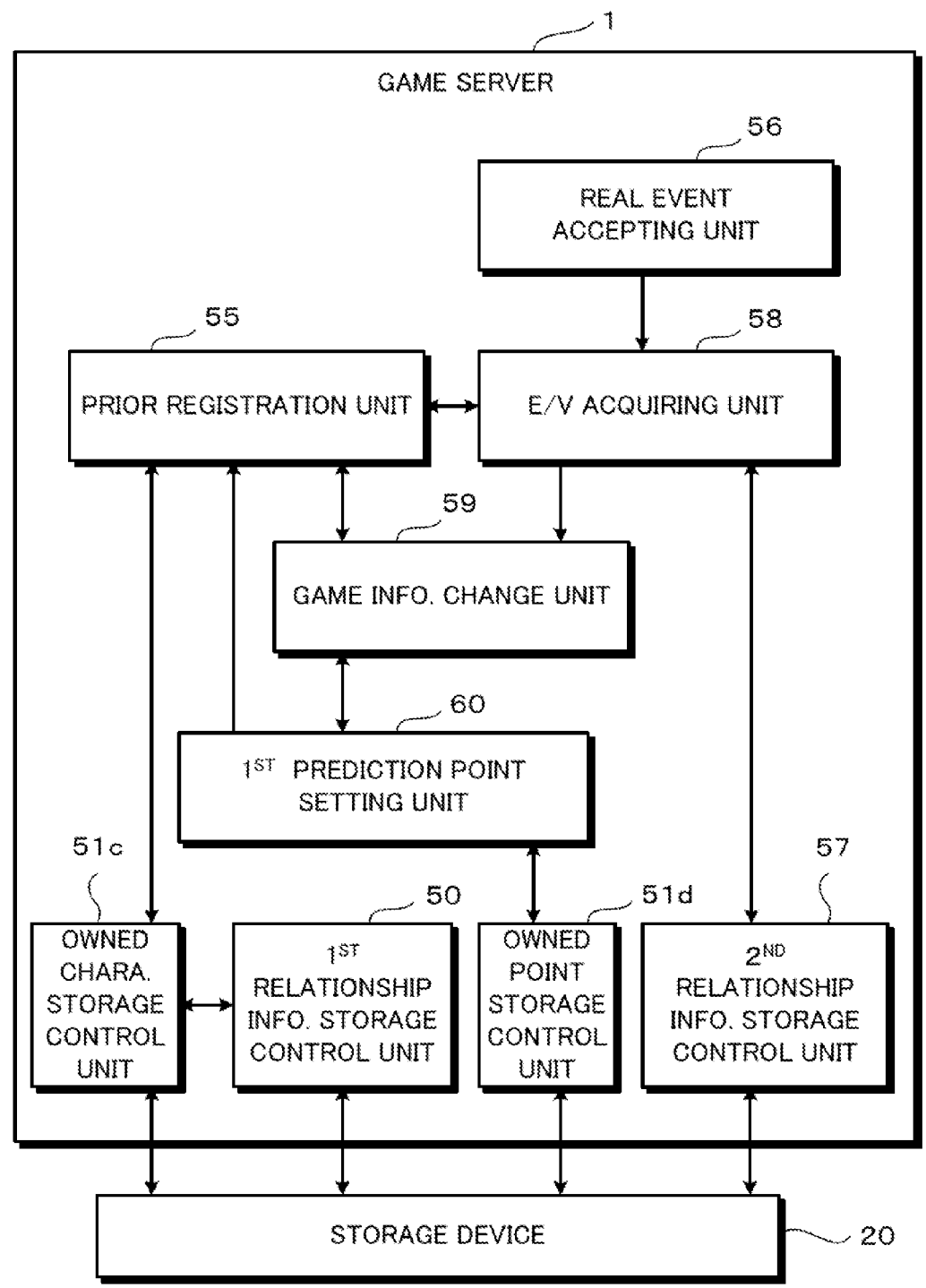
FIG. 40 a functional block diagram showing another example of the functional configuration of the game management device.

Next, explained is the configuration wherein the weighting of the prediction can be set by setting the prediction point acquired by the user in the game to the roster. Here, the prediction point may be called by another name in the game. For instance, the prediction point may be called by the name "hope" meaning to put an expectation on the activity of the roster player. As shown in FIG. 40, the game server 1 of this configuration comprises the owned point storage control unit 51*d* (prediction point storage control unit), and a first prediction point setting unit 60 in addition to the first relationship information storage control unit 50, the owned character storage control unit 51*c*, the prior registration unit 55, the real event accepting unit 56, the second relationship information storage control unit 57, the evaluation value acquiring unit 58 and the game information change unit 59.

As described, the user can acquire the prediction point by winning a match, etc., in the match mode. The owned point storage control unit 51*d* stores the prediction point acquired by the user in the storage device 20. Then, the user is allowed to set the prediction point obtained in the game to an arbitrary roster player.

FIG. 15 shows an example of the screen for the user to set the prediction point to the roster player. The prediction point (total unset point) owned by the user is displayed in a prediction point display region 132 of the roster setting screen of FIG. 15. In this embodiment, the prediction point is displayed by an object 133 in a star shape on the screen. For instance, by performing an operation of making a click on this prediction point display region 132 by the user, the cursor 134 is changed into the shape of a hand, and a performance display is made that the object 133 indicating the prediction point is picked up. In this state, the user moves the cursor 134, and makes a click on the player slot 121 of the roster player to whom the user wishes to set the prediction point. As a result, the object 133 of the prediction point is arranged in the prediction point setting region 135 of the player slot 121 to become the state the prediction point has been set to the roster player.

The prediction point can be set by clicking the player slot 121 continuously. For instance, when setting 3 prediction point to a certain roster player, the player slot 121 of the roster player concerned is clicked 3 times. Furthermore, in order to improve the operability in the case of setting the prediction point a plurality of times, it is configured that the prediction point can be set in a unit of 5 point or 10 point, etc. Namely, a plurality of objects 133 corresponding to different values (numbers of point) such as the unit of 1 point, the unit of 5 point, the unit of 10 point and the like are prepared in a distinguishable manner by color, or pattern. Further, for instance, each time a click is made on the prediction point display region 132, the object is switched in the order of the unit of 1 point→the unit of 5 point→the unit of 10 point→the unit of 1 point . . . . The total prediction point set to the roster players by the user is displayed in a total set point display region 136.

When the above described operation of setting the prediction point to the roster is performed using the terminal device 3 by the prediction time limit, the first prediction point setting unit 60 receives the information on the operation, and executes the processing of setting the prediction point to roster players. FIG. 16 shows an example of the information on the prediction points set to the roster players stored by the first prediction point setting unit 60 in a prescribed region of the database server 2. As shown in FIG. 16, the information on the prediction point set to the roster players are stored in association with the player IDs of the roster players.

As described, the user makes a prediction on the activity from among the existent players corresponding to the player characters owned by the user, and sets the roster of 16 player characters. Therefore, the roster is made up of player characters reflecting the activity prediction made by the user. Furthermore, it is possible to additionally set the prediction point to the roster player of the existent player whose activity is particularly expected by the user among these 16 existent players corresponding to the roster players. Furthermore, it may be arranged so as to change the prediction point to be set to the roster player according to the degree of expectation. In other words, the number of the prediction point set to the roster indicates how much the user's expectation is reflected into the existent player corresponding to the roster player. As described, with this configuration, using the prediction point acquired by the user in the game, it is possible to further improve the game properties by enabling an additional activity prediction via the roster.

Furthermore, the game information change unit 59 sets a reward to be offered to a user such that the larger the prediction point set to a roster player is, the larger the advantageous degree in the game is. In this embodiment, the reward offering unit 592 of the game information change unit 59 sets reinforcement point to be offered to the user when the existent player corresponding to the roster player plays an active role such that the larger the prediction point set to the roster player is, the larger the reinforcement point is. As an example, the reinforcement point obtained by multiplying the valuation value E of the existent player corresponding to the roster player by the number P of the prediction point set to the roster player is offered to the user. In an example of a certain roster player, when the evaluation value E=8 point, and the prediction point is 5 point, E×P=40 point is offered to the user as the reinforcement point. In this embodiment, for 16 roster players, the reinforcement point is offered to the user according to the respective activity levels of the corresponding existent players. Therefore, if the user's activity prediction is correct, it is possible to obtain a large reinforcement point.

As described, in the configuration wherein the reinforcement point to be offered to the user is determined by multiplying the valuation value E of the existent player corresponding to the roster player by the number P of the prediction point set to the roster player, one prediction point is automatically set to each roster player by default. This prediction point automatically set by default does not consume the prediction point owned by the user. Here, the prediction point automatically set to each roster player by default is not limited to one point, and can be set arbitrary. For instance, in an example in which in addition to the 16 roster players (regular roster players) shown in FIG. 15, a prescribed number of reserve roster players (for instance, 4) can be set, it may be configured that 2 prediction point is set to a regular roster player by default automatically, while 1 prediction point is set to a reserve roster by default automatically.

Furthermore, when the evaluation value of the existent player corresponding to the roster player exceeds the threshold (for instance, 3 point), the ability improving unit 591 of the game information change unit 59 improves the ability of the roster player to be set in the boost state. In this case, the ability improving unit 591 sets the degree of improvement of the ability of the roster player such that the larger the prediction point set to the roster player is, the larger the degree of improvement is. An example is explained wherein as shown in the above formula (2), the degree of improvement of the overall ability Atotal of the player character set to the roster player can be adjusted by the correction factor a1, and this correction factor a1 is changed according to the number of the prediction point. For instance, when P denotes the number of prediction point, for P<3, a1=1.2; for 3≤P<6, a1=1.4; for 6≤P<10, a1=1.6; for 10≤P<15, a1=1.8; and for P≤15, a1=2.0.

It may be also configured to change the correction factor a1 according to the evaluation value E of the existent player corresponding to the roster player and the number of prediction point P set to the roster player. For instance, for E×P<15, a1=1.2; for 15≤E×P<25, a1=1.4; for 25≤E×P<35, a1=1.6; for 35≤E×P<45, a1=1.8; and for 45≤E×P, a1=2.0.

Figure 41:
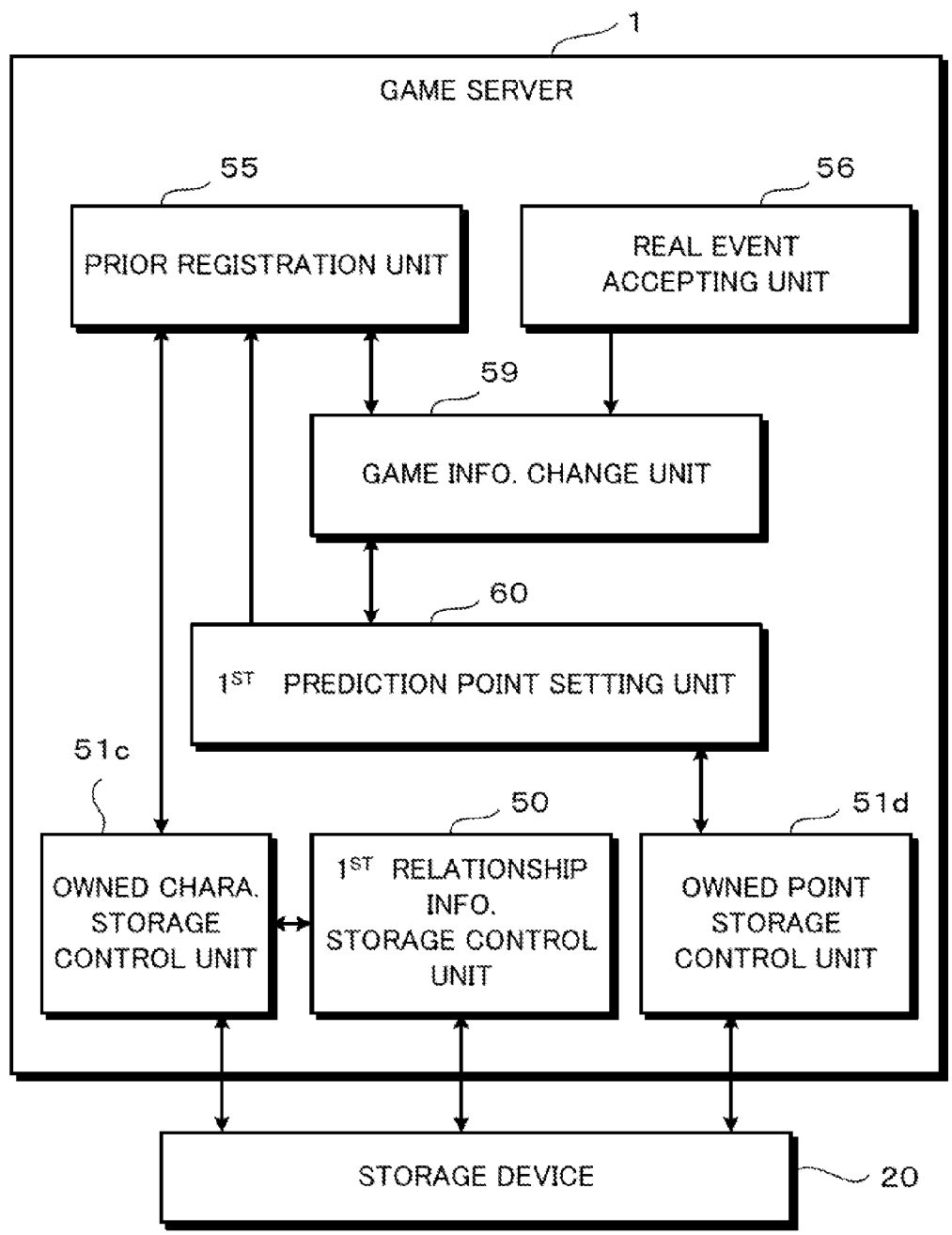
FIG. 41 a functional block diagram showing another example of the functional configuration of the game management device.

Furthermore, as shown in FIG. 41, in the configuration without including the second relationship information storage control unit 57 and the evaluation value acquiring unit 58, it may be configured to comprise the owned point storage control unit 51$d$ (prediction point storage control unit) and the first prediction point setting unit 60. In this configuration, when it is determined on the basis of the activity determination information, etc., shown in FIG. 38 that the existent player corresponding to the roster player played a prescribed active role, the game information change unit 59 sets a reward such that the larger the prediction point set to the roster player is, the larger the reward is.

Figure 42:
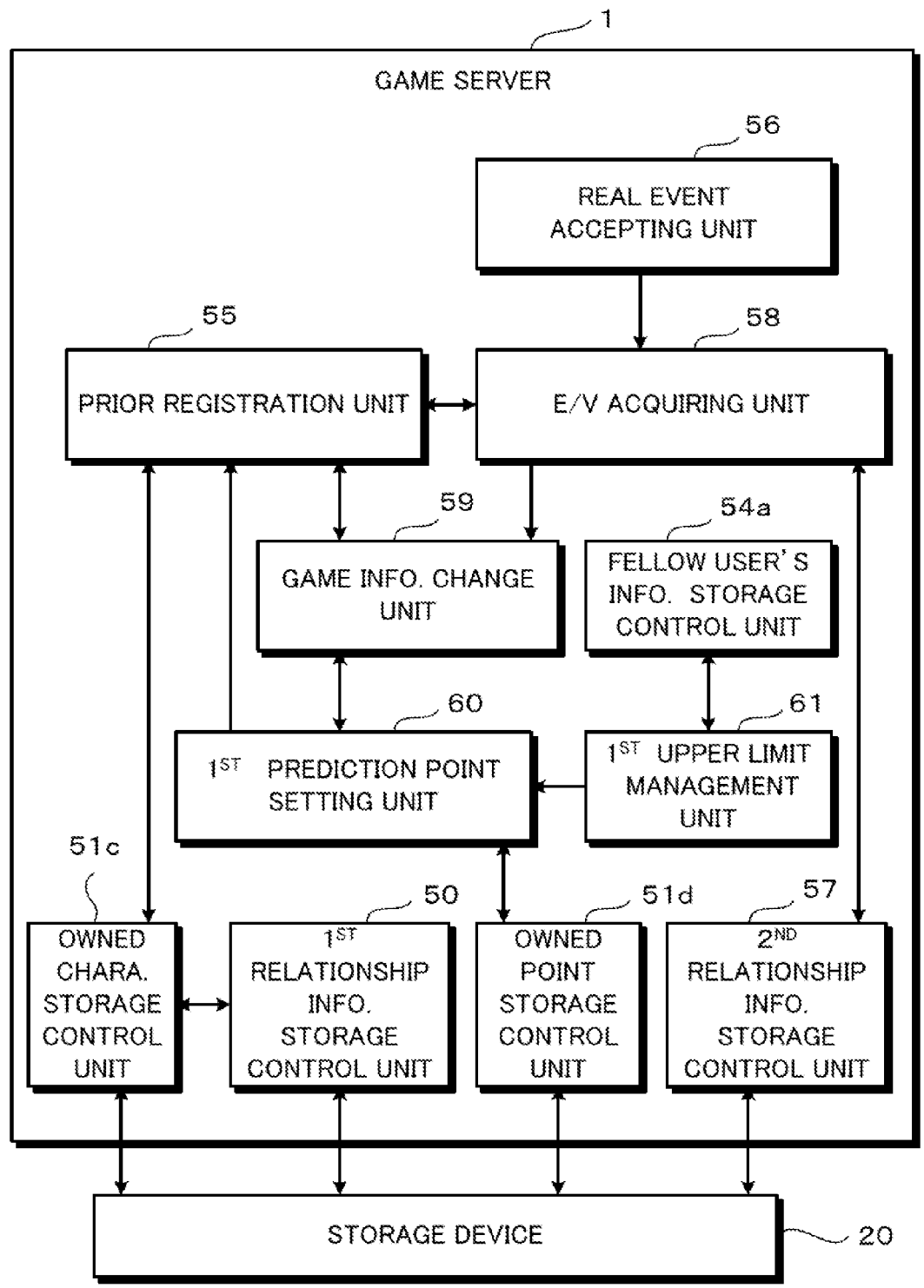
FIG. 42 a functional block diagram showing another example of the functional configuration of the game management device.

Next, explained is the configuration wherein in the game in which a fellow user relationship can be established between users, and the upper limit to the prediction point that can be set to the roster is changed according to the number of fellow users. As shown in FIG. 42, the game server 1 of this configuration comprises a fellow user's information storage control unit 54$a$ and a first upper limit management unit 61.

Figure 4:
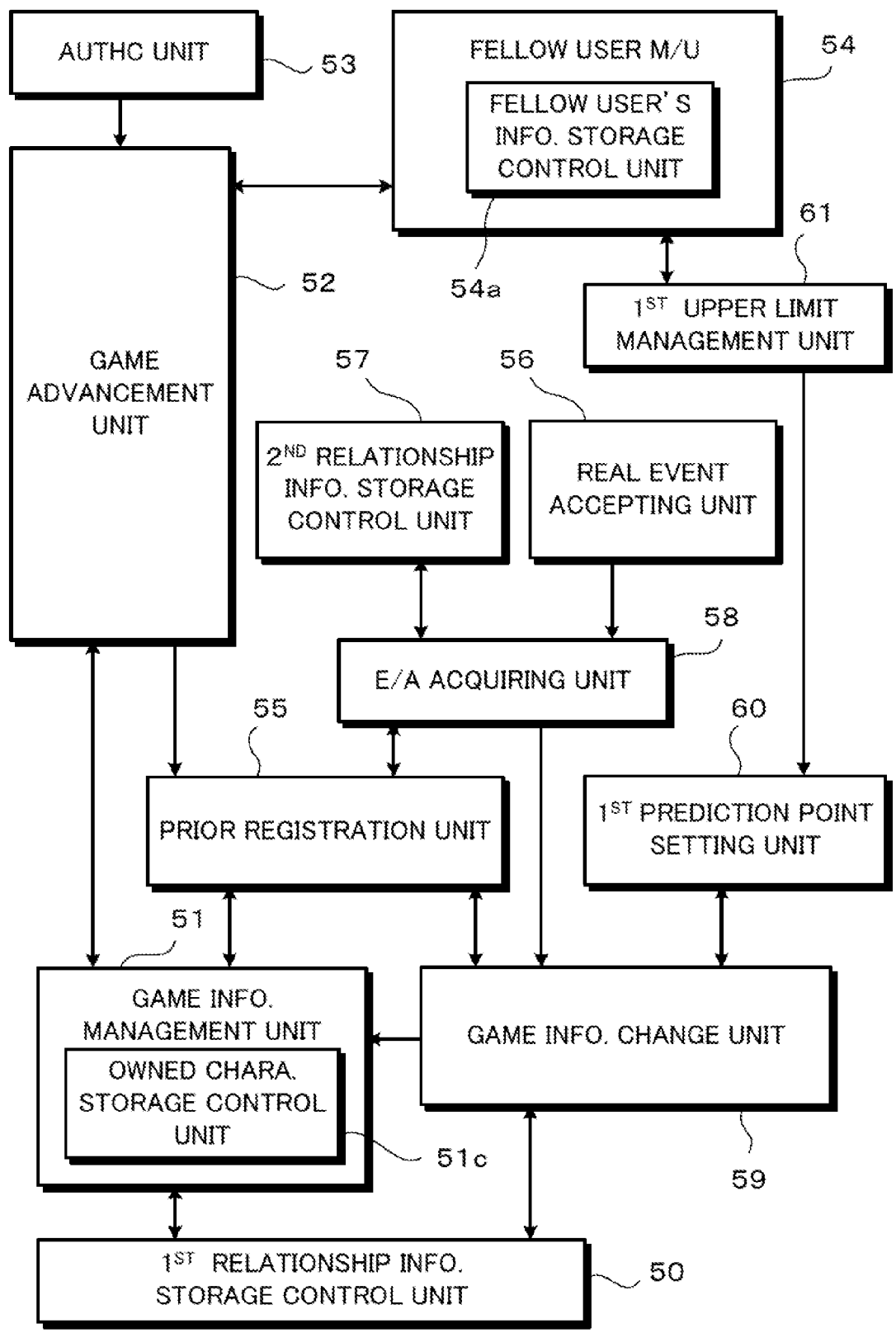
FIG. 4 is a functional block diagram showing an example of the functional configuration of the game management device.

As shown in FIG. 4, the fellow user's information storage control unit 54$a$ is the function provided in a fellow user management unit 54. The fellow user's information storage control unit 54$a$ stores in the database server 2 (storage device), the fellow user's information associating the two users, between which, a fellow user relationship has been established. As one mode for a certain user to become a fellow user with another user, considered may be a fellow user request/approval operation performed between the users where one user sends a fellow user request to the other user via the game server 1, and the user who received the fellow user request approving such request to become a fellow user via the game server 1. As another mode, when a user, who has already been registered in the game server, invites an unregistered user, and the invited user registers in the game service, these two users who invited and who was invited are considered to be fellow users. FIG. 10 shows an example of the fellow user's information stored in the database server 2 by the fellow user's information storage control unit 54$a$.

As shown in FIG. 10, when the fellow user relationship between certain two users is established, the fellow user's information storage control unit 54$a$ stores, in the database server 2, the fellow user's information associating the user ID of the user who made the fellow user request with the user ID of the user who approved the fellow user request. Subsequently, the fellow user management unit 54 assigns a fellow user's information ID to each fellow user's information for uniquely identifying the fellow user's information, and performs fellow user management on the basis of the fellow user's information ID.

In the example of FIG. 10, the fellow user's information associating the two users; namely, the user A of the user ID="000001" who made the fellow user request and the user B of the user ID="000002" who approved that request is stored in the database server 2 as the fellow user's information of the fellow user's information ID="1". Consequently, for the user A, the user B will be a fellow user in a fellow user relationship and, for user B also, the user A will be a fellow user.

Moreover, each user can create a plurality of fellow users, and configure a fellow user group centered around each user. In the example of FIG. 10, the user A of the user ID="000001" has also establish a fellow user relationship with the users of the user IDs="000005", "000012" and "000035". Subsequently, the fellow user management unit 54 stores, in the database server 2, the information of the fellow users in a fellow user relationship belonging to the fellow user group centered around each user, and performs the fellow user management for each user.

FIG. 11A shows an example of the information related to the fellow users of each user, managed by the fellow user management unit 54 on the basis of the fellow user's information, etc., stored in the database server 2. The fellow user's information storage control unit 54a of the fellow user management unit 54 associates information related to the fellow users with the respective user IDs, and stores the association for each user ID in a predetermined storage region of the database server 2. Examples of the information related to the fellow users include information on the upper limit to the number of fellow users, user IDs of fellow users in a fellow user relationship, user IDs of users with pending fellow user requests, and user IDs of users who have received the fellow user request but have not yet approved the request. The example of FIG. 11A shows information related to one fellow user of the user with the user ID="000001". In this example, the upper limit to the number of fellow users is twelve, and the user has ten fellow users, one user with a pending fellow user request, and no users who have received the fellow user request but have not yet approved the request.

In the baseball game of this embodiment, a bonus is offered to both users who have established a fellow user relationship by becoming fellow users (for instance, maximum values of the action point and the total cost are increased by a prescribed value). Moreover, the scope of the game is such that the game can be played advantageously by cooperating with fellow players and playing the match, or the fellow players giving each other player characters, items or support. By creating fellow users, also given is an opportunity of acquiring a reinforcement point by setting a prediction point to the fellow users. By offering a merit to the user by creating fellow players within the game as described above, the user is motivated to create fellow players.

However, it is possible to set an upper limit to the number of fellow users that each user can establish a fellow user relationship with other users. As the upper limit to the number of fellow users, one common upper limit may be set to each user (for instance, 50 fellow users). Otherwise, the upper limit to the number of fellow users may be changed within a predetermined range (for instance, the range of 10 to 99 fellow users) according to each user's level of advancement in the game. In this embodiment, the upper limit to the number of fellow users changes within the range of 10 to 99 fellow users, and the upper limit to the number of fellow users increases as the user's level increases. Consequently, the user will be motivated to continue playing the game and enhancing the user's skills in order to gather more fellow users and play the game advantageously. The fellow user's information storage control unit 54a stores the upper limit to the number of fellow users of each user by associating such upper limit with the user ID, and the fellow user management unit 54 manages the upper limit to the number of fellow users of each user.

In this embodiment, in order for two users to become fellow users, one user sends a fellow user request to the other user via the game server 1. As an operation example of the fellow user request, foremost, the player who wishes to create a fellow user performs the operation of listing the fellow user candidates on the screen of the terminal device 3. Here, the user can designate the user level of the fellow user candidate. According to the user's operation described above, the game server 1 sends screen date for listing the fellow user candidates, and a screen listing a plurality of fellow user candidates is displayed on the user's terminal device 3. Here, the user checks the information on the candidates listed on the screen, selects a fellow user of one's choosing, and performs the operation for a fellow user request.

For instance, considered is a case where user A of the user ID="000001" performs an operation for sending a fellow user request to user B of the user ID="000002". As shown in FIG. 11A, according to this operation, the fellow user's information storage control unit 54a of the game server 1 associates, as the game information on the user A who made the fellow user request, the user ID="000002" of the user B who received the request with the user ID="000001" of the user A, and stores the association as a "pending user ID" in a storage region.

In addition, as shown in FIG. 12A, the fellow user's information storage control unit 54a associates, as the game information on the user B as the recipient of the request, the user ID="000001" of the user A who made the fellow user request with the user ID="000002" of the user B, and stores the association as an "not-yet-approved user ID" in a storage region. In addition, when the user B's terminal device 3 subsequently logs into the game server 1, the game server 1 notifies that terminal device 3 that a fellow user request from the user A was received.

In addition, the user B who received the fellow user request checks information related to the user A's user level and affiliated league level received from the game server 1 on the screen of the terminal device 3, and performs the operation of choosing whether to approve or refuse the user A as a fellow user. Here, when the user B performs an operation to approving the user A as a fellow user, in accordance with this operation, the fellow user management unit 54 of the game server 1 approves the fellow user relationship of the user A and the user B, and registers as shown in FIG. 10 fellow information that associates the user ID of the user A with that of the user B in the database server 2. The fellow user management unit 54 associates as shown in FIG. 11B the user ID="000002" of the user B with the user ID="000001" of the user A as the user A's game information and stores the same as a "fellow user ID", and deletes the user B's user ID from the "pending user ID".

In addition, as shown in FIG. 12B, the fellow user's information storage control unit 54a associates the user ID="000001" of the user A with the user ID="000002" of the user B and stores the association as a "fellow user ID", and deletes in a storage region the user A's user ID from the "not-yet-approved user ID". In addition, when the user A's terminal device 3 subsequently logs into the game server 1, the game server 1 notifies that terminal device 3 that the fellow user request was approved by the user B.

Next, the first upper limit management unit 61 is explained. The first upper limit management unit 61 places an upper limit to the prediction point that can be set to the roster, and has a function of setting an upper limit to the prediction point such that the larger the number of user's fellow users is, the larger prediction point is. Here, the upper limit to the prediction point that can be set to the roster may be an upper limit to the prediction point that can be set to each roster player, or the upper limit to the prediction points that can be set to a plurality of roster players. According to this embodiment, an example is given in which the upper limit is set to the prediction point that can be set to each roster player. For instance, with 10 or less fellow users, the upper limit to the prediction point is set to 5 point, with 10 to 29 fellow users, the upper limit to the prediction point is set to 10 point, with 30 to 39 fellow users, the upper limit to the prediction point is set to 15 point, with 40 to 49 fellow users, the upper limit to the prediction point is set to 20 point, and with 50 or more fellow users, the upper limit to the prediction point is set to 30 point.

Here, the larger the prediction point that can be set to the roster is, the greater the advantage to be offered is when the prediction on the activity is correct. With the configuration wherein the larger is the number of fellow users, the larger the upper limit set to the prediction point is, each user will be motivated to make more fellow users actively to obtain a greater advantage. Therefore, each user is expected to have an increased number of fellow users, which in turn vitalize the community among users, thereby vitalizing the overall game community.

As shown in FIG. 4, the game server 1 may be configured to comprise the game advancement unit 52 and an authentication unit 53.

Figure 8:
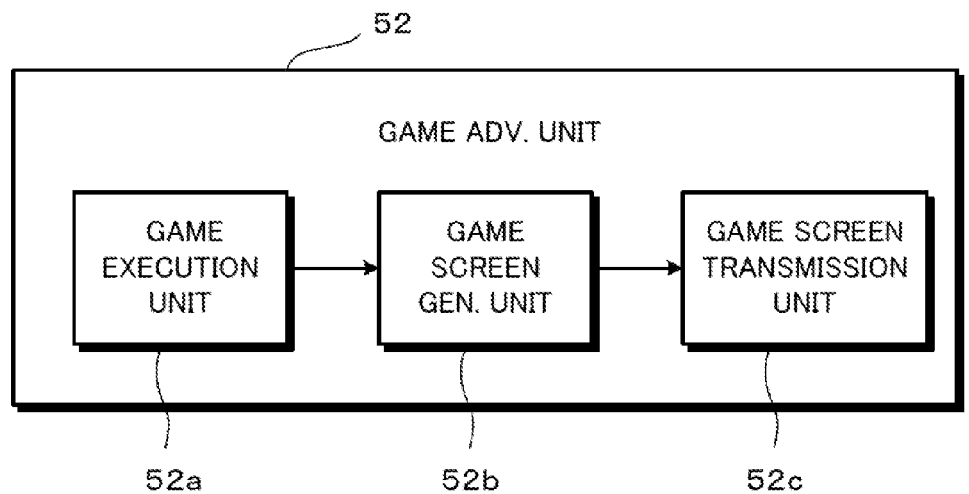
FIG. 8 is a functional block diagram showing an example of the functional configuration of the game advancement unit.

The game advancement unit 52 has the function of executing the game according to the game user's operation performed using the terminal device 3, generating game screen data according to the execution result, sending the generated game screen data to the terminal device 3, and advancing the game by displaying a game screen according to the game user's operation on the terminal device 3. As shown in FIG. 8, the game advancement unit 52 comprises a game execution unit 52a, a game screen generation unit 52b, and a game screen transmission unit 52c.

When a game screen is displayed with the web browser of the game user's terminal device 3 and the game user performs an operation for selecting character strings on the game screen, to which the selectable object or hyperlink is set, a game screen request according to the operation is sent to the game server 1 by the web browser of the terminal device 3. In the game server 1 that received the foregoing request, the game execution unit 52a executes the game by reading the game user's game information according to the request and performing arithmetic processing and data processing.

For instance, in the case where the user performs an operation of executing a match against a team of other user in the match mode, the game execution unit 52a reads out from the database server 2, the player character information (information of the player characters set to the roster, which will play in the match) of both teams corresponding to the user IDs of both users who execute the match. Then, the game execution unit 52a performs a computation for determining win/loss on the basis of the overall ability Atotal of the player characters of the both teams. As an example of the computation for determining win/loss, the team having a higher overall ability of the player characters may be simply determined to be a winning team, or a winning team may be determined on the basis of the probability calculation by setting such that the team having a higher overall ability Atotal will win at a higher probability.

The game screen generation unit 52b generates game screen data from, for instance, HTML data according to the execution result of the game execution unit 52a. The HTML data may include the image data of player characters and the like read from the database server 2. Further, the HTML data may also be embedded with a script (program) that is operated on the basis of a plug-in of the web browser of the terminal device 3. In the case where the script is executed by the terminal device 3, moving picture may be displayed in the game screen of the terminal device 3.

The game screen transmission unit 52c sends, to the game user's terminal device 3, the game screen data (HTML data and the like) generated by the game screen generation unit 52b as a response to the game screen request. The game user's terminal device 3 that received the foregoing game screen data displays the game screen on the display unit 35 using the web browser.

Next, the authentication unit 53 is explained. When a game user who wishes to receive the game service accesses (logs into) the game server 1 by operating the terminal device 3, the authentication unit 53 performs log-in authentication by determining the game participation eligibility of that game user. As an example of this authentication, there is authentication on the basis of a log-in ID and password associated with the game user ID. For instance, when the user uses the game service for the first time, a log-in ID (arbitrary English characters or email address or the like) and a password are registered in the game server 1 as member information. From the subsequent log-in to the game server 1, the user operates the terminal device 3 and sends the log-in ID and the password to the game server 1. Here, the authentication unit 53 of the game server 1 determines whether the combination of the log-in ID and password received from the user's terminal device 3 is registered, and thereby performs log-in authentication.

Moreover, when incorporating this game system into an SNS system, the member registration information (log-in ID and password) of the SNS may be used as is as the registration information for receiving the game service of this game system. For instance, when the user's terminal device 3 accesses the game site managed by the game server 1 for the first time in a state where the user's terminal device 3 is logged into the SNS server, the user's log-in ID and password may be automatically forwarded from the SNS server to the game server 1, whereby the user can register for using the game service without having to register the log-in ID and password once again.

Moreover, in order to skip the trouble of inputting the log-in ID and the password each time the user accesses the game server 1, authentication may also be performed using the HTTP cookie information (hereinafter referred to as a "Cookie"). In other words, when the user operates the terminal device 3 and performs member registration, the game server 1 issues individual recognition information corresponding to the log-in ID and password and registers that information in the database server 2, and sends that individual recognition information as a Cookie to the terminal device 3. Here, the browser of the terminal device 3 stores the received Cookie in the terminal device 3. Upon subsequently accessing the game server 1, since the browser of the terminal device 3 sends a page browsing request to the game server 1 together with the Cookie, upon receiving an access request from the terminal device 3, the authentication unit 53 can determine whether the Cookie's individual recognition number is registered, thereby perform the log-in authentication.

Moreover, in the case where the terminal device 3 is a portable phone, or a smartphone, the authentication may also be performed using the individual recognition number of the portable phone terminal which is used as the terminal device 3 (information for uniquely identifying the portable phone terminal which is separate from the phone number), or the subscriber's unique ID (information for uniquely identifying the subscriber of the terminal and an ID that is not changed even when the subscriber changes the model of the terminal). In other words, when the user operates the terminal device 3 and performs member registration, the game server 1 acquires the individual recognition number or subscriber unique ID contained in the data sent from the terminal device 3, associates the individual recognition number or subscriber unique ID with the user ID together with the log-in ID and password, and stores the association in the database server 2. In addition, upon receiving an access request from the terminal device 3, the authentication unit 53 determines whether the individual recognition number or subscriber unique ID has been registered, and thereby performs the log-in authentication. It is thereby possible omit the user's operation of inputting the log-in ID and the password upon logging into the game server 1.

By the way, in the game of this embodiment, not only the roster players, all the player characters owned by the user in the game are affected by the result (activity) of the corresponding existent players. Namely, as shown in FIG. 9, the game information change unit 59 comprises a real result reflecting unit 593, and the result (activity) of the existent player at the baseball match in the real world is reflected into parameters of the player characters in the game. For instance, as shown in FIG. 5, this real result reflecting unit 593 updates respective parameters of a condition, an individual ability ("batting power", "running ability", "fielding skill", etc.), a result (batting average", "run(s) batted in", "home run", etc.) for every prescribed time period on the basis of a result of an existent player corresponding to a player character. For instance, the real result reflecting unit 593 evaluates the activity level of the existent player at matches every date on the basis of the above evaluation value, and updates the condition parameter every day. As an example, when the evaluation value of the existent player played in a game without missing an inning is "0", the parameter of the corresponding player character is set to 20%; for the evaluation value of "1", the parameter is set to 40%; for the evaluation value of "2", the parameter is set to 60%; for the evaluation value of "3", the parameter is set to 80%; and for the evaluation value of "4", the parameter is set to 100%. The real result reflecting unit 593 updates an individual ability parameter of the corresponding player character every prescribed time period (for instance, 1 week), according to the batting rate, the number of strikeouts, etc. The real result reflecting unit 593 also updates the result itself such as an actual batting rate of the existent player every prescribed time period (for instance, 1 week).

[Operation of Game System]

Figure 18:
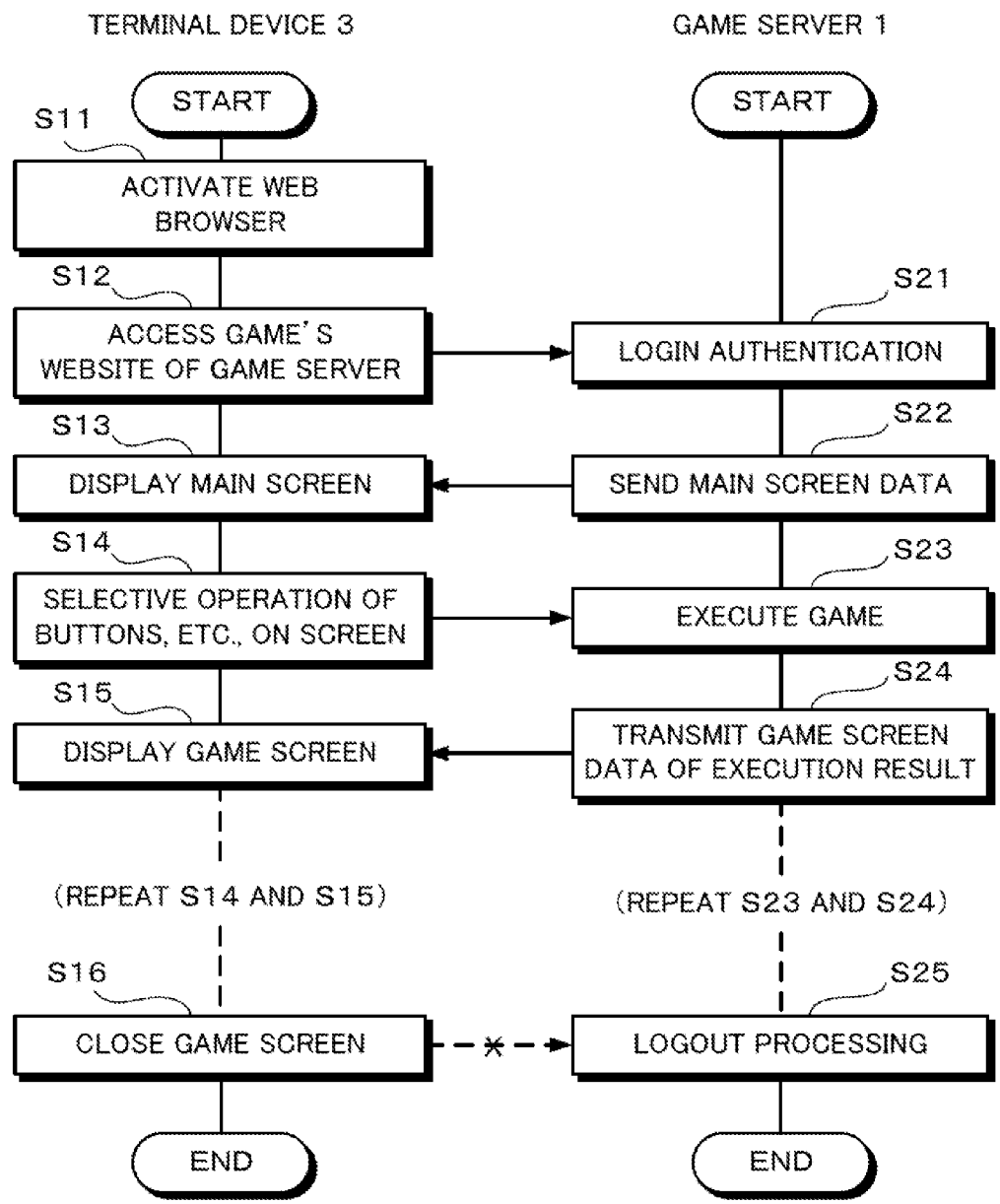
FIG. 18 is a flowchart showing an example of the operation of the game system.

An operation example of the game system according to an embodiment of the present invention configured as described above is now explained with reference to the flowchart of FIG. 18. FIG. 18 shows the processing flow of the terminal device 3 and the game server 1 when the game user operates the terminal device 3 and accesses the game server 1 to receive the game service.

When the game user is to receive the game service, foremost, the game user operates the operation input unit 40 of the terminal device 3 and launches the web browser (S11). Subsequently, the game user performs operations for accessing the game site managed by the game server 1, and an access request is thereby sent from the terminal device 3 to the game server 1 (S12). Here, the game server 1 performs log-in authentication to the access from the terminal device 3 (S21), and confirms that the access is from a game user who is registered for using the game service. Subsequently, the game server 1 sends main screen data described in HTML or the like to the terminal device 3 (S22). In a case where there is a top screen apart from a main screen, the top screen may be transmitted first. In addition, in the terminal device 3 that received the main screen data, the web browser interprets the received data, and displays the main screen on the display unit 35 (S13).

As shown in FIG. 13, on the main screen (my page), displayed are the user's game information 81 (such as a user's photograph or avatar, a user's level, an action point, a total cost, a number of player character, a reinforcement point, a prediction point, or a number of fellow users). On the main screen, also displayed are a set of buttons 82 for selecting various modes, including a "real MLB link" button 83, an "enter community" button, a "store" button, an "automatic match" button, a "player management" button, etc. Furthermore, a current date and time 85 and a time information 86 to the prediction time limit are also displayed on the main screen. In the game of this embodiment, the time information 86 indicative of the time to the prediction time limit is the important information for the user. Therefore, the time information 86 is displayed also on other screens. On the main screen, a display region 87 for fellow users is provided, and a prescribed number of photographs or avatars of fellow users are displayed. Further, by pressing a direction key 88 provided on the left hand side and the right hand side of this display region 87 for fellow users, it is possible to display photographs, etc., of the fellow users which are not currently displayed. On the main screen, also provided is a fellow user's display region 89, so that the updated information on fellow users can be checked. Here, by making a click on the fellow user's information display region 89, the region 89 is changed to a current roster display region.

Here, when the game user performs the operation of selecting an object such as selectable buttons or a hyperlink displayed on the main screen, a screen request according to the operation is sent from the terminal device 3 to the game server 1 (S14). The game server 1 that received the foregoing request executes the game by performing arithmetic processing and data processing according to the me user's operation (S23), and sends the game screen data reflecting the execution result to the terminal device 3 (S24). In addition, with the terminal device 3 that received the screen data, the web browser interprets the received data, and displays the game screen on the display unit 35 (S15).

Thereafter, in the game user's terminal device 3, S14 and S15 are repeated, and in the game server 1, S23 and S24 are repeated, and, consequently, each time the game user selects the selectable button or the like displayed on the screen of the terminal device 3, the game screen of the terminal device 3 is switched in succession so as to advance the game.

Subsequently, when the game user operates the terminal device 3 and closes the game screen (S16), the game server 1 performs log-off processing (S25). For instance, when the game user closes the web browser, the game server 1 performs the log-off processing after a session time-out.

Meanwhile, in this game system, even when the game user logs out from the game server 1, the game server 1 side can read the game information on that game user and advance the game. For instance, there are cases where another logged-in user challenges the team of a logged-off user for a match (individual match), and the game advancement unit 52 of the game server 1 reads each user's game information from the database server 2 and executes the match, and updates each user's game information upon reflecting the execution result regardless of whether the user is logged in. Moreover, in an automatic match mode, without requiring any operation of the terminal device 3 by the user, the game advancement unit 52 of the game server 1 reads each user's game information from the database server 2 and automatically executes a match. Accordingly, the results of a match that is executed while the user is logged off from the game server 1 can be later confirmed on the screen when the user subsequently accesses the game server 1.

[Operation of Game Management Device]

Figure 19:
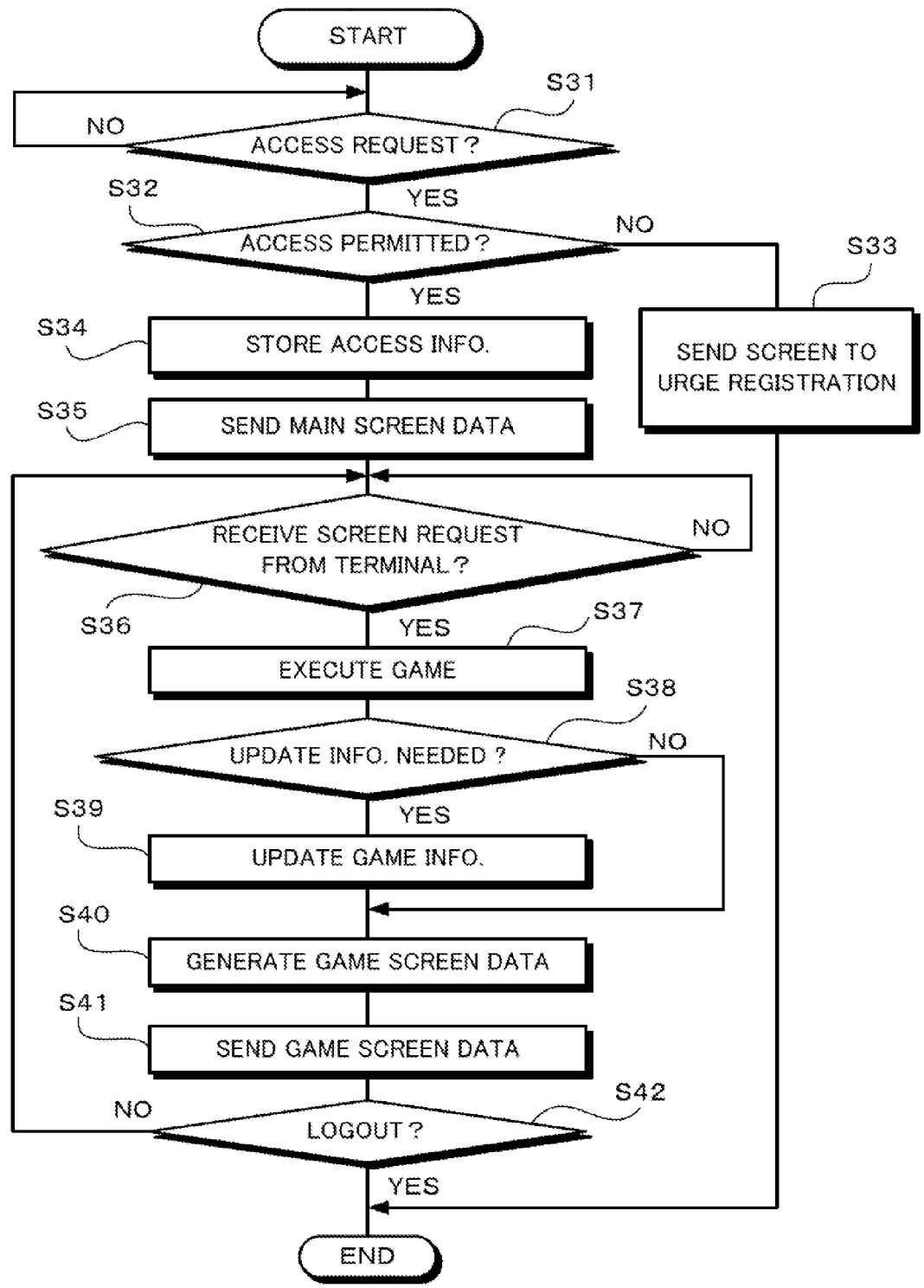
FIG. 19 is a flowchart showing an example of the game advancement processing.

A more detailed operation example of the game management device according to an embodiment of the present invention is now explained with reference to the flowcharts of FIG. 19, etc. FIG. 19 shows the processing flow of the game server 1 targeting a certain single user, and similar processing is performed to the respective users being managed by the game server 1.

As shown in FIG. 19, upon receiving an access request from the user's terminal device 3 (S31; YES), the authentication unit 53 of the game server 1 performs log-in authentication of determining whether to permit access on the basis of the log-in ID, password, etc., sent from the terminal device 3 (S32). Here, when access is not permitted (S32; NO), the game server 1 sends screen data to the terminal device 3 which urges registration for using the game service (S33). Meanwhile, when access is permitted (S32; YES), access information (log) is stored (S34).

Subsequently, the game server 1 sends the main screen data (or top screen data) to the user's terminal device 3 that was permitted access (S35). Upon subsequently receiving a screen request according to the user's game operation that is sent from the user's terminal device 3 (S36; YES), the game execution unit 52a executes the game by performing the arithmetic processing or data processing according to the screen request (S37).

Subsequently, the game server 1 determines whether it is necessary to update the user's game information due to the execution of the game (S38). When it is necessary to update the user's game information (S38; YES), the game server 1 updates the user's game information stored in the database server 2 (S39). For instance, when the user's game operation is an operation of individually competing with another user, as a result of the competition being executed, the user's game information such as the information of match result (game result) or the information of prediction point will be updated. Meanwhile, for instance, when the user's game operation is an operation of checking the results of the automatic match, the game execution processing according to that operation will only be the data processing of reading the result information on the automatic match from the database server 2, and, since there is no change in the user's game information before and after the processing, it is not necessary to update the user's game information (S38; NO).

Subsequently, the game screen generation unit 52b generates game screen data by reflecting the game execution result (S40), and the game screen transmission unit 52c sends the game screen data to the user's terminal device 3 (S41). Subsequently, whether the user's terminal device 3 has logged off is determined (S42), and the game is advanced by repeating the processing of S36 to S41 until the terminal device 3 logs out.

Figure 20:
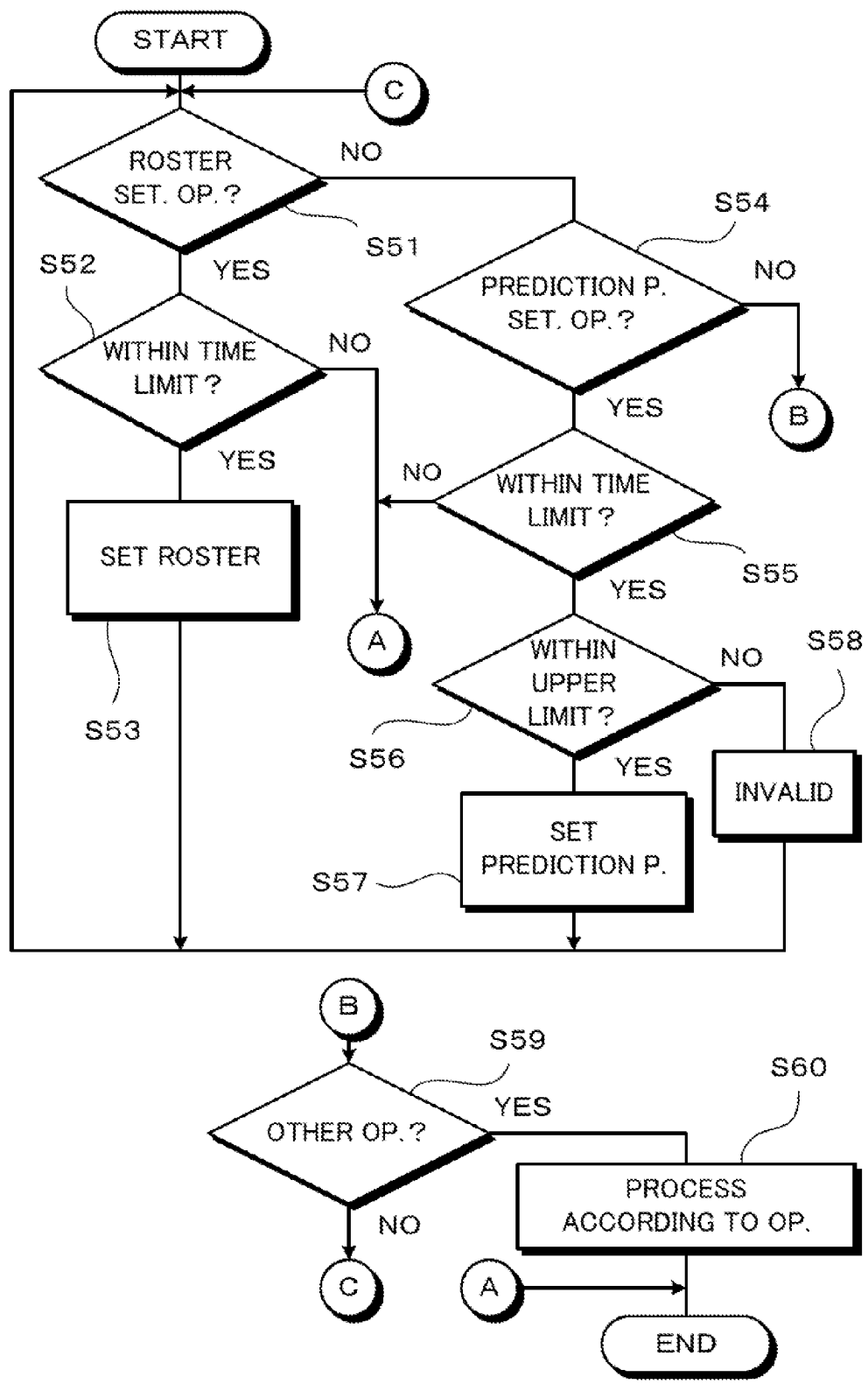
FIG. 20 is a flowchart showing an example of the processing of the game server.
Figure 21:
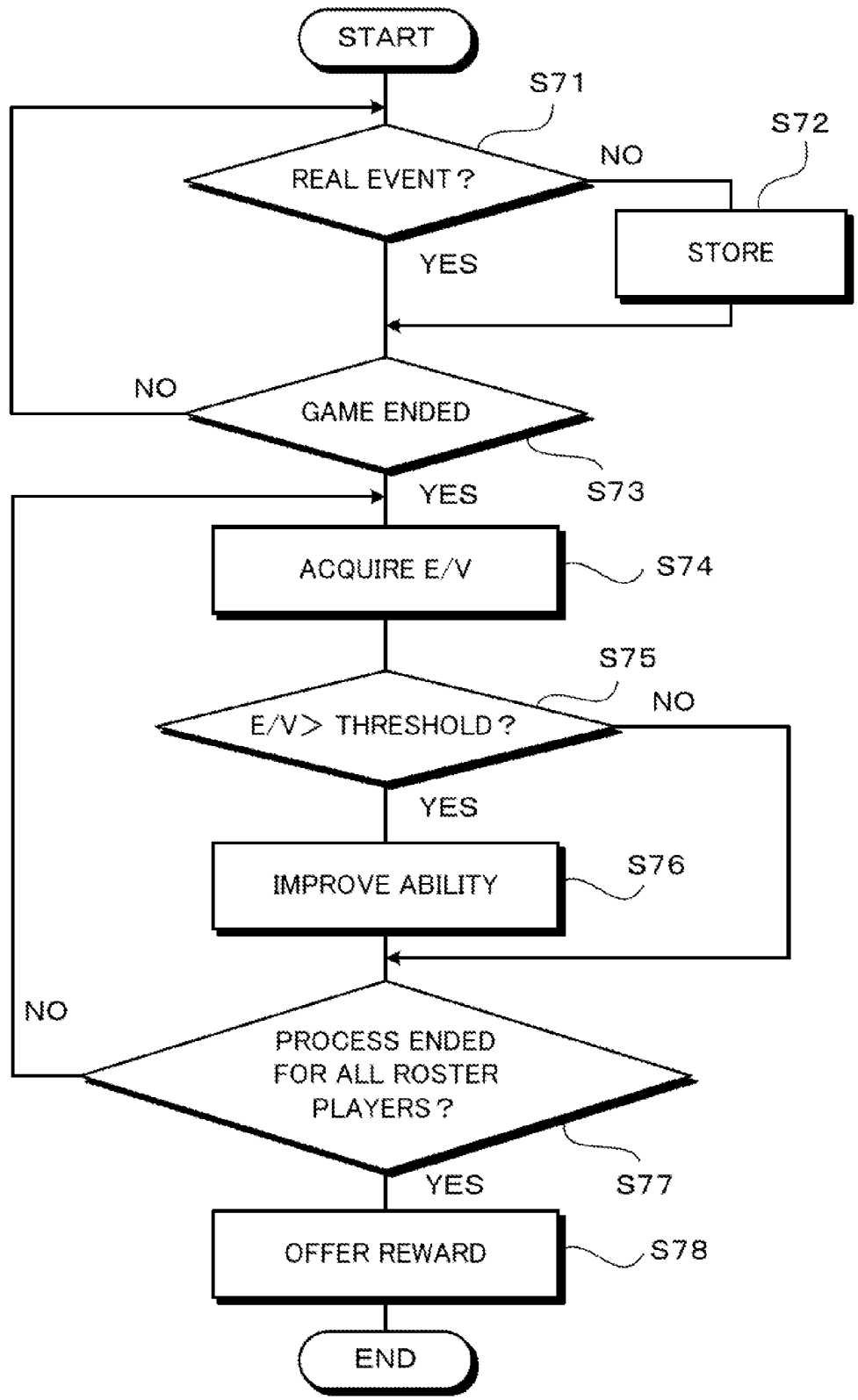
FIG. 21 is a flowchart showing an example of the processing of the game server.

Next, an example of the processing of the game server 1 in the real MLB link mode is explained in reference to FIG. 20 and FIG. 21, etc.

When the user makes an activity prediction of the existent player, the operation of setting the roster needs to be performed by the prediction time limit using the terminal device 3. The user selects the real MLB link button 83 in the main screen of FIG. 13, to display the screen of the real MLB link mode of FIG. 14. With this screen the user can check the bracket of MLB on that day. Furthermore, by selecting the date change button 114, the user can also check the past match results (game results) of MLB, or the schedule of the bracket on from the next day. Then, upon selecting the screen switch tab 111 displayed as the "applied roster", the screen is changed to the roster setting screen of FIG. 15, which allows the setting of the roster and the prediction point. The flowchart of FIG. 20 shows the processing flow when the game server 1 sets the roster and the prediction point on the basis of the user's operation on the roster setting screen.

When the user makes the activity prediction of the existent player and performs the operation of setting the owned player characters to the roster, the information on this operation is sent from the terminal device 3 to the game server 1. In the game server 1 (S51; YES) that receives the information on this operation, if the operation has been performed by the prediction time limit (S52; YES), the prior registration unit 55 sets the roster (S53). On the other hand, if the prediction time limit has already passed, and the match of MLB has started (S52; NO), the operation of the activity prediction made by the user is not accepted, and the process is terminated.

In this embodiment, it is possible to set the roster made up of 16 player characters, each time the user performs an operation of setting the roster, and S51 and S53 are repeated. By the way, when the operation of pressing the automatic setting button 131 of FIG. 15 is performed, the automatic roster setting performed in S53.

When the operation of setting the prediction point to the roster is performed in the terminal device 3 (S54; YES), if this operation has been performed by the prediction time limit (S55; YES), and the prediction point has not exceeded the upper limit to the prediction point that can be set to the roster (S56; YES), the first prediction point setting unit 60 sets the prediction points to the roster players (S57). On the other hand, when the prediction time limit has passed (S55; NO), the user's operation of setting the prediction point is not accepted, and the process is terminated. Similarly, when the prediction point has exceeded the upper limit to the prediction point that can be set to the roster (S56; NO), the operation would be invalid (S58), and the sequence goes back to step S51. These steps of S54 to S58 are executed repeatedly each time the user's operation of setting the prediction point is performed. As above-mentioned, even if the user's operation of setting the prediction point is not performed, to each roster player, a prescribed prediction point (for instance, one point) is set by default. The information on the roster players and the set prediction points are stored in the database server 2, etc., as shown in FIG. 16.

Moreover, in terminal device 3, when the operation (for instance, operation for returning to the main screen, etc.) is performed (S59; YES), the processing corresponding to that operation is executed (S60), and the process is terminated.

By the way, FIG. 20 is a flowchart with regard to the configuration wherein the prediction point can be set to the roster. However, it is also possible to apply to the constitution in which the prediction point is not used in the game. In such case, the steps S54 to S58 are omitted.

Next, the processing in the game server 1 after the prediction time limit is explained as follows in reference to FIG. 21. The flowchart of FIG. 21 shows a processing example in the case wherein when the evaluation value of the existent player corresponding to the roster player exceeds the threshold, it is determined that the existent player played an active role and a reward is offered to a user. The steps S71 to S73 of FIG. 21 are the processing in common among all the users who are managed by the game sever 1, and steps S74 to S78 are the processing to be executed by each user.

When the match of MLB has started after the prediction time limit, and a real event such as hitting of the existent player has occurred, the information on the real event is taken into the game server 1 by the real event accepting unit 56 (S71; YES). Then, as shown in FIG. 22, the real event accepting unit 56 associates the real event of the existent player with the player ID, and stores the association in the storage device of the database server 2, etc., (S72). The steps S71 and S72 are repeated until the games of all matches of MLB end. Incidentally, it may be arranged such that the information on the real event may be taken into the game server 1 at once after the match of MLB ends instead of fetching the information each time the real event occurs as in the above example.

When all matches of MLB (S73; YES) end, the evaluation value acquiring unit 58 acquires the evaluation value of the existent player corresponding to the roster player to whom the activity prediction was made (S74) on the basis of the second relationship information shown in FIG. 17. For instance, the evaluation value of the existent player who played the active role of 4 hits and 4 runs batted in is 8 point. Thereafter, it is determined if the evaluation value of the existent player exceeds the threshold (for instance, 3 point) (S75). If YES in the step S75, the ability improving unit 591 of the game information change unit 59 sets to the boost state in which the ability of the roster player corresponding to the existent player is improved only for a prescribed period (for instance, 24 hours) (S76). On the other hand, if NO in the step S75, the sequence goes to S77 without setting the roster player in the boost state. The steps S74 to S76 are performed for all the roster players set by the user.

Figure 23:
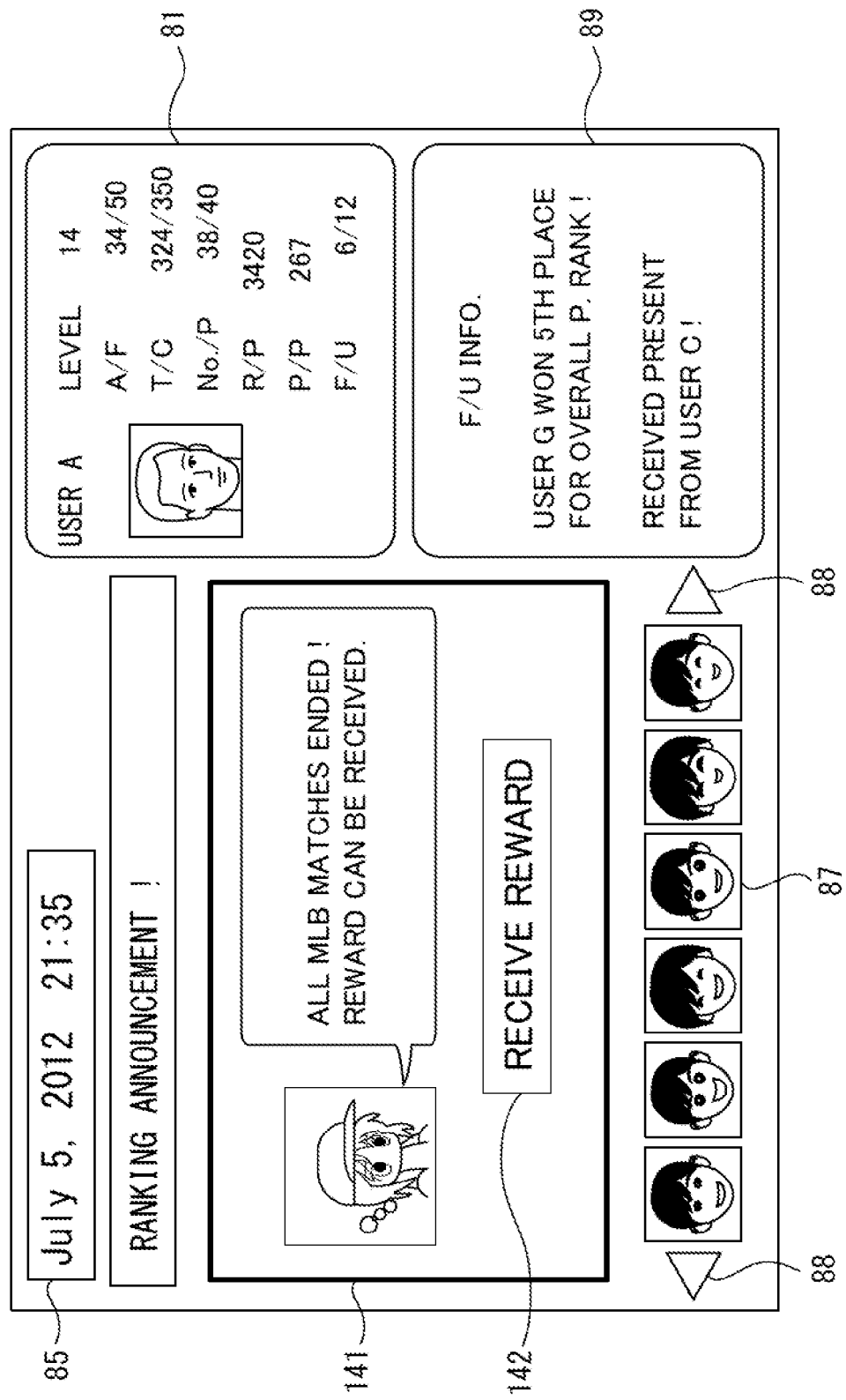
FIG. 23 is an explanatory diagram showing an example of the screen displayed after the game of the real world ends.
Figure 24:
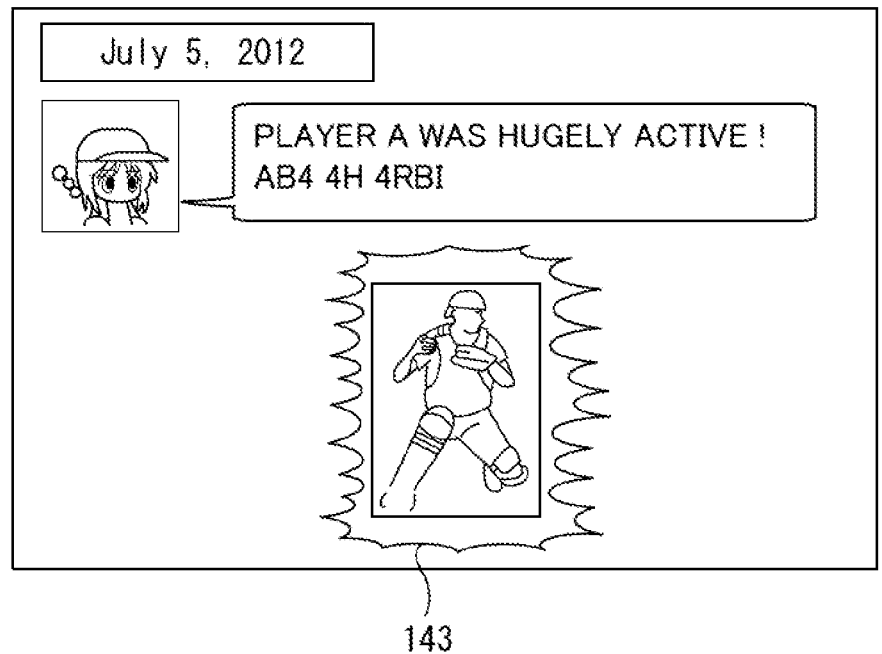
FIG. 24 is an explanatory diagram showing an example of the screen for receiving a reward.
Figure 25:
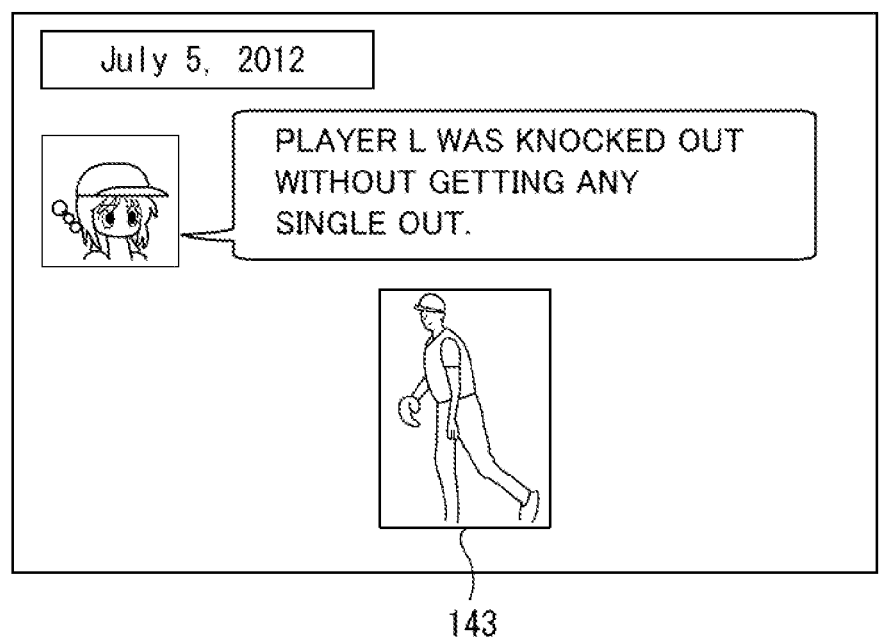
FIG. 25 is an explanatory diagram showing an example of the screen for receiving a reward.

When the processing is completed for all the roster players (S77; YES), the reward offering unit 592 executes the processing for offering the user as a reward, the reinforcement point obtained by multiplying the valuation value E of the existent player corresponding to each roster player by the number P of the prediction point set to the roster player (S78). In this case, as shown in FIG. 23, the reward offering unit 592 displays an information display window 141 on the game screen of the terminal device 3, for displaying a message such as "all matches of MLB end", "a reward can be received!". Here, when the user selects a reward receiving button 142, the screen is changed to the reward receiving screen shown in FIG. 24 and FIG. 25. FIG. 24 and FIG. 25 are examples of the screen for receiving the given reward for each roster player set by the user. In the example of FIG. 24, in which the existent player A corresponding to the roster player played such an active role that 4 hits and 4 runs batted in at bat 4 times, and as a result, the player character 143 set to the roster player is displayed with shining effect to inform the user that the player character 143 is set in the boost state. When the user, for instance, makes a click on the player character 143 on this screen, the reward offering unit 592 adds for the reward, the reinforcement point as user's ownership point. At this time, it may be configured that the sound effect is output to show that the reinforcement point has been added. In this case, it may be further configured that the sound effect is output to show that the reinforcement point has been added, and the number of the reinforcement point is displayed. Thereafter, the user can also receive the rewards for other roster players in the same manner. On the other hand, FIG. 25 shows the example of the screen when the existent player corresponding to the roster player did not play an active role (i.e., when the evaluation value is 0). In the example of FIG. 25, the existent player L corresponding to the roster player was knocked out without getting any single out. As a result, the player 143 is not set in the boost state, and thus even if the user makes a click on the player character 143, the reinforcement point would not be added.

When the games of all matches of MLB on that day end, it becomes possible to make a prediction on the existent players with respect to the match of MLB on the next day (or on the next holding expected date). Therefore, the prediction point set to the roster player is reset. Incidentally, for the roster players, the information thereof is kept as it is without being reset. Therefore, when making a prediction on the next day, it is only necessary to set the roster player which the user wishes to change.

Figure 43:
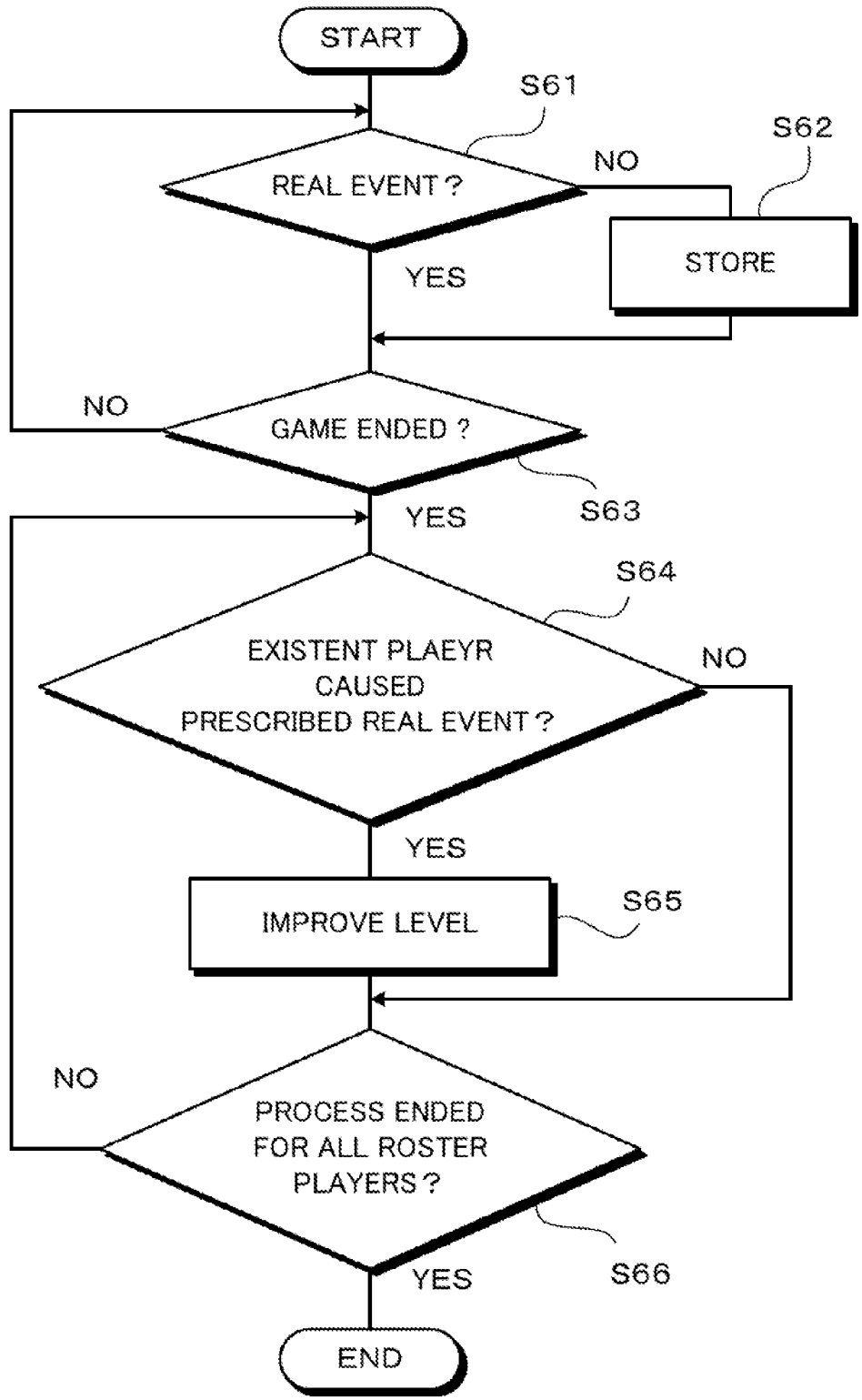
FIG. 43 is a flowchart showing another example of the processing of the game server.

In the above FIG. 21, the example of processing using the evaluation value has been given. However, as shown in FIG. 43, it may be configured to determine if the existent player corresponding to the roster player played a prescribed active role without using the evaluation value, and to give a reward to the user. In the following, the processing example of the flowchart of FIG. 43 is explained.

When the match of MLB has started after the prediction time limit, and a real event such as hitting of the existent player has occurred, the information on the real event is taken into the game server 1 by the real event accepting unit 56 (S61; YES). Then, the real event accepting unit 56 associates the real event of the existent player with the player ID, and stores the association in the storage device of the database server 2, etc. (S62). The steps S61 and S62 are repeated until the games of all matches of MLB end. Incidentally, it may be arranged such that the information on the real event may be taken into the game server 1 at once after the match of MLB ends instead of taking the information each time the real event occurs as in the above example.

When the games end for all matches of MLB (S63; YES), the game server 1 determines if the existent player corresponding to the roster player played an active role that produced a prescribed real event (single hit, two-base hit, etc.) included in the activity determination information shown in FIG. 38 as an example (S64). If YES in the step S64, the ability improving unit 591 of the game information change unit 59 sets to the boost state in which the ability of the roster player corresponding to the existent player is improved only for a prescribed period (for instance, 24 hours) (S65). On the other hand, if NO in the step S64, the sequence goes to S66 without setting the roster player in the boost state. The steps S64 to S65 are performed for all the roster players set by the user.

In FIG. 43, the reward of improving the ability of the roster in step S65 is offered to the user. However, in replace of this reward, or in addition to this reward, other reward such as a game point or an item may be offered to the user.

As described, the game management device according to this embodiment is configured to include the first relationship information storage control unit 50, the owned character storage control unit 51c (character storage control unit), the prior registration unit 55, the real event accepting unit 56, and the game information change unit 59 as shown in FIG. 37.

As described, in this embodiment, it is possible for a user to make a prediction on an existent player's activity instead of merely using in the game the information on a fact occurred in the real world one-sidedly. Then, by reflecting the activity of the existent player into the game in a form of the result of prediction, an approach can be made from the game into the real world, and an improvement in properties of the game can be realized by merging the real world into the game. However, for this activity prediction of the existent player, the user cannot make a prediction on the activities of all the existent players of MLB, and but can make a prediction only from among the existent players corresponding to the player characters owned by the user.

Therefore, if the user does not own the character corresponding to the existent player who is expected to be active, the user needs to obtain that character first in the game. In the present embodiment, it is possible to obtain the player character by purchasing it at a store using the acquired reinforcement point, or winning a match in the match mode. Namely, a novel interesting game is realized which has not so far been achieved, that is, the player character is obtained in the game, an activity prediction can be made for the existent player via the player character, and the game can be advanced advantageously according to the result of prediction.

Furthermore, the user can more enjoy also the baseball game in the real world itself by making an activity prediction of the existent player while playing a game. Namely, there is a reaction that the game can be progressed advantageously if the existent player who is expected to be active actually plays an active role. Therefore, the user who watches the baseball game taking place in the real world will more focus on the support. This is exactly a result of merging the real world and the game, and it is possible to provide a new interesting life of more enjoying the real baseball game itself while enjoying the game.

As shown in FIG. 39, the game management device of this embodiment comprises the second relationship information storage control unit 57 and the evaluation value acquiring unit 58 in addition to the first relationship information storage control unit 50, the owned character storage control unit 51c, the prior registration unit 55, the real event accepting unit 56, and the game information change unit 59. According to the foregoing configuration, it is possible to set different evaluation values according to the activity contents (for instance, single hit or home run, etc.) in the real world of the existent player corresponding to the roster player. Therefore, a fine evaluation can be made for the activity of the existent object, thereby realizing still improved game properties.

As shown in FIG. 41 or FIG. 42, the game management device of this embodiment further comprises the owned point storage control unit 51d (the prediction point storage control unit) and the first prediction point setting unit 60 in the configuration shown in FIG. 37 or FIG. 39. In this configuration, by changing the allocation for using the prediction point acquired by the user in the game, the weighting of the prediction becomes possible, and it is therefore possible to realize still more improved game properties.

Furthermore, the player characters in the game are affected by the result of the prediction made by the user beforehand. Therefore, even among the users who own the same player character, it is possible to have different abilities depending on with or without the activity prediction (whether or not the player character is set to the roster player), or the level of the prediction point additionally set to the roster player. Then, in this embodiment, 16 player characters set to the roster as they are constitute the user's team, and the user can make a match in the match mode against other team. Therefore, if the user's activity prediction is correct many times, many roster players would be set in the boost state, and it is possible to make a match against other team (the team of other user, or the computer) in the state having the user's own team power significantly improved. Hereinafter, the match mode is explained.

The match mode of this embodiment is a pseudo season mode linked with an actual game in the real world (here, the match of MLB). In the main screen of FIG. 13, by selecting a "match" button 84, the screen is changed to the "match mode screen" shown in FIG. 26. On this match mode screen, provided are a progress bar 91, a match card display box 92, an experience value display region 93, and an action power display region 94, etc. In this example, three matches are lined up, to constitute one series. When one series ends, it is changed to the next series. The user leads the user's team (roster), and fights the series out one by one. The progress degree indicative bar 91 shows the progress of the series. In the match card display box 92, displayed is the team of the opponent. In the match card display box 92 for displaying matches already matched, the match results (scores and win versus losses, etc.) are displayed. In the experience value display region 93, displayed is the experience value obtained by the user, and when the experience value reaches a prescribed value (400 in the example of FIG. 26), the level is increased. In the action power display region 94, displayed is an action point owned by the user. The action point is consumed each time a match is executed, and if the actions point is insufficient, it becomes impossible to execute a match. For instance, 10 action point is needed to execute a match. Moreover, in one match, a reference point (for instance, 5 point) and the point according to the lost point in the match (for instance, one point per loss) is consumed. The action point consumed during the game can be recovered by a lapse of time (for instance, 1 point is recovered for every lapse of 3 minutes). Also, the action point can be instantaneously recovered to the maximum by using a recovery item or raising the user's level to be accomplished when the experience value reaches a given value.

Here, it is preferable that on the day there is no game of MLB in the real world, the rate of recovery of the action point consumed during the game is set higher compared with that on the date there is a game (for instance, 1 point is recovered for every lapse of 2 minutes, instead of being recovered for every lapse of 3 minutes). This is for the following reason. That is, on the date the match of MLB is held, it is possible to enjoy both the game and the match of MLB while making an activity prediction of the existent player in the real MLB link mode. On the other hand, on the date, the match of MLB is not held, it is not possible to do so. In view of this, on the date the match of MLB is not held, the recovery speed of the action point is set higher than that on the date the match of MLB is held so that many opportunities can be ensured for playing the game in the match mode. As a result, it is possible to keep the user's concern and interest in the game, and prevent the user from quitting a game, etc.

The opponent of the user's team is other users' team or a computer. When performing the game for the first time, the user selects the user's favorite team from among the real existence teams (30 teams) of MLB in the real world, and the team selected in this state is the user's team. Namely, the user's team in the game corresponds to the existent team. Furthermore, the opponent team will be an other team than the user's team (the team corresponding to the existent team of MLB in the real world). On the example screen of FIG. 26, the "team Y" displayed in the opponent match card display box 92 of the second series game will be the next opponent's team. By selecting this opponent match card display box 92, the screen is changed to the opponent selection screen of FIG. 27.

Figure 27:
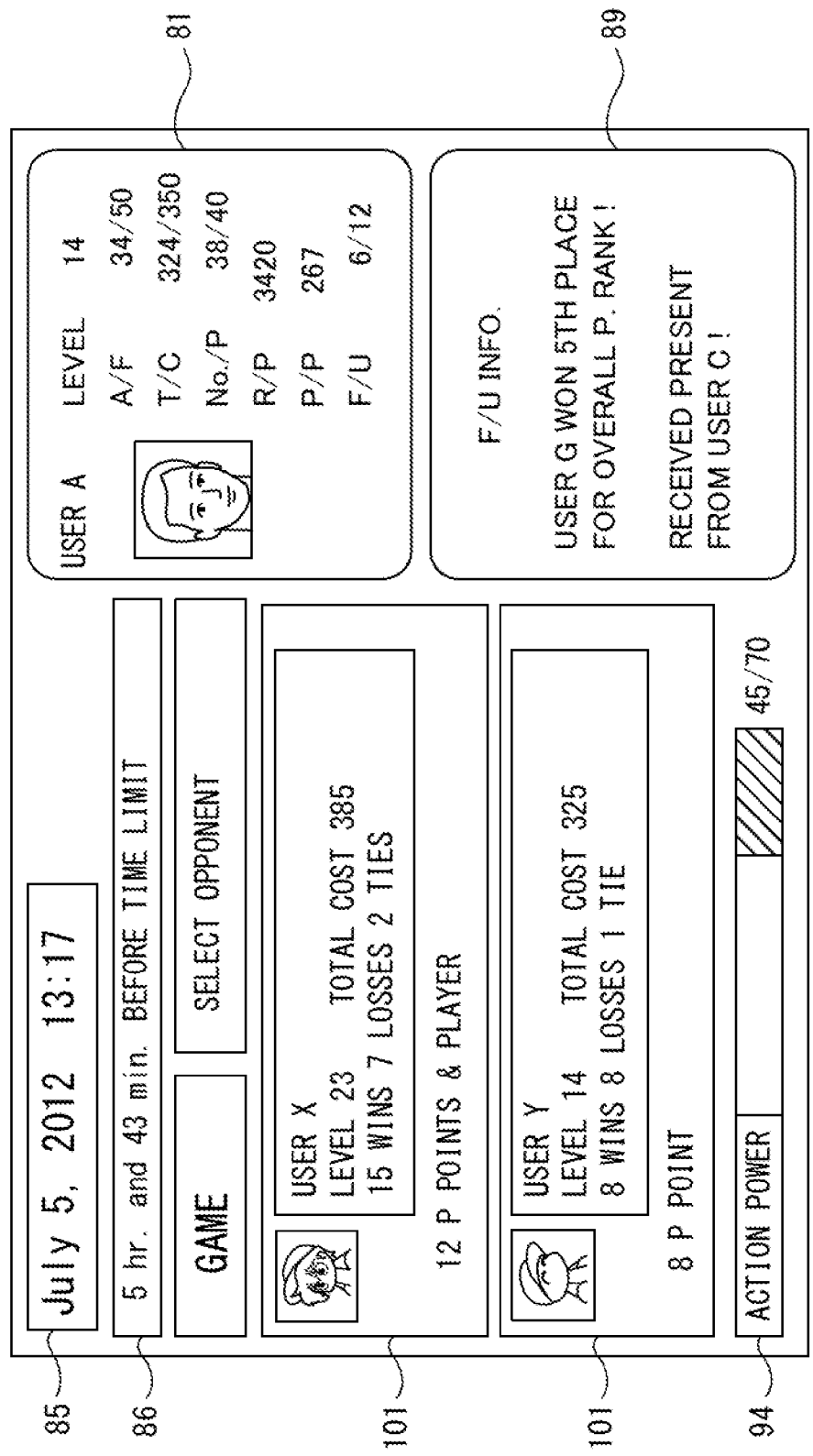
FIG. 27 is an explanatory diagram showing an example of the opponent selection screen.

On the screen of FIG. 27, the list of the opponent candidates of "team Y" is displayed. Here, displayed is an example in which opponent candidate teams (both are team Y) of two users, the user X of level 23 and the user Y of level 14 are displayed. For instance, the number of opponent lists is subjected to change among 1 to 4, for instance. Moreover, the fiction team of the computer may be displayed as an opponent candidate. By selecting the opponent whom the user wishes to match among the list of the opponent candidates, the user can make a match against the selected opponent.

Here, the strength of the opponent candidates included in the opponent candidate list varies depending on the result of the existent team of MLB in the real world corresponding to the opponent candidate team. Namely, a real link system is adopted wherein the better is the result (the league order, winning rate, number of wins, etc.) of the actual team corresponding to the opponent candidate team, the stronger is the opponent candidate. For instance, when the ranking in league of the existent team corresponding to the opponent candidate team is the 1st ranking in league, a stronger opponent than usual is displayed in the opponent candidate list. On the other hand, when the ranking in league of the existent team corresponding to the opponent candidate team is the lowest in league, a weaker opponent than usual is displayed in the opponent candidate list.

In the information display region 101 of the opponent candidate, displayed are an opponent candidate's photograph or avatar, a name, a level, a total cost, and a win versus loss record, etc., while displaying a reward offered by winning a match with this opponent candidate (the prediction point and the player character, etc.). It may be configured that a prescribed rate of the prediction point displayed here (20%, for instance) is offered to the user even when the game ended in a draw or the game is lost. Here, the reward that can be obtained at the match varies according to the strength (power) of the opponent and the stronger the opponent is, the larger the reward is. Therefore, the user can enjoy an act of forming a strategy, such as selecting a relatively weak opponent to be steady, or selecting a relatively strong opponent to aim for a larger reward, whereby the game properties can be more enhanced.

Figure 28:
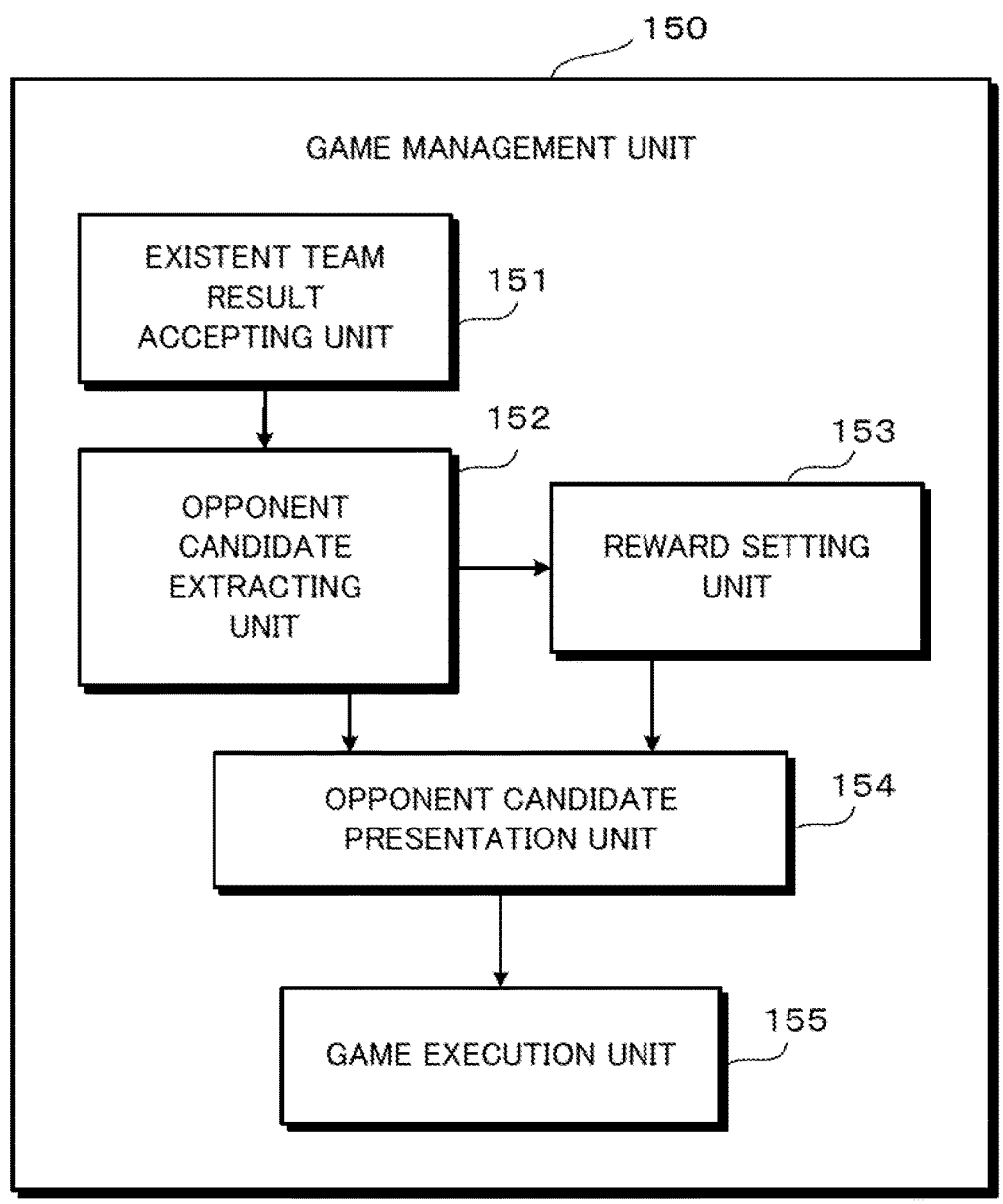
FIG. 28 is an explanatory diagram showing an example of the functional configuration of a match management unit.

The game server realizing such match mode comprises a match management unit 150 shown in FIG. 28. This match management unit 150 is a means to realize the above function of the above-mentioned game advancement unit 52. This match management unit 150 comprises an existent team result accepting unit 151, an opponent candidate extracting unit 152, a reward setting unit 153, an opponent candidate presentation unit 154, and a game execution unit 155.

The existent team result accepting unit 151 has the function of accepting the information on the actual result of the existent team in the real world and taking the information on the result of the existent team into the game server 1. The existent team result accepting unit 151 accepts the information on the latest result of the existent team by means of a manual input of information or receiving information from the information providing server as in the case of the above real event accepting unit 56.

When the opponent candidate extracting unit 152 extracts a prescribed number of opponent candidates, stronger opponent candidates are selected for the better result of the existent team corresponding to the opponent's team. In this embodiment, shown is an example in which the strength of the user and the opponent (power) is determined on the basis of total costs. The total costs are the sum of the costs of all the player characters constituting the team, which are the information indicative of the team power. For the information indicative of the power, other information such as a level or the like may be used.

For instance, the opponent candidate extracting unit 152 assigns the top two ranking teams in the league order of the existent team are assigned to the result A, the bottom two ranking teams in the league order to the result C, and assigns other teams in between to the result B, and performs an extracting processing according to these results A to C. More specifically, for instance, when the total cost of the user is Ctotal, in the case of extracting an opponent from the team corresponding to the existent team of the result B, an extraction of a candidate is performed from the candidates having a strength in a range of (Ctotal−50) to (Ctotal+50). In the case of extracting an opponent from the team corresponding to the existent team of the result A, an extraction of a candidate is performed from the candidates having a strength in a range of (Ctotal) to (Ctotal+100). In the case of extracting an opponent from the team corresponding to the existent team of the result C, strength in a range of (Ctotal−100) to (Ctotal).

The stronger is the strength (power) of the opponent candidate extracted by the opponent candidate extracting unit 152, the reward setting unit 153 sets the reward to be offered when winning the game larger. In the example of FIG. 27, the reward to be offered when winning the game with the user X in the level 23 with the total cost of 385 is gorgeous, i.e., "12 prediction point and the player character", while the reward to be offered when winning the game with the user Y in the level 14 with the total cost of 325 is "8 prediction point" only.

Moreover, the opponent candidate presentation unit 154 presents the opponent candidate to the user by sending the information on the opponent candidates (opponent candidate list) extracted by the opponent candidate extraction unit 152 to the terminal device 3 of the user. The opponent candidate presentation unit 154 also sends the information on the reward according to the strength of the opponent candidate as set by the reward setting unit 153 to the terminal device 3 of the user together with the information on the opponent candidates.

When the terminal device 3 performs an operation of selecting the opponent from among the opponent candidates presented by the opponent candidate presentation unit 154, the game execution unit 155 receives the information on that operation, and executes the processing of the match with the selected opponent.

As described, each user's team corresponds to the existent team in the real world, and when extracting the opponent candidate from among the opponent teams which are scheduled to be matched, the strength of the opponent candidates to be extracted is changed in link with the actual result of the existent team. Therefore, if the existent team has a good record, the team corresponding to the existent team in the game will be a strong opponent in the match. As a result, a novel team match in link with the real world can be realized, thereby providing a game having high amusement properties.

Furthermore, as described above, according to this configuration, if the user's activity prediction is correct many times, many roster players would be set in the boost state, and it is possible to make a match against other team in the state having the user's own team power significantly improved. Therefore, while the user's team power is improved, even when making a match against the team corresponding to the existent team of good results (namely, the relatively stronger opponent candidates are listed up), there is a good chance to win. Moreover, in the case where the relatively stronger opponent candidates are listed up, a large reward would be given if the user's team wins an opponent team from the list of such relatively stronger opponent candidates. Therefore, during the state in which the user's team power is improved, it is possible to get a golden opportunity of acquiring a big reward by actively challenging the match against a stronger team. As described, this embodiment provides high game properties that the user can play a game by developing various strategies while watching the situation in the game.

By the way, in the foregoing, explanations have been given through the case of making a plus evaluation (positive evaluation) according to the actual activity of the existent player whose activity was predicted by the user. However, it may be configured such that when the existent player whose activity was predicted by the user made a fielding error, or the like, a minus (negative) evaluation is made, and the user may become disadvantageous in the game. In order to realize this configuration, as shown in FIG. 29, the evaluation values of the second relationship information include the plus evaluation values for positively evaluating the existent player, and the minus evaluation values for negatively evaluating the existent player. In the example of FIG. 29, the plus evaluation values of (+0.5 to +4 point) are set for the real events of single hit, two-base hit, three-base hit, home run, a run batted in, stealing, strike out, no runs/inning, and the like. On the other hand, minus evaluation value of (−1 point) is set for the real event of getting three strikes, double play, making a fielding error, getting a home run, etc.

Then, when a plus evaluation value is acquired by the evaluation value acquiring unit 58, the game information change unit 59 changes the user's game information to become advantageous in the game. On the other hand, when a minus evaluation value is acquired by the evaluation value acquiring unit 58, the game information change unit 59 changes the user's game information to become disadvantageous in the game. Here, changing the user's game information to offer a disadvantage in the game indicates that various demerits are generated in the game according to the kind and the content of the game. As an example, such demerit can be a reduction in the reinforcement point by the value of the minus evaluation value. Also considered may be a demerit of reducing the ability (overall power) of the player character of the roster player corresponding to the existent player subjected to the minus evaluation for a prescribed period of time (for instance, 24 hours). Furthermore, for the game in which an item can be acquired by drawing, etc., considered may be a demerit of reducing the probability of drawing a rare item, etc., (i.e., increasing the probability of drawing a standard item having a low rarity value) only a prescribed number of time (for instance, once).

As described, by adopting such configuration that if the existent player whose activity is predicted made a fielding error, etc., the user becomes disadvantageous in the game, the feeling of linkage between the real world and the game world can be improved. With this configuration, the user may become advantageous or disadvantageous in the game depending on whether the existent player who is predicted to be active by the user plays an active role or not. Therefore, the user is expected to watch the baseball game in the real world with the feeling of higher tense, and more earnestly support the existent player who is predicted to be active. According to this configuration, it is therefore possible to realize a more attractive game with an improved integration between the real world and the game.

[Other Configuration Example of Game Management Device]

Figure 30:
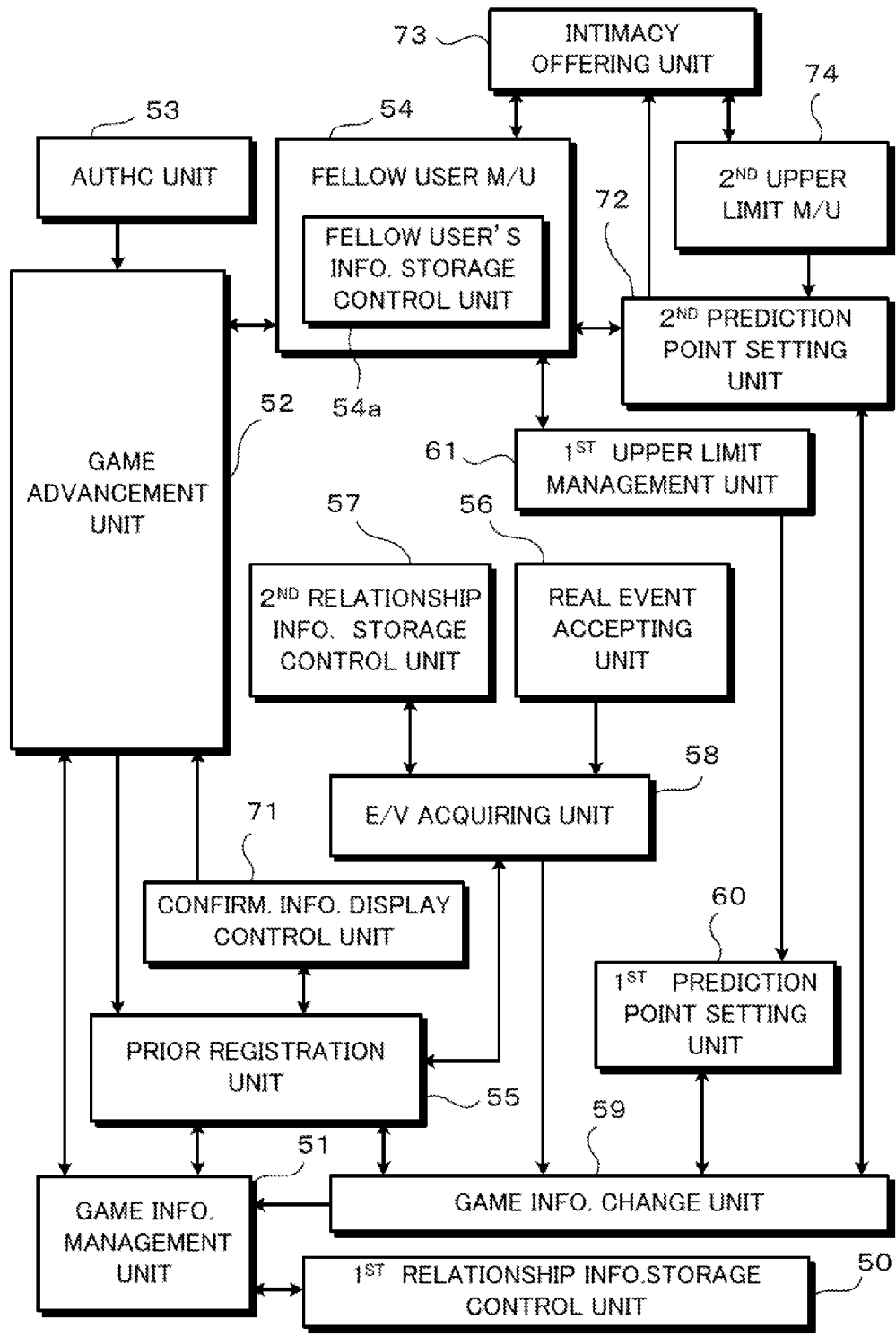
FIG. 30 is a functional block diagram showing another example of the functional configuration of the game management device.

Another configuration example of the game management device is now explained with reference to the functional block diagram of FIGS. 30, 44 and 45. Note that the same component number is given to the same configuration as those shown in the previous diagrams explained above and the explanation thereof may be omitted.

In this embodiment, it is configured to allow the user to check in the terminal device 3, the roster set by the fellow user on the basis of the fellow user's activity prediction. Then, if the user who saw the roster set by the fellow user thinks the roster reasonable, the user can set the user's prediction point to the fellow user by taking an advantage of fellow user's prediction. It is configured that if the existent player, corresponding to the fellow user's roster to which the prediction point is set by the user, plays an active role in the real world, an advantage on the game will be offered to the user according to the set prediction point. In the following, the detailed configuration of the game management device (game server 1, etc.) which realizes the foregoing configuration is explained.

Figure 44:
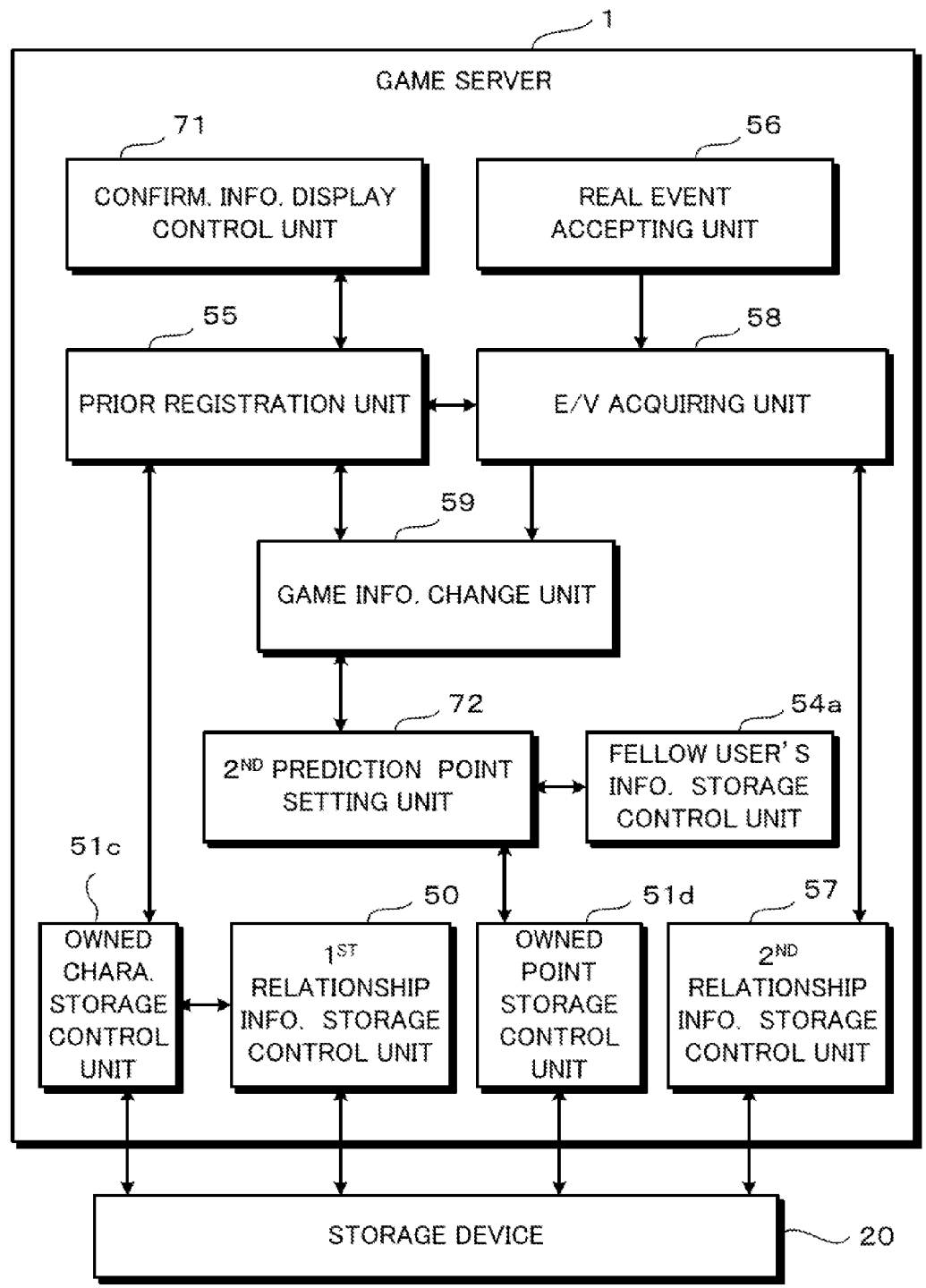
FIG. 44 is a functional block diagram showing another example of the functional configuration of the game management device.

As described, the game server 1 (game management device) of this embodiment comprises as shown in FIG. 44, a check information display control unit 71 (check information sending unit) and a second prediction point setting unit 72 in addition to the respective units of FIG. 39.

It may be also configured that the game server 1 comprises the game advancement unit 52 etc. For instance, as shown in FIG. 30, the game server 1 of this embodiment may be configured to comprise the check information display control unit 71 and the second prediction point setting unit 72, etc., in addition to respective units shown in FIG. 4.

The check information display control unit 71 has a function of displaying on the game screen, the information on the fellow user's roster when a user's operation of checking the fellow user's roster is performed, according to the information on that operation. Namely, when the operation of checking the roster set by the fellow user, as registered in the prior registration unit 55 is performed in the terminal device 3 of the user, the check information display control unit 71 receives the information on such operation and sends the information on the fellow user's roster to the terminal device 3. Then, for instance, by making a click on the fellow user's display region 87 on the main screen, the screen is changed to the fellow user's screen of FIG. 31. The user's fellow user list is displayed on this fellow user's screen. In the information display region 161 of each fellow user, displayed are a fellow user's photograph or avatar, a name, a level, total costs, the number of player characters, etc. while displaying a reward offered by winning a match with this opponent candidate (the prediction point and the player character, etc.). In the fellow user's information display region 161, provided is a set point display region 162 for displaying the prediction point set to that fellow user. Then, by pressing a "roster check" button 163 provided in the set point display region 162, the screen is changed to the screen of checking the fellow user's roster shown in FIG. 32. Namely, the check information display control unit 71 reads the information on the fellow user's roster from the database server 2 and generates the screen data (information on the fellow user's roster) shown in FIG. 32 according to the operation of the "roster check" button 163 in the user's terminal device 3, and sends this screen data to the terminal device 3.

Next, the second prediction point setting unit 72 is explained. When the user performs an operation of checking the fellow user's roster, and further performs an operation of setting the prediction point to that fellow user by the prediction time limit, the second prediction point setting unit 72 has a function of receiving the information on that operation from the terminal device and setting the prediction point to the fellow user. For instance, if the user who checked the fellow user's roster, i.e., the set order by the fellow user on the basis of the user's activity prediction can set the prediction point to that fellow user by pressing a "good prediction" button 171 if the user thinks that prediction good. Furthermore, by continuously pressing the "good prediction" button 171, the prediction point can be set for the times of pressing the button 171. The prediction point set to the fellow user is displayed in the set point display region 172. By pressing the "reset" button 173, the number of the prediction point set to the fellow user can be set to zero. The second prediction point setting unit 72 executes the processing of setting the prediction point to the fellow user according to the operation of the "good prediction" button 171 in the user's terminal device. FIG. 33 shows an example of the information of the prediction point set to the fellow user, stored in a prescribed region of the database server 2 by the second prediction point setting unit 72. As shown in FIG. 33, the information on the prediction point set to the fellow user is stored in association with the user ID of the fellow user.

Figure 32:
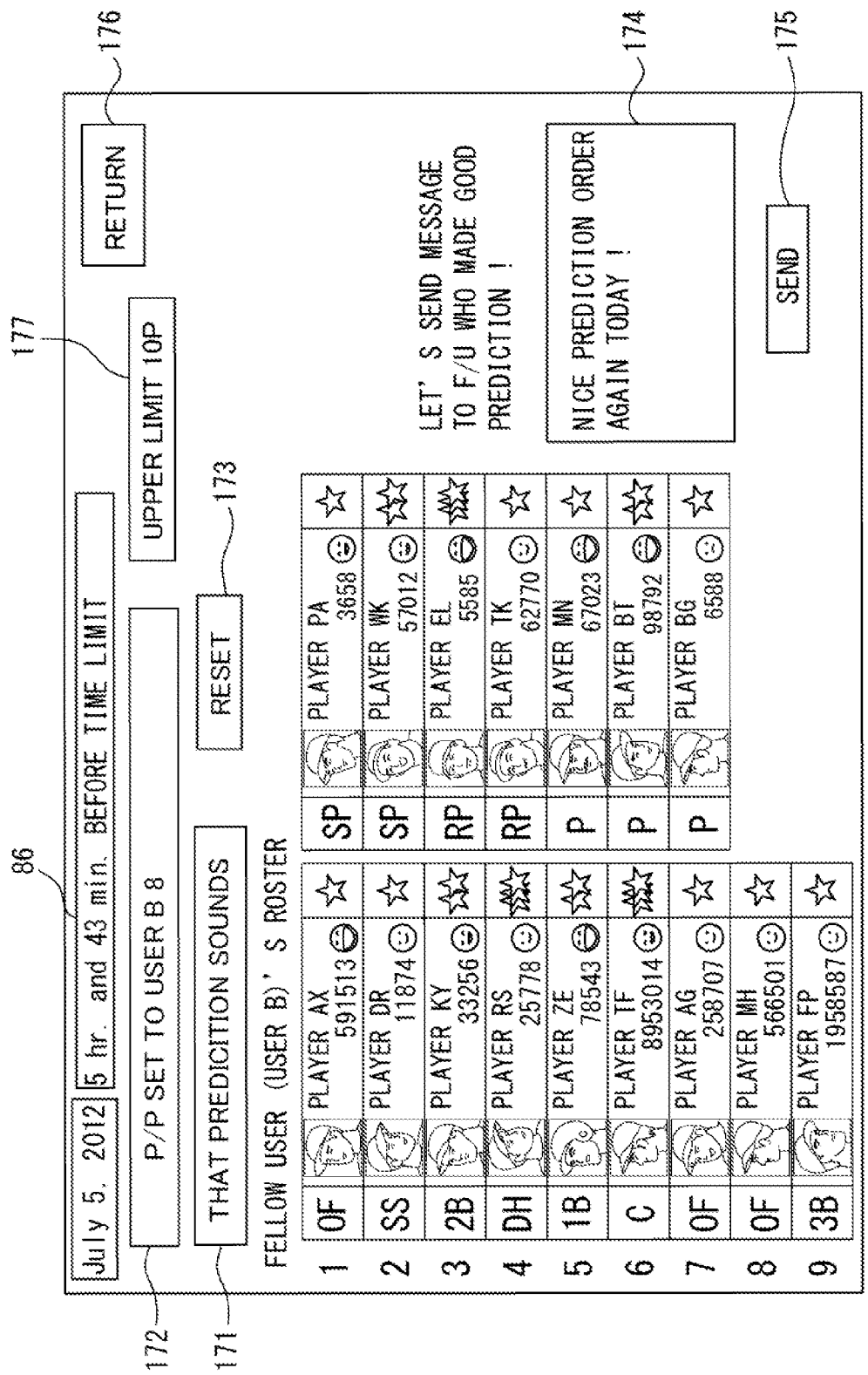
FIG. 32 is an explanatory diagram showing an example of the screen for checking the roster of the fellow user.

The screen of FIG. 32 also shows objects such as a message input region 174 and as a send button 175. In addition, the user operates the terminal device 3 to input an arbitrary message in the message input region 174, and by selecting the send button 175, a message addressed to the fellow user can be sent. The game server 1 that receives the message sent from the terminal device 3 informs the fellow user's terminal device of the transmitting end of that the message is received. FIG. 32 shows an example where the user inputs the message "good prediction order again today". For the prediction point setting side, if the message to praise the user's prediction order is received from the fellow user, that would be a motivation to construct a close relationship with that fellow user. As described, by sending a message to the fellow user on the screen where the prediction point can be set by checking the roster of the fellow user, activation of communication can be expected on the topic of the prediction order among users in the fellow user relationship.

Figure 31:
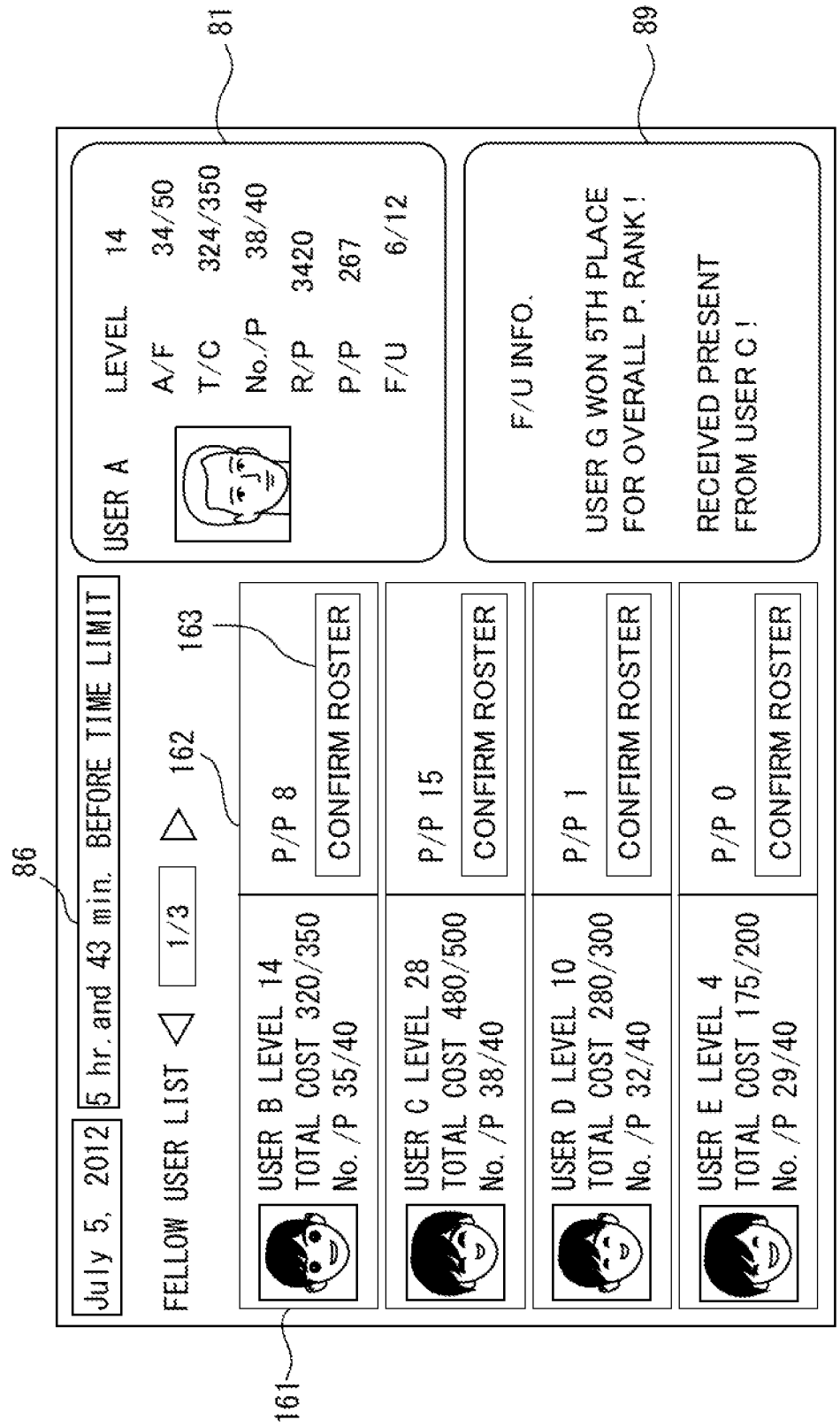
FIG. 31 is an explanatory diagram showing an example of the fellow user screen.

Further, by pressing a return button 176 on the screen of FIG. 32, the screen is changed to the fellow user screen of FIG. 31. On this fellow user screen, the prediction point set to each fellow user is displayed in the set point display region 162. The setting and changing of the prediction point to the fellow user are permitted before the prediction time limit.

Then, after the match of MLB is ended in the real world, when the evaluation value of the existent player corresponding to the fellow user's roster, to which the prediction point is set, satisfies a prescribed condition, the game information change unit 59 changes the user's game information to give a reward according to the prediction point (for instance, become advantageous in the game). Here, an example where "the evaluation value satisfies the prescribed condition" can be the case where the evaluation value exceeds a prescribed threshold. In the case where the fellow user sets a plurality of roster players like this embodiment, it may be arranged such that the prescribed condition is satisfied when the sum of the evaluation values of all the existent players corresponding to all the roster players exceeds the prescribed threshold (for instance, 30).

Next, other example of the case where "an evaluation value satisfies a prescribed condition" is explained. Here, "the evaluation value of the existent player corresponding to the fellow user's roster" is referred to as "the evaluation value obtained by the fellow user". It may be configured such that the prescribed condition is satisfied when the evaluation value obtained by the fellow user exceeds an average value of the overall game. Namely, the game server 1 calculates the evaluation values obtained by each user for all the users who performed the roster setting and an overall average of the evaluation values. Then, this overall average of these evaluation values is compared with the fellow user's evaluation value, when the latter is larger, the prescribed condition is satisfied.

As in the above example, regarding the fellow user to whom the user sets the prediction point, if the evaluation value obtained by the fellow user satisfies the prescribed condition, the game information change unit 59 gives the user an advantage according to the prediction point. For instance, the reinforcement point corresponding to the point obtained by multiplying the evaluation point obtained by the fellow user and the prediction point which the user sets to the fellow user is offered to the user. Also considered may be various advantages to be offered to a user, such as improving the ability of the player character owned by the user for a prescribed period of time, offering an item, or increasing the probability of drawing a rare item.

As described, the game management device of this embodiment comprises as shown in FIG. 44, a check information display control unit 71 and a second prediction point setting unit 72 in addition to the respective units of FIG. 39. According to the constitution of this embodiment, the prediction point can be set to the fellow user taking an advantage of the fellow user's prediction. Namely, a novel interaction within the game of taking an advantage of the fellow user's prediction can be realized, which has not been made so far. Furthermore, according to the foregoing configuration, it is possible to indirectly make an activity prediction via the fellow user's roster (predicted order) even for the existent players corresponding to the player characters that are not owned by the user. Namely, although there is a limit in the player characters owned by a single user, by making many fellow users, it is possible to increase the range of activity prediction by taking an advantage of the fellow user's prediction. According to the foregoing configuration, each user is given a motivation to actively make many fellow users. Consequently, each user has an increased number of fellow users, which in turn activates the community among users, thereby activating an overall game.

The configuration wherein the prediction point can be set to the fellow user is also applicable to the configuration without using the evaluation values, i.e., the configuration having the second relationship information storage control unit 57 and the evaluation value acquiring unit 58 omitted from the configuration shown in FIG. 44, and the same effect as above can be exhibited. In this case, when it is determined that the existent player (existent object) corresponding to the roster player (registered character) of the fellow user to whom the prediction point is set plays a prescribed active role, the game information change unit 59 changes the user's game information to offer a reward according to the prediction point. Here, it can be determined if the existent player plays a prescribed active role on the basis of the activity determination information of FIG. 38, etc.

By the way, the upper limit may be set to or the prediction point that can be set to fellow users. In the following, explained is the configuration wherein the upper limit to the prediction point that can be set to the fellow users varies according to an intimacy of the two users in a fellow user relationship.

Figure 45:
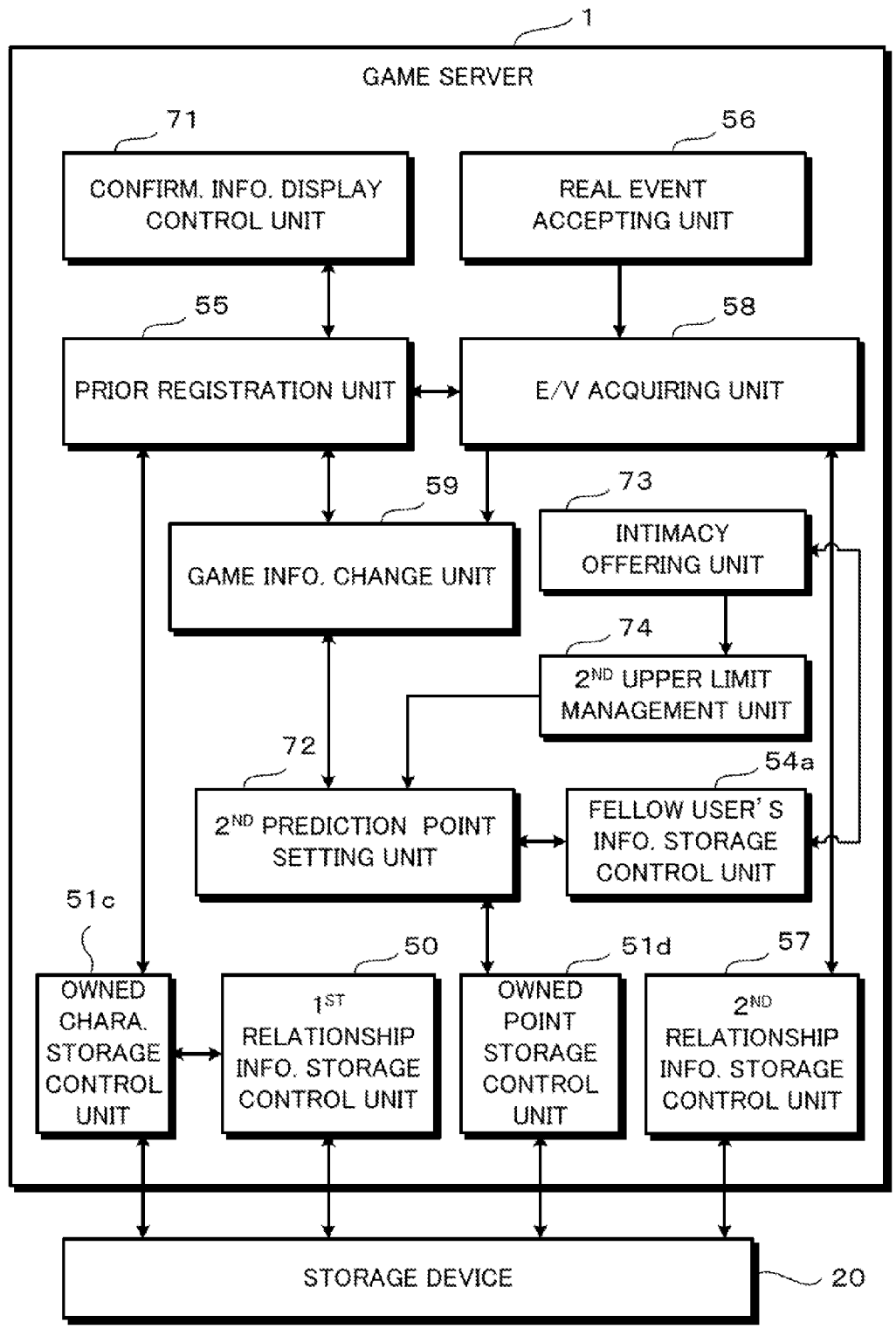
FIG. 45 is a functional block diagram showing another example of the functional configuration of the game management device.

As shown in FIG. 45, the game server 1 (game management device) of this embodiment comprises an intimacy offering unit 73 and a second upper limit management unit 74 in addition to respective units shown in FIG. 44. As shown in FIG. 30, the configuration wherein the game server comprises the game advancement unit 52 etc., may be configured to comprise the intimacy offering unit 73 and the second upper limit management unit 74.

The intimacy offering unit 73 has the function of offering an intimacy that shows closeness between two users who have established a fellow user relationship has been established when the prediction point is set from either one of the two users in a fellow user relationship to the other. The intimacy offering unit 73 of this embodiment offers the intimacy of prescribed value (for instance, 1) every time the setting of the prediction point is performed from either one of the two fellow users to the other. For instance, as shown in FIG. 34, the intimacy offering unit 73 has an intimacy storage control function which associates the intimacy offered to the two users with the fellow user's information ID for uniquely identifying the fellow user's information, and stores the association in the database server 2 (storage device).

As shown in FIG. 31, an example where the user A sets the prediction point to three users "user B, user C and user D" in a fellow user relationship is explained. When the prediction time limit has passed, and the operation of setting the prediction by the user is closed, the intimacy offering unit 73 offers the intimacy of "1" to each of the fellow user pair of user A and user B, the pair of user A and user C, and the pair of user A and user D respectively. Furthermore, in the case where the user B also sets the prediction point to the user A, an additional value of "1" for intimacy is added to the fellow user pair of user A and user B. The same can be said for the case in which the user C or the user D also set the prediction point to the user A.

The second upper limit management unit 74 sets the upper limit to the prediction point that can be set to the fellow user. The second upper limit management unit 74 has the function of setting the upper limit to the prediction point that can be set each other between the two users having the fellow user relationship such that the higher the intimacy level of the two users is, the higher the upper limit of the prediction point is. For instance, for the intimacy level of "less than 10", the upper limit to the prediction point is set to "5 point", for the intimacy level of "10 to 29 point", the upper limit to the prediction point is set to "10 point", for the intimacy level of "30 to 39 point", the upper limit to the prediction point is set to "15 point", for the intimacy level of "40 to 49 point", the upper limit to the prediction point is set to "20 point", and for the intimacy level of "above 50 point", the upper limit to the prediction point is set to "30 point". For instance, as shown in FIG. 34, the second upper limit management unit 74 associates the above upper limit information according to the intimacy offered to the two users with the fellow user's information ID, stores the association in the database server 2 (storage device), and manages the upper limit set between these two users.

In the example of FIG. 34, the intimacy is "18" for the pair of user A (user ID="000001") and user B (user ID="000002"), and the upper limit to the prediction point that can be set to the fellow user between the user A and the user B respectively is "10 point". On the other hand, the intimacy is "28" for the pair of user A and user C (user ID="000005"), and the upper limit to the prediction point that can be set to the fellow user between the user A and the user C respectively is "15 point". As described, the upper limit to the prediction point that can be set to the fellow user differs even for the same user A, i.e., to the user B, the upper limit is 10 point, while to the user C, the upper limit is 15 point according to the intimacy with the fellow user. As shown in FIG. 32, on the screen for checking the fellow user's roster and setting the prediction point, provided is an upper limit display region 177 of the prediction point that can be set to the fellow user.

As described, the game management device of this embodiment comprises as shown in FIG. 45, the intimacy offering unit 73 and the second upper limit management unit 74 in addition to the respective units of FIG. 44. According to this configuration, by taking an advantage of the prediction between users in the fellow user relationship from one to the other, the intimacy of the users can be improved, which in turn increase the upper limit to the prediction point that can be set to the other fellow user. As the upper limit increases, a larger prediction point can be set to the fellow user. Therefore, the user can acquire a greater advantage when the prediction is correct. In order to acquire a larger advantage, each user is given a motivation to actively set the prediction point to the fellow user. As a result, the communications of taking an advantage of the fellow user's prediction in the game will be increased, which in turn activates the community among users, thereby activating an overall game.

The configuration without using the evaluation values, i.e., the configuration having the second relationship information storage control unit 57 and the evaluation value acquiring unit 58 omitted from the configuration shown in FIG. 45 will exhibit the same effect as above.

As shown in FIG. 15, in the foregoing embodiment, explanations have been given through the example in which the prediction point is set via the objects, which are visualized in the game in a star shape, corresponding to the prediction point. However, an operation of setting the prediction point is not intended to be limited to the above. For instance, it may be configured such that a user inputs a numerical value of the prediction point in an input region (not shown) on the screen. Furthermore, in the above example, a plurality of objects of different values (point numbers) such as 1 unit, 5 units, or 10 units are prepared using colors or patterns, and the prediction point can be set in a unit of 5 units, 10 units, etc. However, it may be configured such that each prediction point itself has a unique additional value such as a gold point, a silver point or the like. For instance, 1 gold point has an equivalent value as 5 silver point. Therefore, in the case the prediction point set to the roster or the fellow user is the gold point, the game information change unit 59 changes the game information to be more advantageous in the game than the case the prediction point set to the roster or the fellow user is the silver point.

Moreover, in the above embodiment, explanations have been given through the configuration wherein the prediction point (the first prediction point) that can be set to the roster is the same as the prediction point (the second prediction point) that can be set to the fellow user, and the prediction point which user obtained in the game can be set both for the roster and the fellow user. Namely, in the case where the prediction point that can be set to the roster is defined to be the first prediction point, and the prediction point that can be set to the fellow user is defined to be the second prediction point, "the first prediction point=the second prediction point" in the above embodiment. In this case, there are game properties that the user obtains common prediction point in the game and within the range of the prediction point owned by the user, the user plays a game while thinking whether the prediction point should be used for the roster or the fellow user.

On the other hand, it may be configured to manage the first prediction point that can be set to the roster, and the second prediction point that can be set to the fellow user separately as a different point. In this case, the prediction point storage control unit controls the first prediction point and the second prediction point to be stored respectively in different storage regions. As an example of acquiring the first prediction point and the second prediction point in the game, the user can draw both the first prediction point and the second prediction point when the user wins a match against the opponent in the match mode, while the user can draw either the first prediction point or the second prediction point when the user loses the match.

It may be also configured such that the prediction point can be set to the fellow user but to the roster. Namely, for the variations of the activity prediction, any one of the following four configurations a) to d) may be adopted:

a) only the activity prediction by setting the roster is permitted, and any additional activity prediction using the prediction point is not permitted;

b) the activity prediction by setting the roster is permitted, and an additional activity prediction by setting the prediction point to the roster is also permitted;

c) the activity prediction by setting the roster is permitted, and an additional activity prediction by setting the prediction point to the fellow user is also permitted; and d) the activity prediction by setting the roster is permitted, and an additional activity prediction by setting the prediction point to both the roster and the fellow user is also permitted.

[Other Configuration Example of Game Management Device]

Another configuration example of the game management device is now explained with reference to the functional block diagram of FIG. 46. Note that the same component number is given to the same configuration as those shown in the previous diagrams explained above, and the explanation thereof is omitted.

In the present embodiment, explained is the configuration wherein each user is ranked in the game on the basis of the activity (the above evaluation value) of the existent player corresponding to the roster player to which each user made an activity prediction. This ranking is generated on the basis of the comparison with respect to all the users on the basis of the hitting rate of the user's activity prediction.

Figure 46:
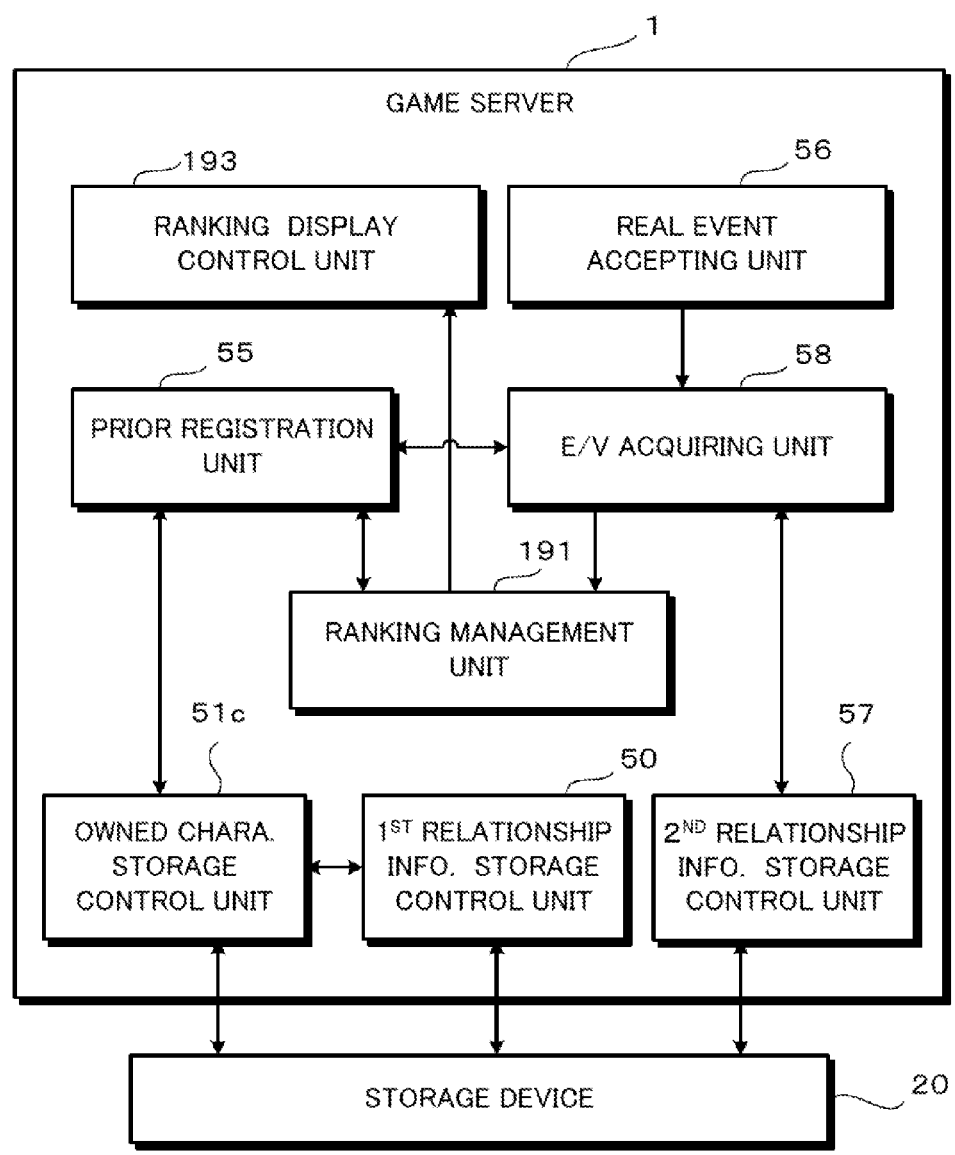
FIG. 46 is a functional block diagram showing another example of the functional configuration of the game management device.

As shown in FIG. 46, the game server 1 of the foregoing configuration mainly comprises the first relationship information storage control unit 50, the owned character storage control unit 51*c*, the prior registration unit 55, the real event accepting unit 56, the second relationship information storage control unit 57, the evaluation value acquiring unit 58, a ranking management unit 191, and a ranking display control unit 193.

The ranking management unit 191 has a function of managing the ranking of each user in the game on the basis of the evaluation value of the existent player (existent object) corresponding to the user's roster players (registered characters). In the following, this ranking management is explained.

As described, the evaluation value acquiring unit 58 acquires the evaluation value indicative of the activity of the existent player corresponding to the roster player set by the user on the basis of, for instance, the second relationship information shown in FIG. 17. For instance, in the case where the existent player played active roles of 2 single hits, one home run, 4 runs batted in, the evaluation values can be computed as:

2 (hits)×1 point+one (home run)×4 point+4 (runs batted in)×1 point=10 point (evaluation values).

After the match of MLB ends, the evaluation value acquiring unit 58 acquires the evaluation values of the existent players corresponding to all the roster players (16 roster players in the present embodiment) set by the user. The game server 1 computes a total (an average) of evaluation values of existent players corresponding to all the roster players set by the user (or the average is acceptable). This total of the evaluation values indicates the prediction hitting rate of the user's activity prediction. The total of the evaluation values is computed for the roster players of all the users.

The ranking management unit 191 tallies the ranking created by comparing the totals of the above-mentioned evaluation values (prediction hitting rate) for all the users.

Next, another example in which the second relationship information storage control unit 57 stores the second relationship information in the storage device 20 is shown in FIG. 47 to FIG. 49. In the following, an example of managing the ranking using evaluation values acquired on the basis of the above second relationship information is explained.

In the second relationship information of FIG. 47 to FIG. 49, the correspondence relationship between the real event and the evaluation value is determined by dividing into fielders (FIG. 47), starting pitchers (FIG. 48), and relief pitchers (FIG. 49). The real event indicates the activity content in the real world of the existent player. The evaluation value indicates the level of activity of the existent player. This evaluation value may be referred to as another name used in the game. In this embodiment, the evaluation value is referred to as a "basic point".

The evaluation values indicative of the level of activity of the existent player are divided into five activity levels of 1 to 5 (basic point of 15, 30, 60, 120 and 240). To the existent player, any of the basic point of 15, 30, 60, 120 and 240 is offered according to the existent player's activity level. As shown in FIG. 49, there is no activity level 5 only for the relief pitcher. However, the level 5 may be provided for the relief pitcher. It may be also configured such that a bonus point is added for the existent player who played a special activity such as hitting three or more home-runs.

As shown in FIG. 47, when the existent player who is a fielder produces at least any one of the real events (active level 1) of "one hit", "stealing", and "four balls" in the game in the real world, the evaluation value of the existent player will be "15 basic point". When the existent player produces at least any one of the real events (active level 2) of "2 hits", "2 stealing", and "a run batted in" in the game in the real world, the evaluation value of the existent player will be "30 basic point". When the existent player produces at least any one of the real events (active level 3) of "three or more hits", "2 runs batted in", "3 stealing", and "a home run" in the game in the real world, the evaluation value of the existent player will be "60 basic point". When the existent player produces at least any one of the real events (active level 4) of "2 or more home runs", "3 or more runs batted in", and "game winning runs batted in", in the game in the real world, the evaluation value of the existent player will be "120 basic point". When the existent player produces at least any one of the real events (active level 5) of "four or more runs batted in", and "a cycle hit", in the game in the real world, the evaluation value of the existent player will be "240 basic point".

Here, an example in which a certain existent player played an active role of 2 hits and four runs batted in is explained. According to the second relationship information of FIG. 47, the real event of 2 hits is in the activity level 2, and the real event of 4 runs batted in is in the activity level 5. In this case, the highest activity level "activity level 5" is applied, and the evaluation value of the existent player is set to "240 basic point". As explained, depending on the real events (content of activity) produced by the existent player, they may fall under a plurality of activity levels. In this case, an evaluation value is determined by applying the highest activity level. The foregoing process of determining an evaluation value is executed by the evaluation value acquiring unit 58.

Additionally, also in the case of using the second relationship information on a starting pitcher shown in FIG. 48 and the case of using the second relationship information concerning the relief pitcher showed in FIG. 49 was used, the evaluation value is determined on the basis of the activity level of the existent player in the same manner as the second relationship information on the fielder shown in FIG. 47.

Then, the game server 1 computes a total of the evaluation values (prediction hitting rate) of the existent players corresponding to all the roster players set by the user. FIG. 50 shows an example of the roster player (user ID="000001"). In the example of FIG. 50, the total of the evaluation values of the existent players corresponding to respective roster players (roster numbers 1 to 16) is "780 basic point".

Further, the ranking management unit 191 tallies the ranking created by comparing the totals of the evaluation values for all the users. For instance, as shown in FIG. 51A, the ranking management unit 191 stores in the storage device 20 (database server 2, etc.) the total of the evaluation values in association with user IDs of respective users, and manages the ranking in the same by arranging them in a descending order or an ascending order.

Here, the ranking management unit 191 manages not only the ranking with respect to all the users in the game, but also the ranking among the fellow users (the ranking among the user in fellow user relationship with respect to the user and the user's fellow user).

As described, it may be configured that the evaluation value of the existent player is acquired to manage the ranking using any of the second relationship information shown in FIG. 17, and the second relationship information shown in FIG. 47 to FIG. 49.

Figure 52:
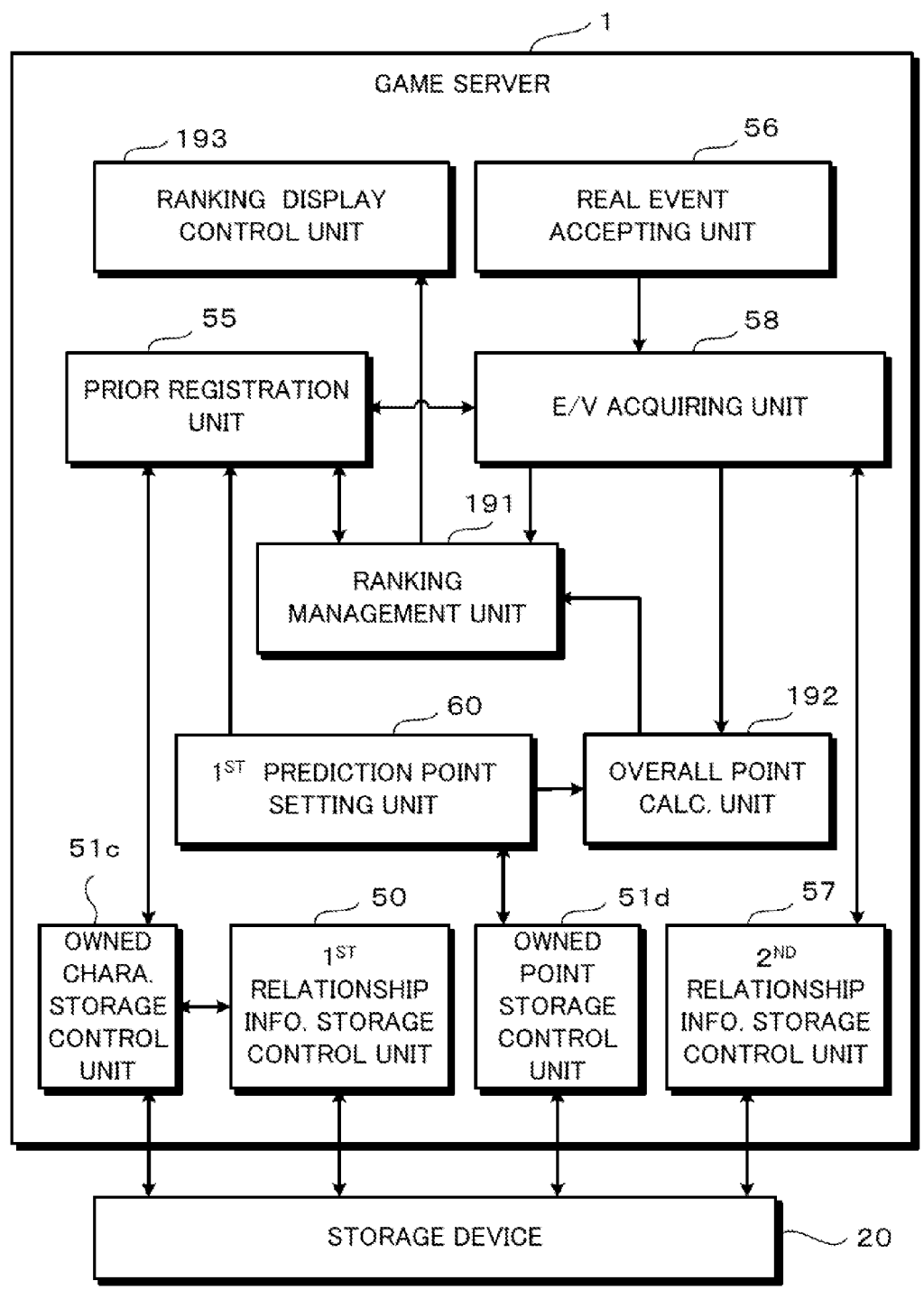
FIG. 52 is a functional block diagram showing another example of the functional configuration of the game management device.

Next, explained is the configuration of managing the ranking in the game in consideration of the prediction point set to the roster by the user. As shown in FIG. 52, the game server 1 of this configuration comprises the owned point storage control unit 51d (the prediction point storage control unit), a first prediction point setting unit 60 and an overall point calculating unit 192 in addition to the respective units of FIG. 46.

Here, the owned point storage control unit 51d and the first prediction point setting unit 60 have been explained. The overall point calculating unit 192 has a function of computing an overall point of the registered character on the basis of the evaluation value (basic point) of the existent player corresponding to the roster player in view of the prediction point set to the roster player.

The overall point calculating unit 192, for instance, multiplies the evaluation value of the existent player corresponding to the roster player and the prediction point set to the roster player to compute the overall point. FIG. 50 shows an example of computing an overall point using an example of the roster of the user ID="000001". For instance, the evaluation value of the player (player ID=0057) corresponding to the roster player (roster number=1) is 60 basic point, and the prediction point set to this roster player is 15 point. Therefore, the overall point of the roster (roster number=1) is 60×15=900 point. Similarly, the overall point corresponding each of the roster players (roster numbers 2 to 16) is also computed by multiplying the evaluation value and the prediction point.

Then, the game server 1 computes a total (the hitting rate of prediction in consideration of prediction point) of overall points of all the roster players set by the user. In the example of FIG. 50, the total of the overall points of respective roster players (roster numbers of 1 to 16) is "2235 point".

Then, the ranking management unit 191 tallies the ranking as a result of comparing the totals of overall points with respect to all users. For instance, as shown in FIG. 51B, the ranking management unit 191 associates the respective totals of the overall points with the respective user IDs of the users, and stores the associations in the storage device 20 (database server 2, etc.), and arrange them in a descending order or an ascending order to manage the ranking in the game.

Figure 53:
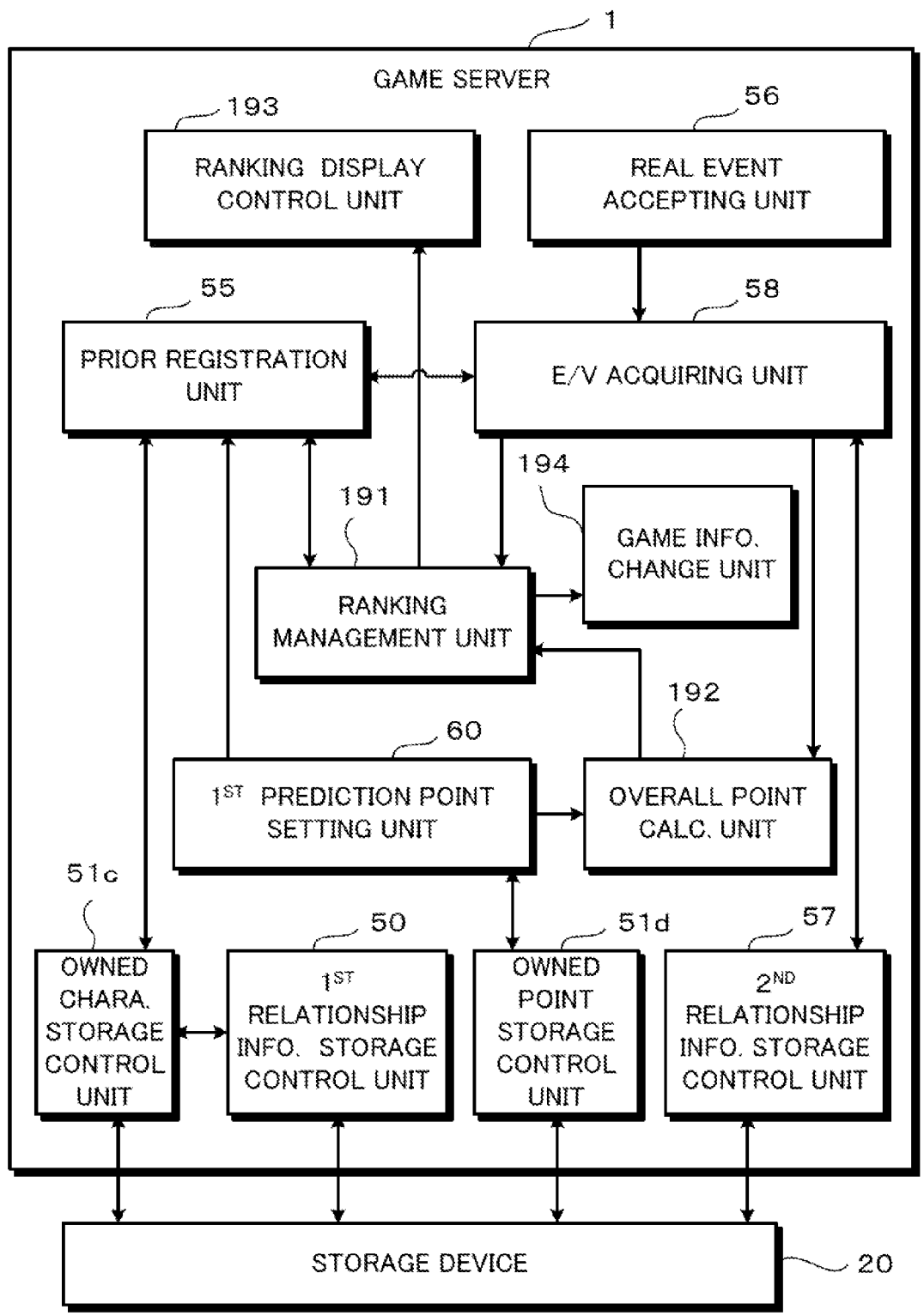
FIG. 53 is a functional block diagram showing another example of the functional configuration of the game management device.

As shown in FIG. 53, it may be configured that the game server 1 comprises a game information change unit 194 for changing the user's game information to offer a reward, on the basis of the ranking of the user in the game, managed by the ranking management unit 191. Here, the ranking of the user in the game, managed by the ranking management unit 191 can be the ranking on the basis of the evaluation value (basic point), or the ranking on the basis of the overall point, or can be the ranking on the basis of the cost performance (to be explained later). The game information change unit 194 changes the user's game information to offer a reward, for instance, with respect to the users whose ranking is within the top nth or within the top m % of all the users in the game, managed by the ranking management unit 191.

Here, for the reward, considered may be various rewards such as offering the user an item, a player character or a point, or improving the ability of the player character owned by the user only for a prescribed period of time, or increasing the probability of drawing a rare item.

Furthermore, as shown in FIG. 46, FIG. 52 and FIG. 53, the game server 1 comprises a ranking display control unit 193 for displaying the ranking information managed by the ranking management unit 191 on the game screen. When an operation of checking the ranking is performed by the user's terminal device 3, the ranking display control unit 193 performs a display control of displaying the ranking information on the game screen according to the information on the operation. That is, the ranking display control unit 193 sends the ranking information (game screen data for displaying the ranking) to the user's terminal device 3.

Here, a display example of the ranking display controlled by the Ranking display control unit 193 is explained. On the game screen shown in FIG. 14, by selecting the "ranking" tab in the screen switch tab 111, the ranking display control unit 193 sends the ranking screen data shown in FIG. 54 to the terminal device 3.

Figure 54:
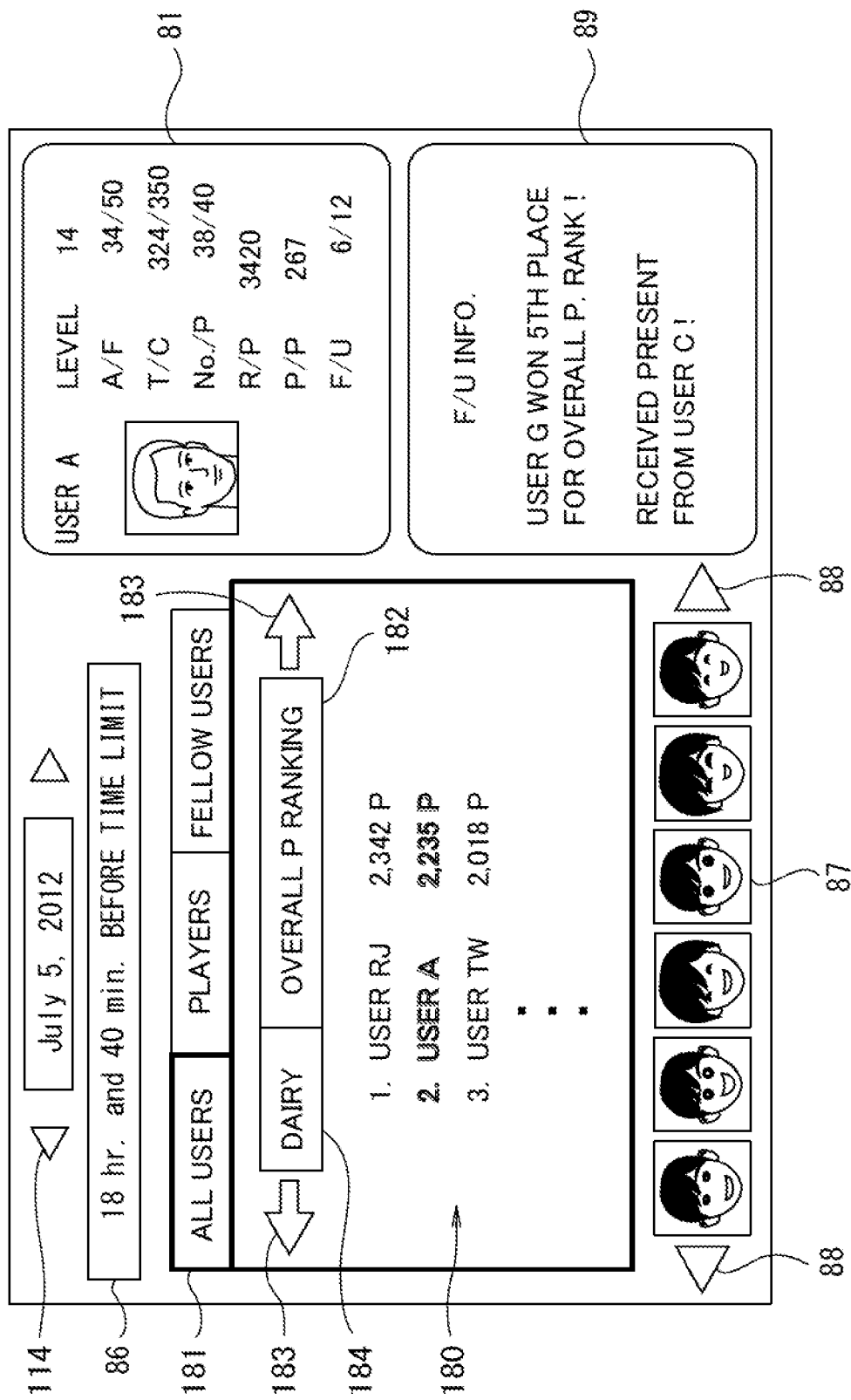
FIG. 54 is an explanatory diagram showing an example of a ranking screen.

On the ranking screen, provided is the ranking display region 180 where respective types of ranking managed by the ranking management unit 191 are to be displayed. In this embodiment, any one of the three types of rankings, i.e., "the basic point ranking", "the overall point ranking" and "the cost performance ranking" is displayed in the ranking display region 180. In the ranking type display region 182 of the ranking display region 180, the currently selected ranking (any one of the above three kinds of rankings) is displayed. On the screen of FIG. 54, shown is an example where "the overall point ranking" is displayed. The display of these three types of rankings can be switched by selectively operating arrows 183 displayed on the right hand side and on the left hand side of the ranking type display region 182.

Here, "the basic point ranking" is a ranking on the basis of the above-mentioned evaluation value (basic point). In "the basic point", the magnification on the basis of the prediction point is not included. Therefore, "the basic point ranking" is a ranking purely on the basis of the activity level (prediction hitting rate) of the existent player corresponding to the roster player.

On the other hand, "the overall point ranking" is a ranking on the basis of the above-mentioned overall point computed by multiplying the evaluation value (basic point) and the prediction point. Namely, "the overall point ranking" is a ranking on the basis of the prediction hitting rate including the weighting of the prediction on the basis of the prediction point. Furthermore, in the configuration wherein offered to the user is a reinforcement point of a value computed by multiplying the evaluation value E of the existent player corresponding to the roster player and the number P of the prediction point set to the roster player, the overall point is identical with the reinforcement point obtained by the user. Therefore, "the overall point ranking" is also a ranking of computing reinforcement point acquired by the user.

On the other hand, "the cost performance ranking" is a ranking on the basis of "the cost performance (hereinafter referred to as CP)" computed by dividing the evaluation value (basic point) of the existent player corresponding to the roster player by the cost. As described, to the player character (the existent player corresponding to the player character), a parameter "cost" is set according to the ability level (see FIG. 5). It can be said the higher is the cost of the player character, the higher is the activity expectation in the real world of the corresponding existent player. The "CP ranking" is a basic point per cost obtained by dividing "the basic point" by "the cost", and therefore can be an index indicative of an efficiency of acquiring basic point.

FIG. 50 shows a computation example of the CP using an example of the roster (user ID="000001"). For instance, the evaluation value of the player (player ID=0057) corresponding to the roster player (roster number=1) is "60 basic point", and the cost of the player character as the above roster player is "20". Therefore, the CP of the roster (roster number=1) is 60/20=3.0. Similarly, the CP corresponding to each of the roster players (roster numbers 2 to 16) is computed by dividing an evaluation value by cost.

Then, the game server 1 computes the total of CPs of all the roster players set by the user. In the example of FIG. 50, the total of CPs of respective roster players having the roster numbers 1 to 16 is "86.0". Then, the ranking management unit 191 tallies the ranking comparing totals of CPs targeting all the users, and manages "the CP ranking".

Furthermore, in this embodiment, the tallying time period for the ranking can be selected as described among four periods of "daily", "weekly", "monthly" and "season". As shown in FIG. 54, in the tallying time period display region 184 of the ranking display region 180, the currently selected tallying time period (any one of the above four kinds of tallying time period) is displayed. On the screen of FIG. 54, shown is an example where "the overall point ranking" is displayed. For instance, by selecting the tallying time period display region 184, the pull-down menu opens, and either one of the above-mentioned four kinds of tallying time periods can be selected.

Moreover, on the ranking screen of FIG. 54, a ranking target player selection tab 181 is displayed. The ranking target player selection tab 181 includes three tabs of "all users", "players", and "fellow users", and by selecting any of the tabs, the ranking target player can be switched. FIG. 54 is an example of the screen when the all user tab is selected.

The all user ranking targeting "all users" is a ranking targeting all the users who play a game. "The basic point ranking", "the overall point ranking", and "the CP ranking" are displayed all targeting "all users". Furthermore, the ranking information such as user himself/herself, or the names of fellow users are high-lighted. For instance, as shown in FIG. 54, user's name etc., are high-lighted in thick characters, or may be high-lighted by changing a character color or font type, or adding a sign or an underline, or the like.

Figure 55:
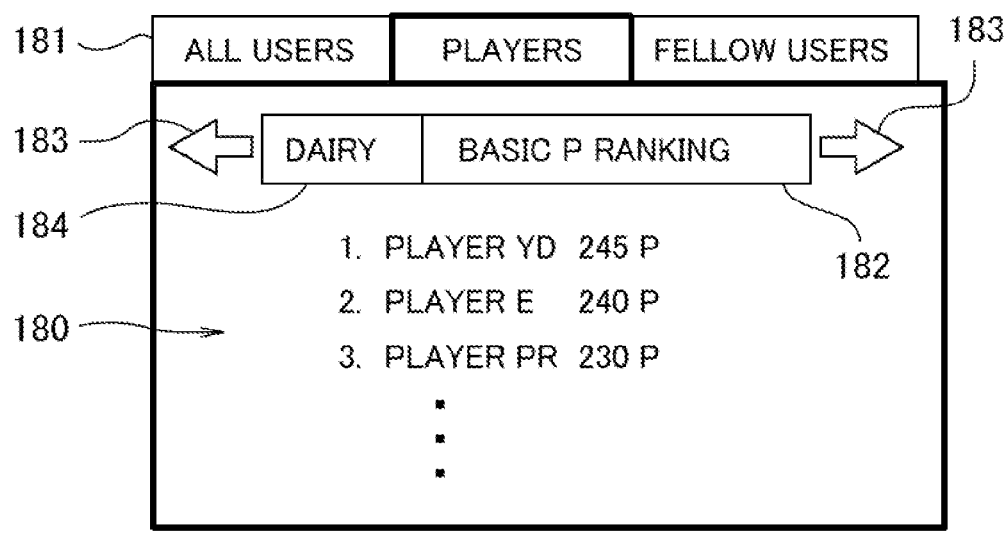
FIG. 55 is an explanatory diagram showing an example of a player ranking screen.

On the other hand, the player ranking targeting "players" is a ranking targeting existent players who acquire basic points among all the existent players of MLB. Since this ranking is targeting players, the player ranking is only for "the basic point ranking", and "the CP ranking", and there is no player ranking for "the overall point ranking". FIG. 55 shows an example of the display screen of the player ranking. The ranking information of the existent player corresponding to the roster player set by the user is high-lighted. As a result, for instance, it can be recognized on the screen if high ranking existent players are set to the roster players by the user. In this ranking, it is possible to check the existent players who actually played an active role, and therefore, this ranking can be used as the information for making activity predictions in future games.

Figure 56:
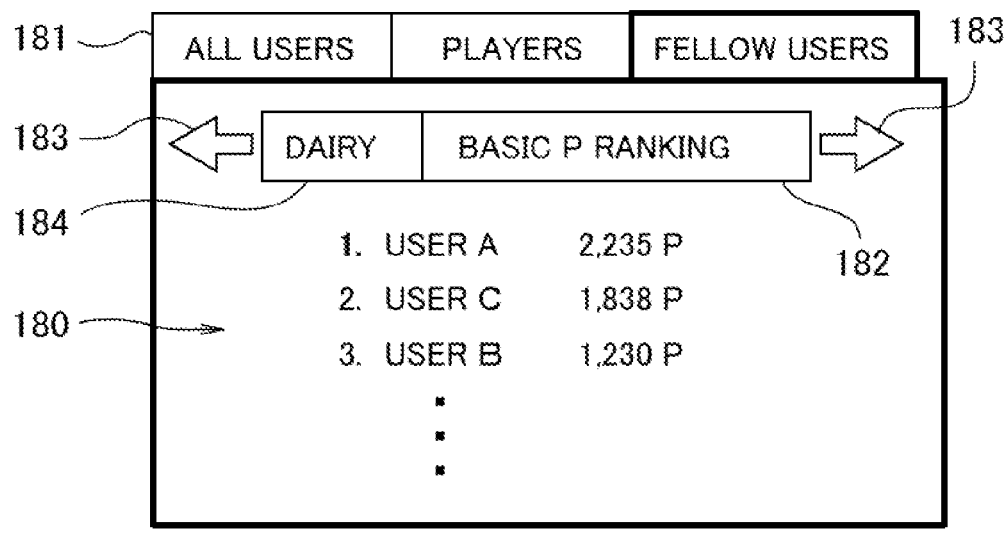
FIG. 56 is an explanatory diagram showing an example of a fellow user ranking screen.

On the other hand, the fellow user ranking targeting "fellow users" is a ranking targeting only the user's fellow user group of the user. Any of "the basic point ranking", "the overall point ranking" and "the cost performance ranking" is displayed as the fellow user ranking. FIG. 56 shows an example of the display screen of the fellow user ranking. Furthermore, the ranking information of the user himself/herself is highlighted in the display. In this ranking, the ranking of the fellow users can be checked at one view.

As described, the game management according this embodiment which manages a game comprises as shown in FIG. 46, the first relationship information storage control unit 50 for storing in the storage device 20 beforehand, the first relationship information associating the existent object in the real world with the character corresponding to the existent object; the character storage control unit (the owned character storage control unit 51*c*) for storing in the storage device 20, the information on the character owned by the user; the prior registration unit 55 for setting registered characters when the operation of selecting a prescribed number of characters as the registered characters (roster players) from among the characters owned by the user has been performed by the prediction time limit; the real event accepting unit 56 for accepting after the prediction time limit, the information on the real event that is the event in the real world produced by the existent object; the second relationship information storage control unit 57 for storing in the storage device 20 beforehand, the second relationship information associating an evaluation value for evaluating the existent object which produced the real event with the real event; the evaluation value acquiring unit 58 for acquiring the evaluation value of the existent object corresponding to the registered character on the basis of the second relationship information; the ranking management unit 191 for managing the ranking of each user in the game on the basis of the evaluation value; and the ranking display control unit 193 for displaying the information on the ranking managed by the ranking management unit 191 on the game screen. The above-described "basic point ranking", "overall point ranking", and "CP ranking" all use evaluation values, which are examples of ranking in the game on the basis of evaluation values.

According to the foregoing configuration, the ranking in the game is tallied on the basis of the activity prediction of the registered character (roster player) whose activity is predicted by the user (i.e., the prediction hitting rate), and is displayed on the game screen. As a result, a game environment for the competition of the prediction hitting rate can be realized, and it is therefore possible to improve the amusement properties of the game. Needless to say, the foregoing configuration can be combined with each of the foregoing configurations of the embodiment.

In the foregoing configuration, as shown in FIG. 52, it is preferable that the game management device further comprises the prediction point storage control unit (the owned point storage control unit 51*d*) for storing in a storage device, the prediction point that the acquired in the game; the first prediction point setting unit 60 for setting the prediction point to the registered character when an operation of setting the prediction point to the registered character is performed by the time limit, according to information on the operation; and the overall point calculating unit 192 for computing an overall point of the registered character on the basis of the evaluation value of the existent player corresponding to the roster player in view of the prediction point set to the registered character, wherein the ranking management unit 191 manages the ranking in the game for each user on the basis of the overall point.

According to the foregoing configuration, the ranking in the game is tallied on the basis of the activity of the registered character (roster player) whose activity is predicted by the user in view of the prediction point, and is displayed on the game screen. As a result, a game environment for the competition of the prediction hitting rate in view of the prediction point can be realized, and it is therefore possible to still improve the amusement properties of the game. Needless to say, the foregoing configuration can be combined with each of the foregoing configurations of the embodiment.

According to the configuration of FIG. 46 or FIG. 52, it is desirable that the game management device further comprises the game information change unit 194 for changing the user's game information to offer a reward on the basis of the user's ranking in the game, managed by the ranking management unit 191. The game information change unit 194 changes the user's game information to offer a reward, for instance, with respect to the users whose ranking is within the top nth (n is a natural number) or within the top m % (0<m<100) of all the users in the game, managed by the ranking management unit 191.

According to the foregoing configuration, rewards will be offered to high ranking players, etc., each user is given a motivation to actively play a game aiming to get the ranking at which rewards can be acquired. As a result, an overall game can be activated.

[Other Configuration Example of Game Management Device]

Another configuration example of the game management device is explained with reference to the functional block diagram of FIG. 57. Note that the same component number is given to the same configuration as those shown in the previous diagrams explained above, and the explanation thereof may be omitted.

In the foregoing embodiment, explanations have been given through the case where the prediction point acquired by the user by executing a match play, etc., is manually set to registered characters (roster players). In contrast, in this embodiment, explained is the configuration wherein when the user performs a game in which registered characters are applied by the time limit, a prediction point is automatically set to registered characters according to the match result (game result). In this case, the prediction point is automatically set without having the user being involved in neither the number of the prediction point nor the target for setting the prediction point.

Here, the prediction point set to the registered character automatically is called "an automatic setting point". Furthermore, also in the configuration wherein the prediction point is set automatically, it may be configured to allow the user to additionally set the prediction point to the registered character. This prediction point that can be set arbitrary is referred to as "an arbitrary setting point"

Figure 57:
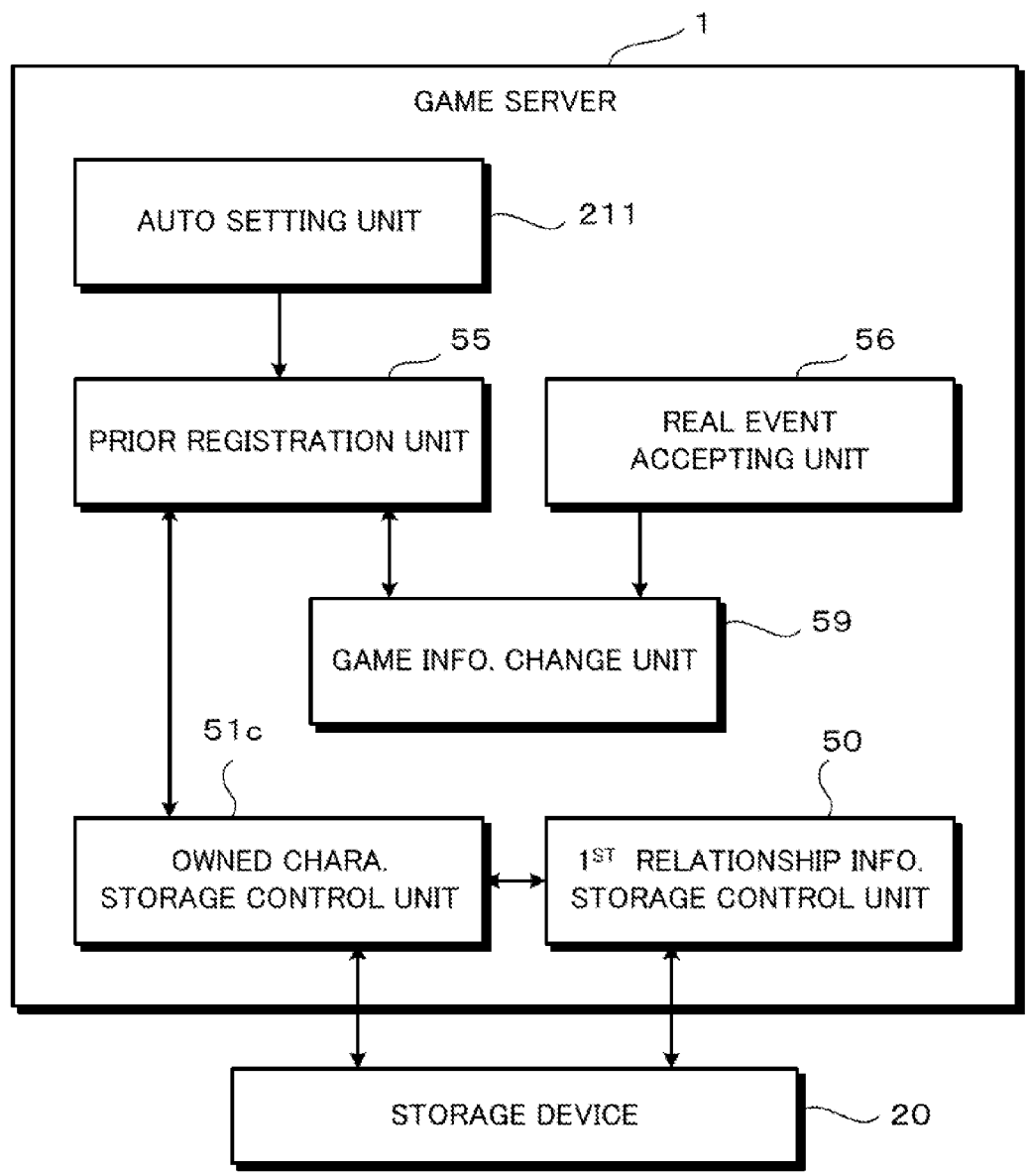
FIG. 57 a functional block diagram showing another example of the functional configuration of the game management device.

As shown in FIG. 57, the game server 1 of this configuration mainly comprises the first relationship information storage control unit 50, the owned character storage control unit 51*c* (character storage control unit), the prior registration unit 55, the real event accepting unit 56, the game information change unit 59, and an automatically setting unit 211. These units have already been explained other than the automatically setting unit 211. In the following, explanations will be given mainly on this automatically setting unit 211.

The automatically setting unit 211 has a function of automatically setting an automatic setting point to a registered character that produces a prescribed match result (game result) when a game, in which the registered character (the roster character in this embodiment) is applied, is performed by a time limit (the above prediction time limit), on the basis of the result of executing the game. Here, as an example of the game play in which a registered character is applied, in this embodiment, adopted is an example of the game play in which the roster is applied to the match mode, i.e., a match play in which a baseball team consisting of roster players set by the user performs a baseball game with the opponent. Examples of the opponent include a baseball team of other user, or the CPU 11 of the game server 1.

Namely, according to this embodiment, a user predicts an existent player who will play an active role in real world from the existent players corresponding to the owned player characters, and the player character corresponding to the existent player whom the user predicted is set to the roster beforehand by the prediction time limit. Furthermore, when a match play between the user's own team made up of roster players and the opponent's team is performed by the prediction time limit, an automatic setting point is set automatically to a roster which produced a prescribed match result (game result), according to a result of executing the game. Here, the result of executing the game can be a result of simulation of a baseball game using the roster, for instance. The game server 1 executes a simulation of the baseball game, for instance, by AI (Artificial Intelligence) program on the basis of the abilities of respective roster players of the user's team and the opponent's team, costs, etc.

Here, FIG. 58 shows an example of "prescribed game result" (match result) that can be a condition for automatically setting an automatic setting point to a roster. As shown in FIG. 58, in the case the roster player is a fielder, when any one of the match results (simulation results) of hitting a single, two-base, three-base hit or a home run, a run batted in, successful stealing, etc., is produced in a match, a prescribed automatic setting point (for instance, equally one point for each event) is set automatically to the roster. For instance, when a certain roster hits 2 single and 1 two-base in the match play, to the roster, the total of 3 automatic setting point is automatically set to the roster. On the hand, in the case the roster player is a pitcher, when any one of the match results (simulation results) of a strikeout, a winning pitcher, saving, etc., is produced in a match, a prescribed automatic setting point (for instance, equally one point for each event) is set automatically to the roster.

The game server 1 stores the information on the match result shown in FIG. 58 in the storage device 20 beforehand. When the match result of the example of FIG. 58 occurs as a result of performing a match play, the automatically setting unit 211 automatically sets one point as the automatic setting point to the roster player who produces the match result. The timing to set the automatic setting point can be the timing a prescribed match result has occurred while the match play is being performed, or the automatic setting point can be set at once at the timing after the match play ends. The information on the automatic setting point set to the roster player by the automatically setting unit 211 is stored in the database server 2, etc. (see FIG. 16).

Furthermore, as described, when it is determined that the existent player corresponding to the roster player produced a prescribed real event, the game information change unit 59 changes the user's game information on the basis of the information on the real event accepted by the real event accepting unit 56 such that the larger the point automatically set to the roster is, the larger the reward to be offered to the user is.

Figure 59:
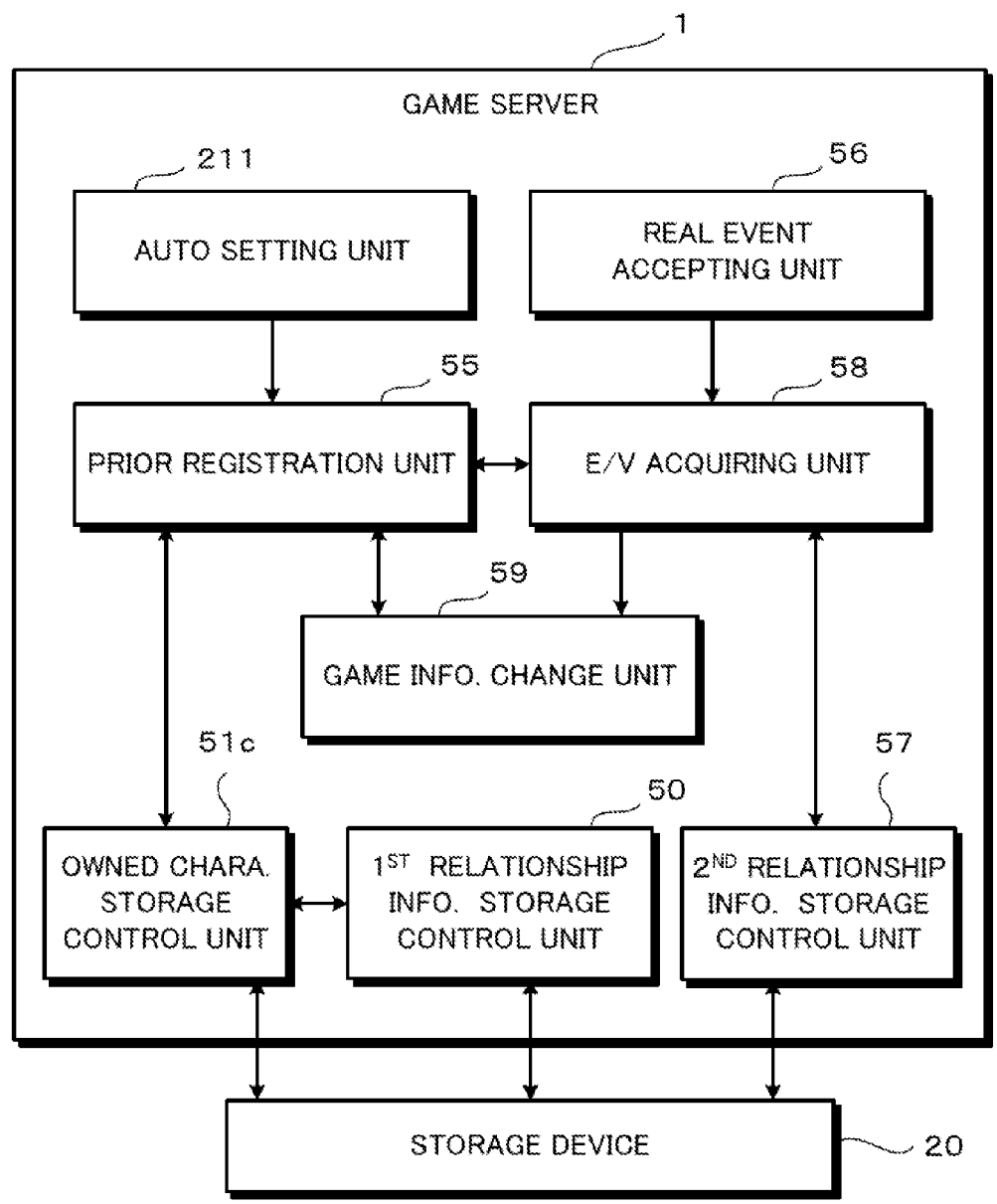
FIG. 59 is a functional block diagram showing another example of the functional configuration of the game management device.

By the way, FIG. 57 shows the configuration without the above mentioned second relationship information storage control unit 57 and the evaluation value acquiring unit 58. However, it may be configured that the game server 1 comprises these units 57 and 58 as shown in FIG. 59. According to the foregoing configuration, different evaluation values can be set (see FIG. 17) according to the activity content of the existent player corresponding to the roster player in the real world (for instance, a single hit or a home run, etc.). Therefore, it is possible to finely evaluate the activity of the existent player, thereby realizing improved game properties.

Figure 60:
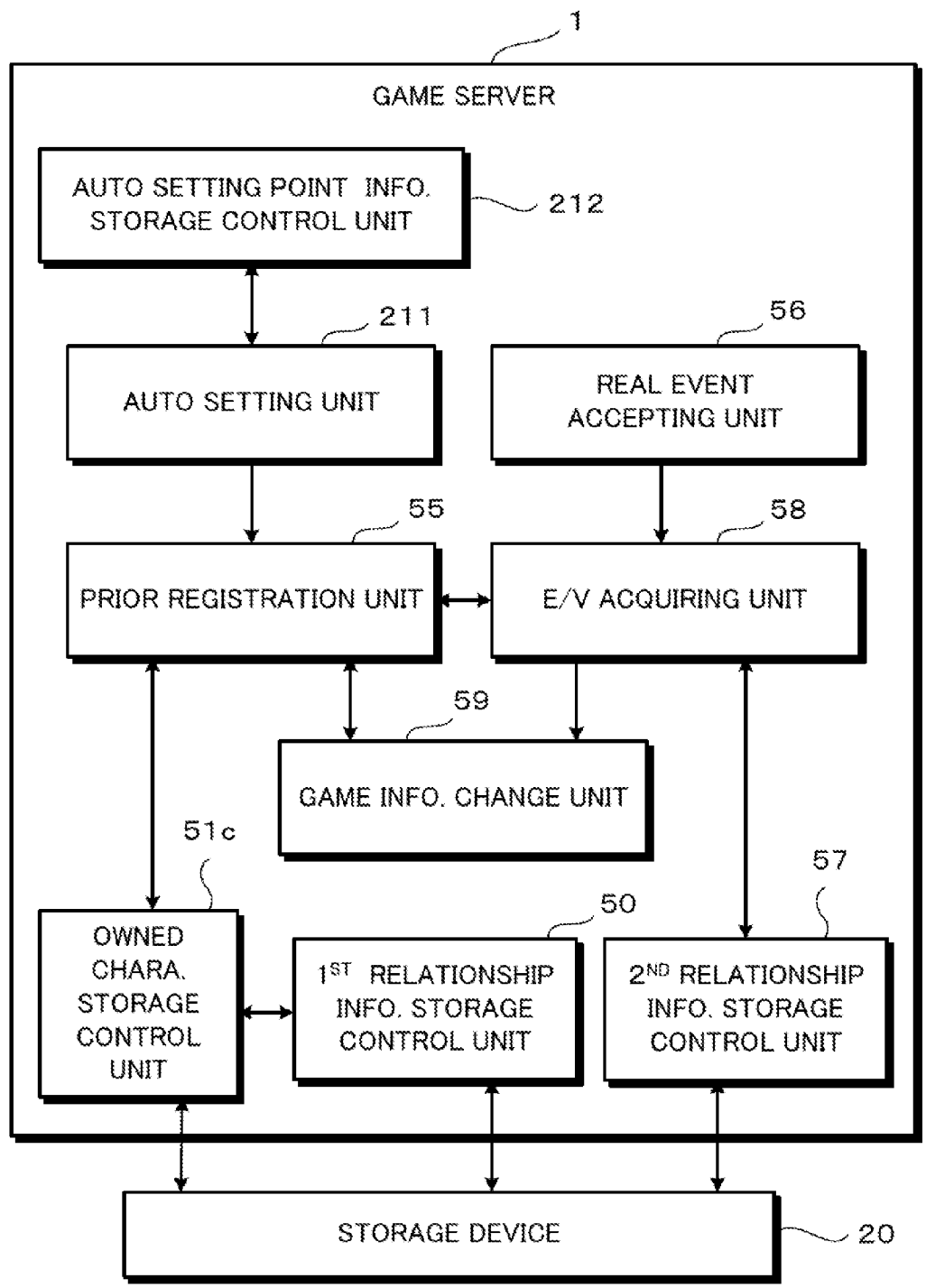
FIG. 60 is a functional block diagram showing another example of the functional configuration of the game management device.

Next, explained is a configuration wherein a match result on each roster player and an automatic setting point are associated, and the association is stored in the storage device beforehand, and according to the match result (i.e., a virtual activity level of the roster player in a match play), an automatic setting point to be set automatically differs. As shown in FIG. 60, the game server 1 having the foregoing configuration further comprises an automatic setting point information storage control unit 212 in the configuration shown in FIG. 57 or FIG. 59. In FIG. 60, the configuration comprising the second relationship information storage control unit 57 and the evaluation value acquiring unit 58 is shown as an example. However, these units 57 and 58 may be omitted.

The automatic setting point information storage control unit 212 has the function of associating beforehand a prescribed match result and an automatic setting point to the roster player which produced the match result, and storing the association as the automatic setting point information in the storage device 20. Then, the automatically setting unit 211 automatically sets point to the roster player which produced the prescribed match result on the basis of the automatic setting point information. FIG. 61 shows an example of the automatic setting point information. In this example, the automatic setting point information is determined by dividing the roster players' positions into three, i.e., the fielder, the starting pitcher, and the relief pitcher.

In the case where the roster player is a fielder, stored as match results are the information of a single hit, a two-base hit, a three-base hit, a home run, a run batted in (each run batted in), stealing, a base on balls, etc. For the automatic setting points corresponding to these match results, one point is set for a single hit, 2 point is set for a two-base hit, 3 point is set for a three-base hit, 4 point is set for a home run, 2 point is set for a run batted in, 1 point is set for stealing, and one point is set for a base on balls. In the case where the roster player is a starting pitcher, the automatic setting point is associated such that one point is set for one out, one point is set for one strike out, 5 point is set for winning, 7 point is set for winning and earned run average <3.00, and 10 point is set for winning and earned run average <2.00. In the case where the roster player is a relief pitcher, the automatic setting point is associated such that 2 point is set for one out, 2 point is set for one strike out, 5 point is set for a save, 7 point is set for inning pitched ≥1 and WHIP ≤1.00, and 9 point is set for a save and WHIP=0.00. Here, WHIP (Walks plus Hits per Inning Pitched) is a total of base on balls and hits per inning. Here, to each match result, assigned is a result ID which uniquely identifies the match result, and in the game server 1, each match result is managed with the result ID.

On the basis of the automatic setting point information of FIG. 61, for instance, when a roster player of a fielder hits 2 single and 1 two-base in the match play, the total of four automatic setting points are automatically set to the roster player. Furthermore, every time the roster player of a starting pitcher gets one out in the match play, one point is automatically set to the roster player, and further every time the roster player of the starting pitcher gets one strike out, one point is automatically set to the roster player. Furthermore, in the case the roster player is a relief pitcher generally having a smaller number of pitches than the starting pitcher, every time the roster player of the relief pitcher gets one out in the match play, 2 point is set automatically set to the roster player, and further every time the roster player of the relief pitcher gets strike out, 2 point is set automatically.

According to the foregoing configuration, it is possible to automatically set different automatic setting points to roster players according to match results of the game play in which the roster is applied (virtual activity content of each roster player), thereby realizing improved game properties.

When user executes a match play a plurality of times before the prediction time limit, an automatic setting point to be set to a roster is increased cumulatively.

By the way, an upper limit can be set to the automatic setting point to be set to each roster player automatically. This upper limit may be set as an upper limit to the automatic setting point that can be set to each roster player, or as an upper limit to the total of the automatic setting points to be set to a plurality of roster players. In this embodiment, an example in which an upper limit is set to the automatic setting point to be set to each roster player is explained. The upper limit for each roster can be set to arbitrary, for instance, 30 point.

Here, it is preferable that the above upper limit varies depending on the number of fellow users of the user, and the upper limit can be increased if the user increases the number of fellow users. For instance, in the case the number of fellow users is "less than 10", the upper limit to the automatic setting point is set to "30 point", in the case the number of fellow users is "10 to 29", the upper limit is set to "35 point", in the case the number of fellow users is "30 to 39", the upper limit is set to "40 point", in the case the number of fellow users is "40 to 49", the upper limit is set to "45 point", and in the case the number of fellow users is "more than 50", the upper limit is set to "50 point". Here, the larger the automatic setting point to be set to the roster is, the larger an advantage when the activity prediction proves right is. Therefore, in order to acquire a larger advantage, each user is given a motivation to actively make many fellow users. Consequently, by increasing the number of each user's fellow users, which in turn activates the community among users, thereby activating an overall game.

Furthermore, for the timing to automatically set automatic setting point, on the basis of the automatic setting point information shown in FIG. 61, in the case of the result ID of 1 to 10, 14 or 15, the automatic setting point is set immediately when the match result (game result) comes out. On the other hand, in the case of the result IDs of 11 to 13, or 16 to 18, the match result is not confirmed until the match play ends. Therefore, an automatic setting point is set as a bonus after the match play ends. However, it may be configured to set automatic setting point at once after the end of the match play for all of the result IDs 1 to 18. In particular, in the case where the user skips the game content of the match play to check only the match result, the automatic setting point will be set at once after the end of the match play.

As described, according to the embodiment, the prediction point (automatic setting point) is set automatically. However, it may be configured that a user can additionally set a prediction point (an arbitrary setting point) to an arbitrary roster player. In the following, this configuration is explained.

A user can acquire an arbitrary setting point that can be set to an arbitrary roster player in a game. This arbitrary setting point only needs to be acquired in a game. Therefore, it may be configured such that the arbitrary setting point can be acquired in the game not only in a match mode but also in various other game modes. Here, an example in which an arbitrary setting point can be acquired by a match play is shown. For instance, it is configured that when a user's team scores in a match play, the user acquires an arbitrary setting point according to the score. For instance, one arbitrary setting point per score is offered to the user. Namely, as described above, when the user's roster player played an active role causing a prescribed match result in a match play, an automatic setting point is set automatically to the roster player, and further when the user's team scores, an arbitrary setting point is offered to the user.

For instance, it may be configured that when winning the game, a prescribed point (for instance, 5 point) of an arbitrary setting point is offered to the user.

The automatic setting point which is the prediction point set automatically and the arbitrary setting point which is the prediction point set by a user arbitrary can be called by arbitrary names when distinguishing them by assigning different names. As one example, the former prediction point may be referred to as the name "hope", and the latter prediction point may be referred to as the name "extra-hope".

Figure 62:
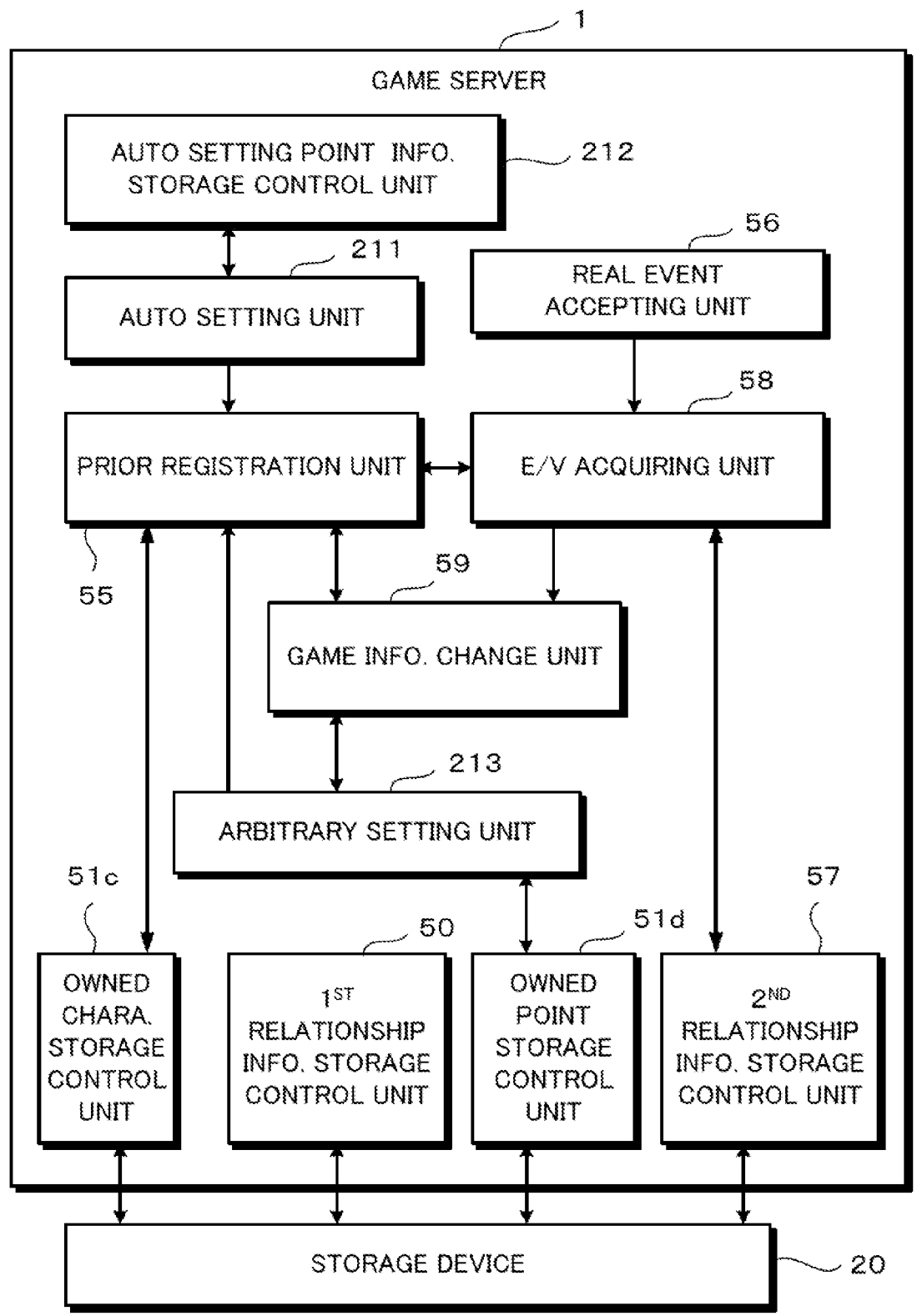
FIG. 62 a functional block diagram showing another example of the functional configuration of the game management device.

As shown in FIG. 62, the game server 1 according to this embodiment comprises an owned point storage control unit 51d (arbitrary setting point storage control unit) and an arbitrary setting unit 213 other than respective units of FIG. 57, FIG. 59 or FIG. 60. In FIG. 62, the configuration comprising the second relationship information storage control unit 57, the evaluation value acquiring unit 58 and the automatic setting point information storage control unit 212 is shown as an example. However, these units 57, 58 and 212 may be omitted.

The owned point storage control unit 51d has a function of storing in the storage device 20, the arbitrary setting point which is acquired by the user in the game, and which can be set to an arbitrary roster. This owned point storage control unit 51d has been explained already earlier.

The arbitrary setting unit 213 has the function of setting an arbitrary setting point to a roster player when an operation of setting the arbitrary setting point to the roster player is performed by the time limit (the above-mentioned prediction time limit) according to the information on the above operation. The basic configuration of the arbitrary setting unit 213 is the same as that of the first prediction point setting unit 60, and the detailed explanations thereof shall be omitted.

As described, configuring not only that automatic setting points are set to roster players according to match results of the game play in which roster is applied, but also that the user can set the weighting of the prediction to an arbitrary roster player using arbitrary setting point acquired in the game, thereby realizing still improved game properties.

Then, the game information change unit 59 changes the user's game information when it is determined that the existent player corresponding to the roster player produced a prescribed real event, on the basis of the automatic setting point and the arbitrary setting point which are the prediction points set to the roster player.

Next, an example of the processing of setting automatic setting point in the game server 1 of this embodiment is explained below in reference to the flowchart of FIG. 63, a game screen, etc.

Figure 26:
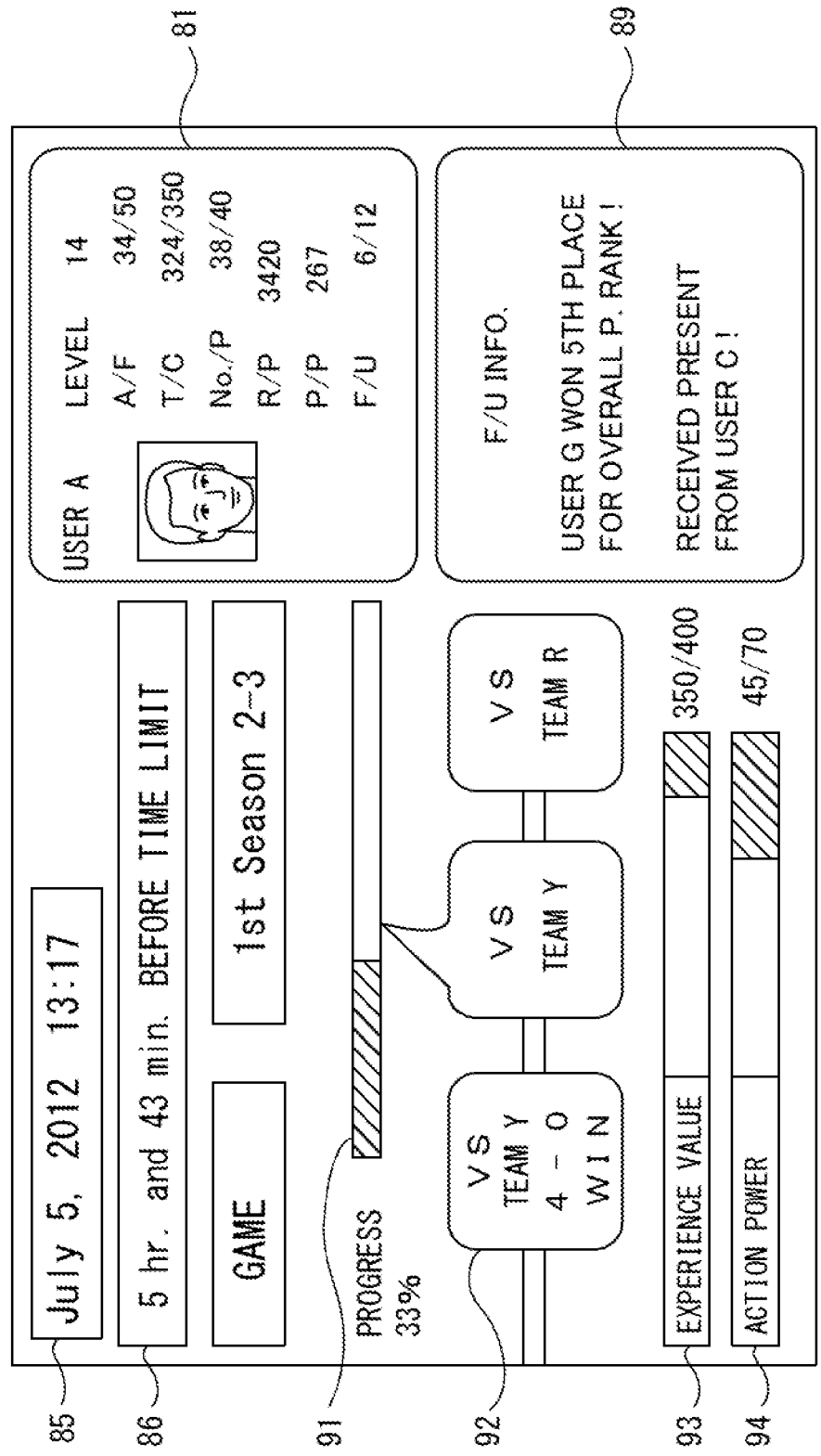
FIG. 26 is an explanatory diagram showing an example of the screen in a match mode.

By selecting the "match" button 84 on the main screen of FIG. 13, the screen changes to the match mode screen shown in FIG. 26. On this match mode screen, by selecting the match card display box 92, the screen changes to the match component selection screen shown in FIG. 64. Then, by selecting an opponent as desired from the opponent candidate list on this match opponent selection screen, it becomes possible to make a match with the selected opponent. Here, in the above-described match play, an example has been given in which a reward (number of prediction point, etc.) to be offered by winning the match is predetermined before the match. In contrast, in the match play of this embodiment, the number of automatic setting point that can be offered to the user cannot be seen until a simulation result is shown as a result of actually performing the match. Therefore, on the above described match opponent selection screen shown in FIG. 27, in the information display region 101 of the opponent candidate, displayed is a reward (a prediction point, etc.) offered by winning a match with this opponent candidate (the prediction point and the player character, etc.). However, there is no such display on the opponent candidate selection screen of FIG. 64.

Figure 63:
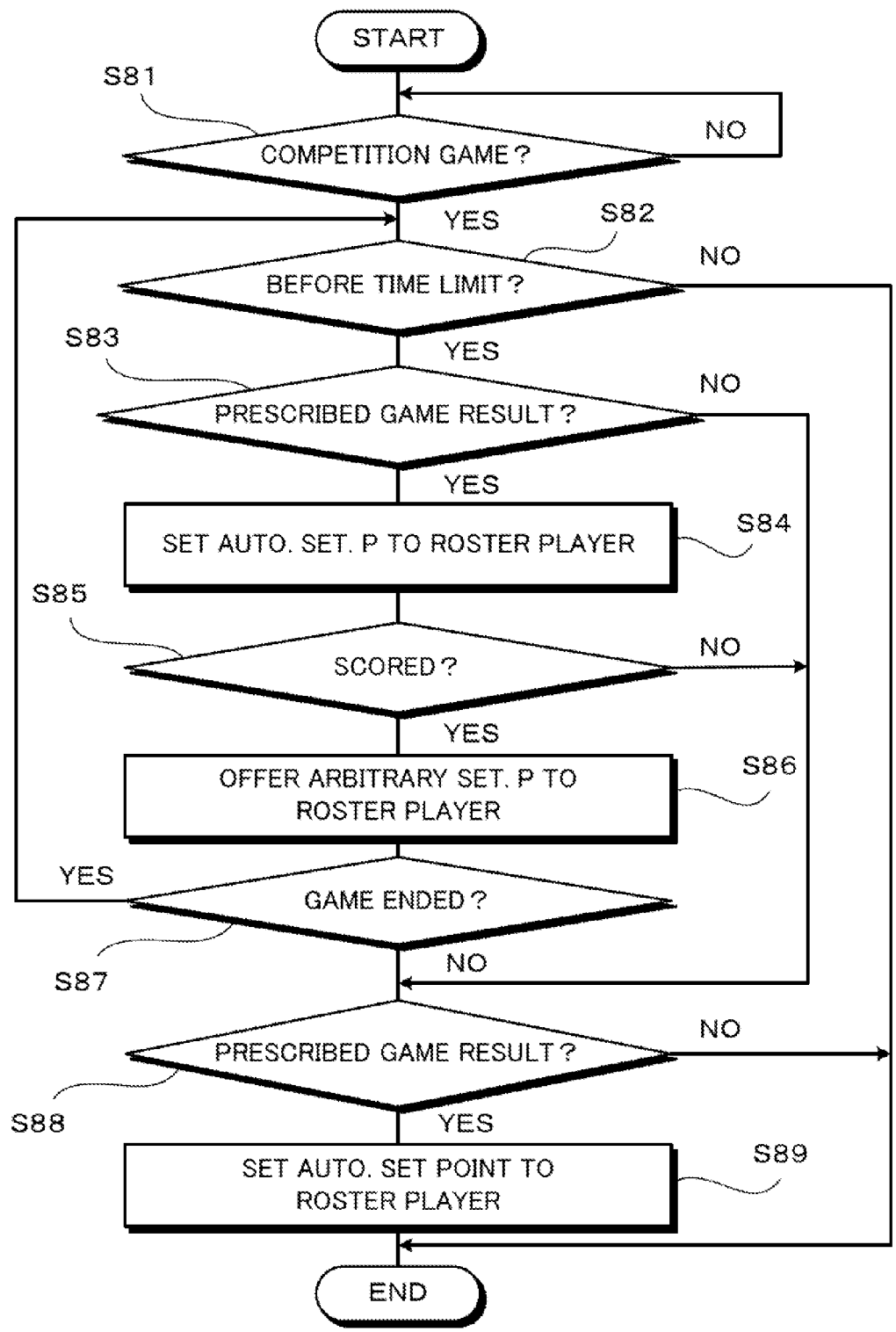
FIG. 63 is a flowchart showing an example of the processing of automatically setting a prediction point.

As shown in FIG. 63, when an operation of selecting an opponent is performed on the opponent selection screen, the game server 1 starts the execution of the match play (S81; YES), and it is determined if the start of execution of the match play is before the prediction time limit or not (S82). If it is before the prediction time limit (S82; YES), the sequence goes to the routine of executing the automatic setting of the automatic setting point (the processing in and after the processing in S83).

On the hand, if the prediction time limit has passed (S82; NO), the sequence does not go to the routine of executing the automatic setting of the automatic setting point. In this case, although the automatic setting of the automatic setting point is not performed by executing a match play, the user can still obtain an arbitrary setting point, a player character, etc. For instance, an arbitrary setting point (prediction point the user can set arbitrary) is offered to the user according to the point of user's team.

In the following, explained is the processing in and after S83. As a result of executing a match, when the user's roster player produced a predetermined match result included in the automatic setting point information shown in FIG. 61 (S83; YES), the game server 1 automatically sets the automatic setting point according to the match result (S84).

Figure 65:
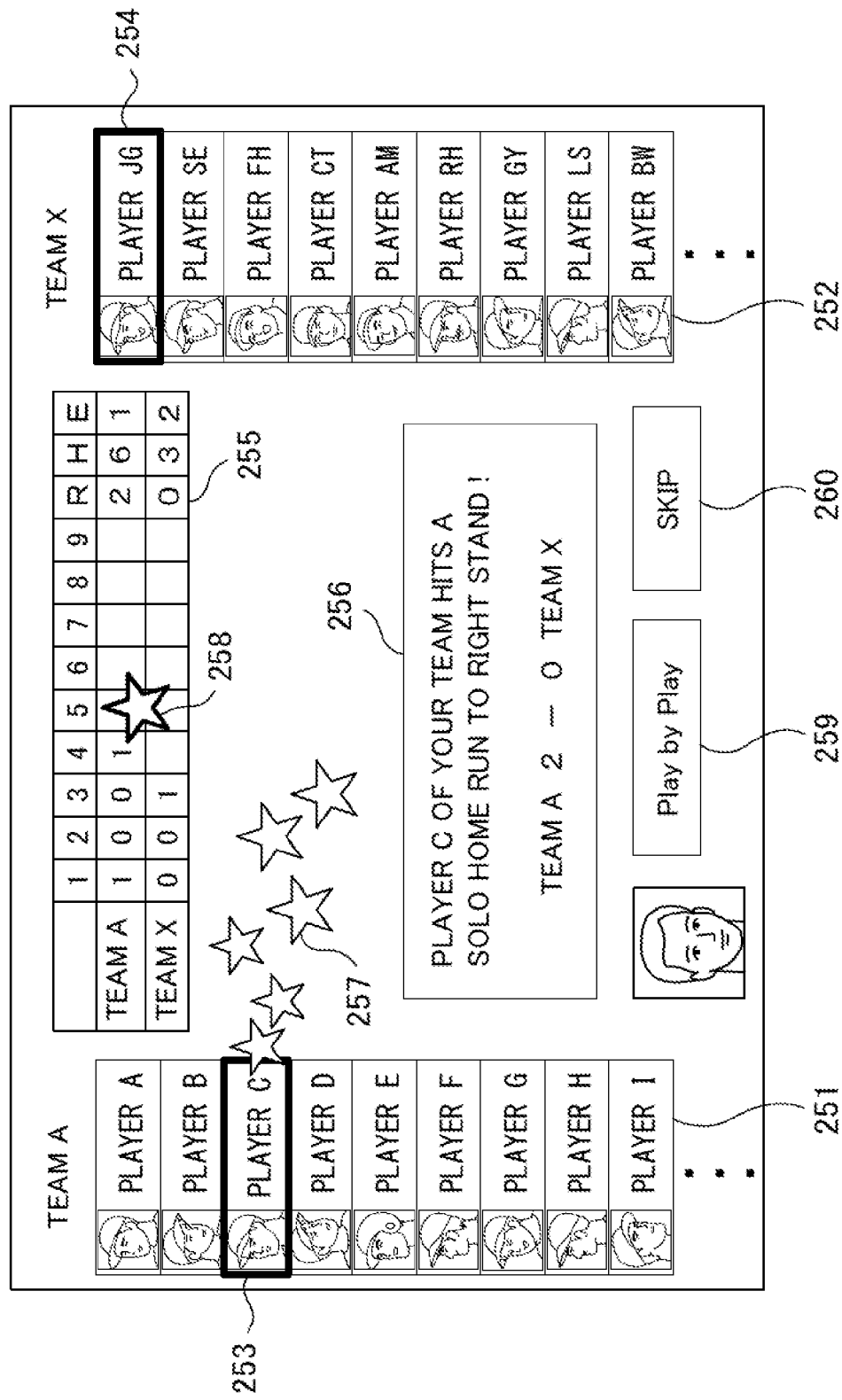
FIG. 65 is explanatory diagram showing an example of a game screen in a match play.

FIG. 65 shows an example of the game screen when an automatic setting point is set automatically while a match play is being executed. For instance, roster players 251 of the user's team are arranged on the left hand side of this game screen, and roster players 252 of the opponent's team are arranged one the right hand side of the screen. The player character 253 at bat and the player character 254 who throws a ball are highlighted respectively. Furthermore, a scoreboard 255 is displayed on the screen, so that a score in process can be checked.

On the game screen in the match play, a match result display region 256 is provided in which the match result of a simulation is displayed in a concise sentence. In the example of FIG. 65, the message "Player C of your team hits a solo home run to the right stand!" is displayed as the match result. In this case, on the basis of the automatic setting point information shown in FIG. 61, 4 point for home run, and 2 point for a run batted in, in total of 6 point is automatically set to the roster player C. Here, the game server 1 displays the automatic setting point in the form of an star-shaped object 257 on the screen, performs such display performance that objects 257 gather around the roster player C. This display performance is merely an example, and other display performance may be adopted to inform that the automatic setting point is set to the roster player C.

Referring back to the flowchart of FIG. 63, explanations are continued. When the user's team scores a point(s) (S85; YES), the game server 1 offers the user, an arbitrary setting point that can be set to an arbitrary roster player (S86). In this case, the user's owned arbitrary setting point (prediction point), which the owned point storage control unit 51d stores in the storage device 20, is updated.

In this case, as shown in FIG. 65, the game server 1 performs such display performance that an object 258 indicative of the arbitrary setting point is displayed on the screen, and the object 258 is moved to the scoreboard 255. This display performance is merely an example, and other display performance may be adopted to inform that the arbitrary setting point is offered to the user as a result of the user's team scoring.

Thereafter, if the game has not ended (S87; NO), the sequence goes back to S82, and the processing in S82 to S87 is repeated. Then, when the game has ended (S87; YES), it is determined if the user's roster player played an active role to produce a prescribed match result (match result with result ID=11-13, or 11-18 of FIG. 61) which is confirmed as the game ends (S88). Here, if the user's roster player played an active role such as becoming a winning pitcher. (S88; YES), the game server 1 automatically sets the automatic setting point to the roster player according to the match result (S89).

By the way, for the match play, there are three play modes of "digest", "play-by-play", and "skip", and a user can selects an arbitrary play mode from among these modes. The mode "digest" is a play mode in which when a highlight scene is generated such as scoring, or runner's moving into a scoring position as a simulation result of the game, only such highlight scene is displayed, and other scenes are skipped. The mode "play by play" is a play mode in which simulation results of all the batters are displayed on the screen. The mode "skip" is a play mode in which all the simulation results of the game are skipped and the match result is displayed on the screen immediately.

The game screen of FIG. 65 is one scene in the play mode "digest", and by pressing a "play by play" button 259, the play mode can be changed to the "play by play" mode. On the other hand, by pressing a "skip" button 260, it is possible to display the match result immediately on the screen. When pressing the "skip" button 260, after the game ends, a display performance for automatically setting the automatic setting point to the roster player and a display performance for offering the automatic setting point to the user are performed at once.

The flowchart of FIG. 63 comprises the step of offering an arbitrary setting point that can be set to an arbitrary roster player when the user's team scores. However, these steps (S85 and S86) may be omitted.

As described, the game management device of this embodiment comprises the first relationship information storage control unit 50, the owned character storage control unit 51c (character storage control unit), the prior registration unit 55, the real event accepting unit 56, the game information change unit 59, and the automatically setting unit 211 as shown in FIG. 57.

As described, according to this configuration, it is possible to realize a highly attractive game in which the real world and the game are integrated. Furthermore, by performing a game play in which the user applies the roster player by a time limit, an automatic setting point is set automatically to the roster according to the match result. As a result, as compared to the case where the user acquires the automatic setting point in the game, and thereafter performs an operation of setting the automatic setting points to the registered characters, the operation of setting the automatic setting points can be simplified. As a result, it is possible to save user's trouble. Then, if the existent player corresponding to the roster player to which the automatic setting point is set played an active role in the real world, a larger reward can be obtained as compared to the case where the automatic setting point has not been set. Therefore, each user is given a motivation to actively play a game in which a roster is applied.

By the way, like the above described embodiment, in the case where prediction point is not set automatically, the following are prospected. For instance, when a prediction point is acquired in a match play, in order to acquire more prediction point, the user is expected to set the roster (so-called the roster for competition) of an order consisting of player characters whose abilities are high anyway, other than the roster to be used in "real MLB link" mode (roster set on the basis of the activity prediction of the existent players), and to perform a match. Since this roster is formed to acquire a larger prediction point as possible, for instance, in the case a player character corresponding to an existent player who is injured and cannot participate in the match of MLB is set to the roster, a roster of another order without excluding that player character (so-called a roster for real MLB link) will be set.

Namely, there are such game properties that the roster for competition and the roster for real MLB link are suitably used according to different purposes, and a prediction point can be acquired effectively by the roster for competition before the prediction time limit, and the prediction points as acquired are set to the roster reset for the real MLB link. As a result, the roster setting for the match mode and the roster setting for the real MLB link mode need to be considered respectively, thereby realizing interesting game properties.

On the other hand, some users may feel troublesome to consider the roster setting in the match mode and the roster setting in the real MLB link mode respectively. In contrast, according to the configuration wherein the prediction point (automatic setting point) is set automatically to the roster according to the result of a match play, the match play is performed on the basis of the roster used in the real MLB link mode. As a result, it is possible to realize simpler game properties.

Figure 66:
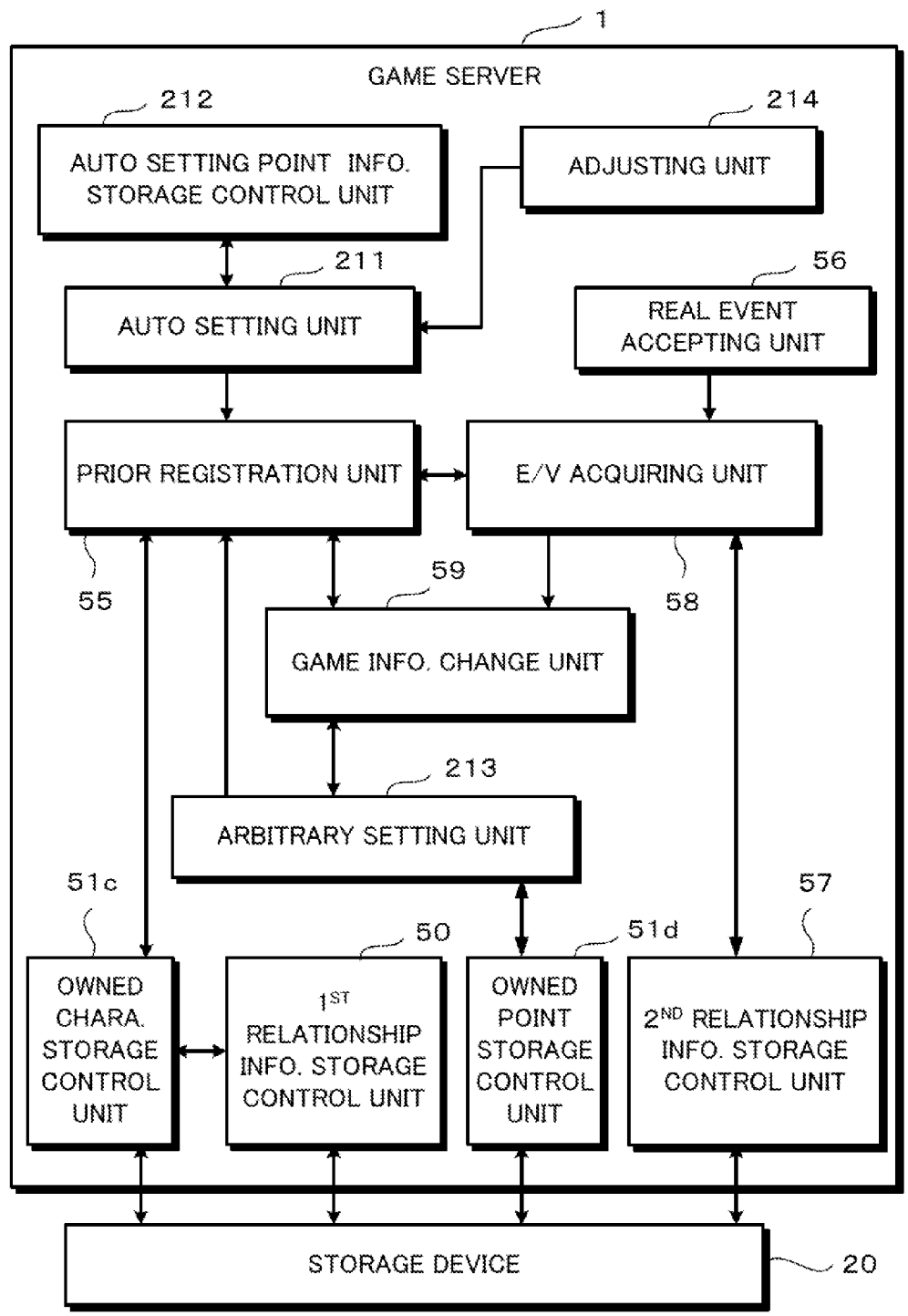
FIG. 66 is a functional block diagram showing another example of the functional configuration of the game management device.

Next, explained is the configuration wherein when a user plays a game with an opponent in a higher level than the user, the automatic setting point to be set automatically increases. As shown in FIG. 66, the game server 1 of this configuration further comprises an adjusting unit 214 other than respective units shown in FIG. 57, FIG. 59, FIG. 60 or FIG. 62. FIG. 66 shows as an example, the configuration comprising the second relationship information storage control unit 57, the evaluation value acquiring unit 58, the automatic setting point information storage control unit 212, and the arbitrary setting unit 213. However, these units 57, 58, 212 and 213 may be omitted.

When the user performs a match with an opponent in a higher level in the match mode, the adjusting unit 214 adjusts the automatic setting point to be set to the roster by the automatically setting unit 211 to be increased compared to the case of performing a match with an opponent in the same level or lower level. For instance, when the user performs a match with an opponent in a higher level, the adjusting unit 214 adjusts the number of automatic setting point to double the automatic setting point in the case of performing a match with an opponent in the same level or lower level. The degree of increasing the automatic setting point is not limited to double, and can be set arbitrary, for instance, by 1.2 times and 1.5 times, etc.

Here, the "opponent in an upper level" indicates an opponent whose parameter related directly or indirectly to the strength in match is larger than that of the user, such as an opponent in a higher game level than the user or an opponent whose group strength is larger than that of the user. In the present embodiment, all or some of the above described "ability rank (rarity level)", "individual ability", "cost", "condition", and "result" are used to compute the parameter of the strength of the user and the strength of the opponent's team.

Figure 64:
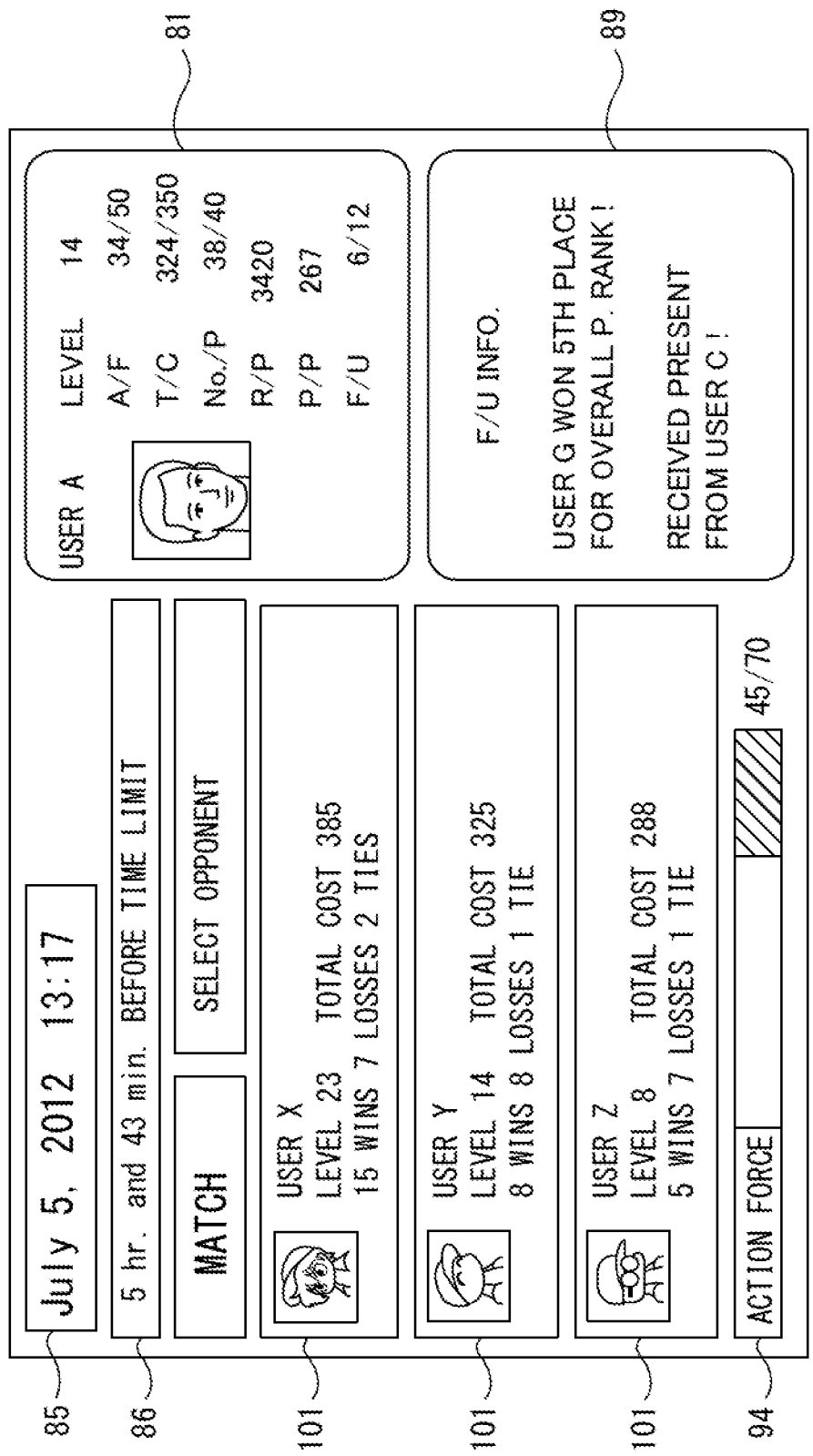
FIG. 64 is explanatory diagram showing another example of the opponent selection screen.

For instance, the above-mentioned total cost is a total of the costs of all the player characters of the team, which is index information that shows the level of the strength of the team. Therefore, an opponent whose game level or total cost shown in the information display region 101 of the opponent candidate on the opponent selection screen shown in FIG. 64 is higher than that of the user can be defined to be the opponent in a higher level.

Here, if the difference between the opponent's game level and the user's game level is within a prescribed range (for instance, not more than 5), the opponent's game level would be much the same as the user's game level. In this case, it may be considered that the opponent is in the same game level as the user. Similarly, if the difference between the total cost of the user's team and the total cost of the opponent's team is within a prescribed range (for instance, not more than 20), the total cost of the user's team would be much the same as the total cost of the opponent's team.

For instance, when a match is executed with an opponent in the lower level, as a simulation result of the match, it is likely to produce a prescribed match result that meets a condition for automatically setting an automatic setting point (FIG. 58 or FIG. 61). On the other hand, when a match is executed with an opponent in the upper level, as a simulation result of the match, it is less likely to produce a prescribed match result that meets a condition for automatically setting an automatic setting point. However, if the prescribed match result is produced, a larger automatic setting point would be automatically set to the roster. Therefore, the user can enjoy an act of forming a strategy, such as selecting a relatively weak opponent to be steady, or selecting a relatively strong opponent to expect a larger automatic setting point to be set automatically, thereby realizing still more improved game properties.

The adjusting unit 214 may be configured to increase an automatic setting point to be set to the roster by the automatically setting unit 211 such that the stronger the opponent is, the more increased the automatic setting point is.

For instance, the adjusting unit 214 changes an automatic setting point continuously for each one level difference of the opponent's strength level as shown in the following example. When the user's game level is L1, the opponent's game level is L2, the automatic setting point before adjusting is P0, the automatic setting point after adjusting is P1, and the coefficient (charge rate) is a, P1 can be calculated as follows:

$$P1 = P0 \times a \qquad (3).$$

When the user's game level is L1, the opponent's game level is L2, and L1<L2 (when the user executes a match against a higher ranking opponent), for instance, the coefficient a in the above formula (3) can be calculated as follows:

$$a = 1 + (L2 - L1) \times 0.02 \qquad (4).$$

Furthermore, when L1>L2 (when the user executes a match against a lower or same ranking opponent), the coefficient a in the above formula (3) can be calculated as follows:

$$a = 1 (L1 - L2) \times 0.01 \qquad (5).$$

When the automatic setting point after adjusting P1 computed from the above formulae (3) to (5) is not a natural number, P1 may be rounded off, rounded up or rounded down to a natural number or may include numbers below decimal point. The foregoing adjustment processing adopting the above formulae (3) to (5) is merely one example and the adjustment processing may be performed using other formula, etc.

The adjusting unit 214 may be configured to change an automatic setting point in stages to increase the automatic setting point to be set automatically so that the stronger the opponent is, the larger the automatic setting point is as shown in the following example. When the opponent's game level is 1 to 10 level higher, 11 to 20 level higher, 21 to 30 level higher, 31 to 40 level higher and not less than 41 level higher, the coefficient a in the above formula (3) is 1.2, 1.4, 1.6, 1.8 and 2.0 respectively.

On the other hand, when the opponent's game level is lower than the user's game level, the coefficient a in the above formula (3) is fixed to 1.0, or may be changed in stages as follows. For instance, when the opponent's game level is 1 to 10 level lower, 11 to 20 level lower, 21 to 30 level lower, 31 to 40 level lower and not less than 41 level lower, the coefficient a in the above formula (3) is 1.0, 0.9, 0.8, 0.7 and 0.6 respectively.

The configuration wherein an automatic setting point can be set automatically to registered characters (roster players) can be combined with each of the foregoing configurations of the embodiment. For instance, the configuration wherein the ranking management unit 191 manages the ranking in the game is applicable also to the configuration wherein an automatic setting point can be set automatically.

Other Embodiment

In the foregoing embodiment, explanations have been given through the configuration wherein the user is allowed to set roster players (registered characters) on the basis of the activity prediction of existent players. However, the embodiment is applicable not only to such positive prediction (activity prediction) but also to the negative prediction. Namely, it may be configured such that the user predicts the existent player who will not play an active role from the existent players corresponding to the characters owned by the user, and sets that the character corresponding to the existent player as predicted to the roster player beforehand. In this case, it may be configured such that the game information change unit 59 changes the user's game information to offer a reward when it is determined that the existent player corresponding to the roster player produced a prescribed real event such as being struck out, or making a fielding error (i.e., a negative prediction is correct). On the contrary, it may be configured such that the game information change unit 59 changes the user's game information to offer a disadvantage when it is determined that the existent player corresponding to the roster player produced a prescribed real event such as hitting a home run against the user's prediction (i.e., a negative prediction is wrong). The game information change unit 59 may also be configured so as to change the user's game information to offer a disadvantage when the above negative prediction is correct, and to offer a reward when the above negative prediction is wrong.

Also for the prediction point (automatic setting point, arbitrary setting point), there are the case where the user sets to the roster player corresponding to an existent player whom the user predicts to be active, and the case where the user sets to the roster player corresponding to an existent player whom the user predicts not to be active (namely, applicable to both the positive prediction and the negative prediction). For the prediction point on the basis of the negative prediction, it may be configured such that when the prediction is correct, the reward is set to be larger (the disadvantage is set to be smaller), or the disadvantage is set to be larger (or the reward is set to be smaller).

Therefore, for the configuration wherein the game information change unit 59 changes the user's game information on the basis of the prediction point, the following can be adopted: a) the larger the prediction point set to a roster is, the larger the reward is, or the smaller the disadvantage is; b) the larger the prediction point set to the roster is, the smaller the reward is, or the larger the disadvantage is; and c) the smaller the prediction point set to the roster is, the larger the reward is, or the smaller the disadvantage is.

The configuration of setting a negative prediction point can be applied not only to the case where a user sets the prediction point to an arbitrary roster but also to the case where the automatically setting unit 211 automatically sets the prediction point to the roster. An example of this configuration is explained below.

In the case where the game in a match mode in which a roster is applied is performed by a time limit, the player character of the roster player generates a negative result (for instance, a fielding error, an easy fly, failing to take an advantage of a chance, many runs charged to a pitcher, etc.), the automatically setting unit 211 may be configured to automatically set an automatic setting point as a negative prediction point to the roster player indicating that the active role of the roster player cannot be expected much. Then, if the existent player corresponding to the roster player to whom a negative prediction point was set did not play an active role in the real world after the time limit, for instance, as being struck out, making a fielding error, etc., (for the user's roster setting being over-optimistic, or in the case of adopting the roster on the basis of the automatically set order, for not having been made an appropriate adjustment), it may be configured such that the larger the prediction point is, the larger a disadvantage to be offered is.

The foregoing embodiment has been explained through the case where the game server 1 comprises the character storage control unit that stores in a storage device the information on the player characters owned by the user. However, the present embodiment is not intended to be limited to this. Namely, it may be configured that the information on the player characters owned by each user is stored and controlled by the terminal device 3 of each user, or the configuration of a game system may be adopted wherein the character storage control unit is provided on the side of the terminal device 3.

Furthermore, regarding the configuration having the storage control function of storing various kinds of information in a storage device (the first relationship information storage control unit 50, the second relationship information storage control unit 57, the owned character storage control unit 51c, the owned point storage control unit 51d, the automatic setting point information storage control unit 212, etc.), the storage device itself is not included in the configuration. Therefore, the storage device can be provided irrespective of the inside or the outside of the game management device (or game system). For instance, the storage device can be the RAM13 or the auxiliary storage device 14 of the game server 1, the database server 2, the RAM 33 or the auxiliary storage device 39 of the terminal device 3, a file server of different configuration from the game management device or the terminal device, etc.

In the foregoing embodiment, explanations have been given through the configuration wherein the real event accepting unit 56 accepts a real event via the input device 17 such as a keyboard or a mouse, or by receiving information from other server. However, the present embodiment is not intended to be limited to this configuration. For instance, such configuration is included wherein image data obtained by imaging the real world, etc., is analyzed by the image processing, and when a real event can be recognized automatically, the real event is automatically accepted by the image processing. In an example of a quiz game, in a television program in the real world, for the real event that a television personality (an existent object) answers a quiz correctly (or incorrectly), in the case where information indicative of the answer being correct or incorrect is always displayed in characters, or the like in the image of the program, the real event can be automatically recognized by analyzing the image data of the program (a television signal, etc.) by the image processing.

In the foregoing embodiment, an application example to a game system was explained where the game execution program is loaded to the game server 1 side, the game server 1 executes the arithmetic processing and data processing for advancing the game according to the input operation of the terminal device 3 of each user, and the screen data reflecting the execution result is sent to the terminal device 3 in order to advance the game, but the configuration is not limited thereto. This is a so-called client server-type game system, but the configuration is not limited thereto. The game management device according to the present embodiment can also be applied to a game system wherein the game server 1 manages game information including a fellow user's information or the like and provides users with a game service including communications and the like in the game while the game execution processing for advancing the game is basically performed on the user's terminal device side.

In other words, the present invention can also be applied to a game system where a part or the entire game execution program is downloaded or installed in the user's terminal device, and the game execution processing is also performed by the terminal device. For instance, it is possible to execute peer-to-peer game, with a user terminal device being peer-to-peer connected to another user terminal device via the Internet communication, wireless LAN communication, near field communication in use of a predetermined frequency band (e.g., frequency band of 2.4 GHz), wired LAN communication.

Thus, as the user's terminal device, applied may be, for instance, in addition to the foregoing portable phone terminal, smartphones, PHS terminal, portable digital assistant (PDA), personal computer and tablet-type computer terminal, a domestic video game device having a network connection function (game device configured by connecting a domestic video game machine to a domestic television), a portable game-dedicated device or the like that can be connected to the game server (game management device) via the network and receive the provision of the game service.

In other words, in the game system comprising the game management device and the terminal device, it will suffice if either the game management device or the terminal device comprises the respective units of the game management device explained in each of the foregoing embodiments.

It may be configured such that the server device merely sends information on real event to the terminal device, and the terminal device which receives the information on real event has similar functions as the first relationship information storage control unit 50, the game information management unit 51, the game advancement unit 52, the prior registration unit 55, the second relationship information storage control unit 57, the evaluation value acquiring unit 58, game information change unit 59, first prediction point setting unit 60, and the first upper limit management unit 61, etc., shown in FIG. 4. This game system is explained below in reference to FIG. 35 and FIG. 36. Note that the same component number is given to the same configuration as those shown in the previous diagrams explained above and the explanation thereof may be omitted.

Figure 35:
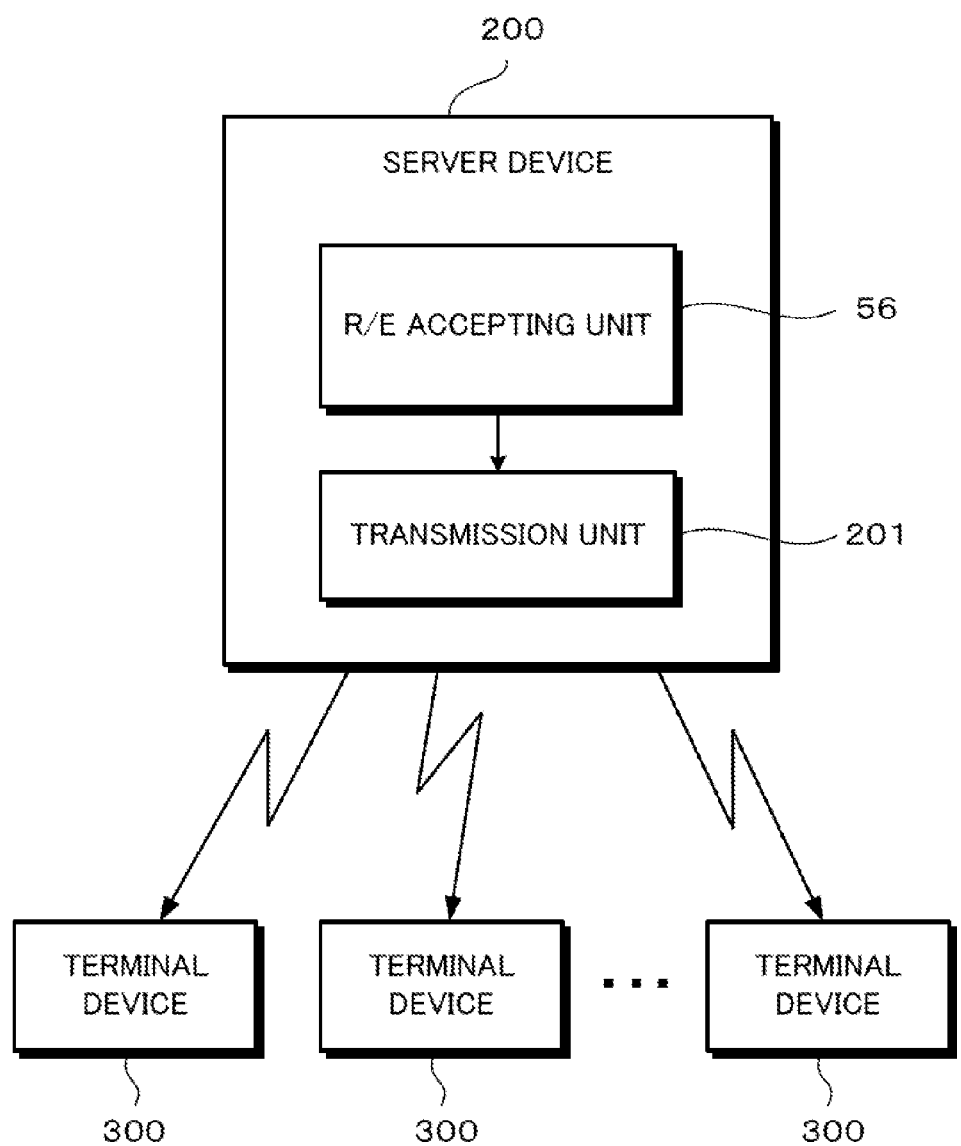
FIG. 35 is an explanatory diagram showing another configuration example of the game system.

As shown in FIG. 35, this game system comprises a server device 200 and a terminal device 300 (game device). The server device 200 functionally includes the real event accepting unit 56 and the transmission unit 201 which sends information on real event to the terminal device 300. The hardware configuration of the server device 200 is the same as the hardware device of the game server 1 shown in FIG. 2.

Figure 36:
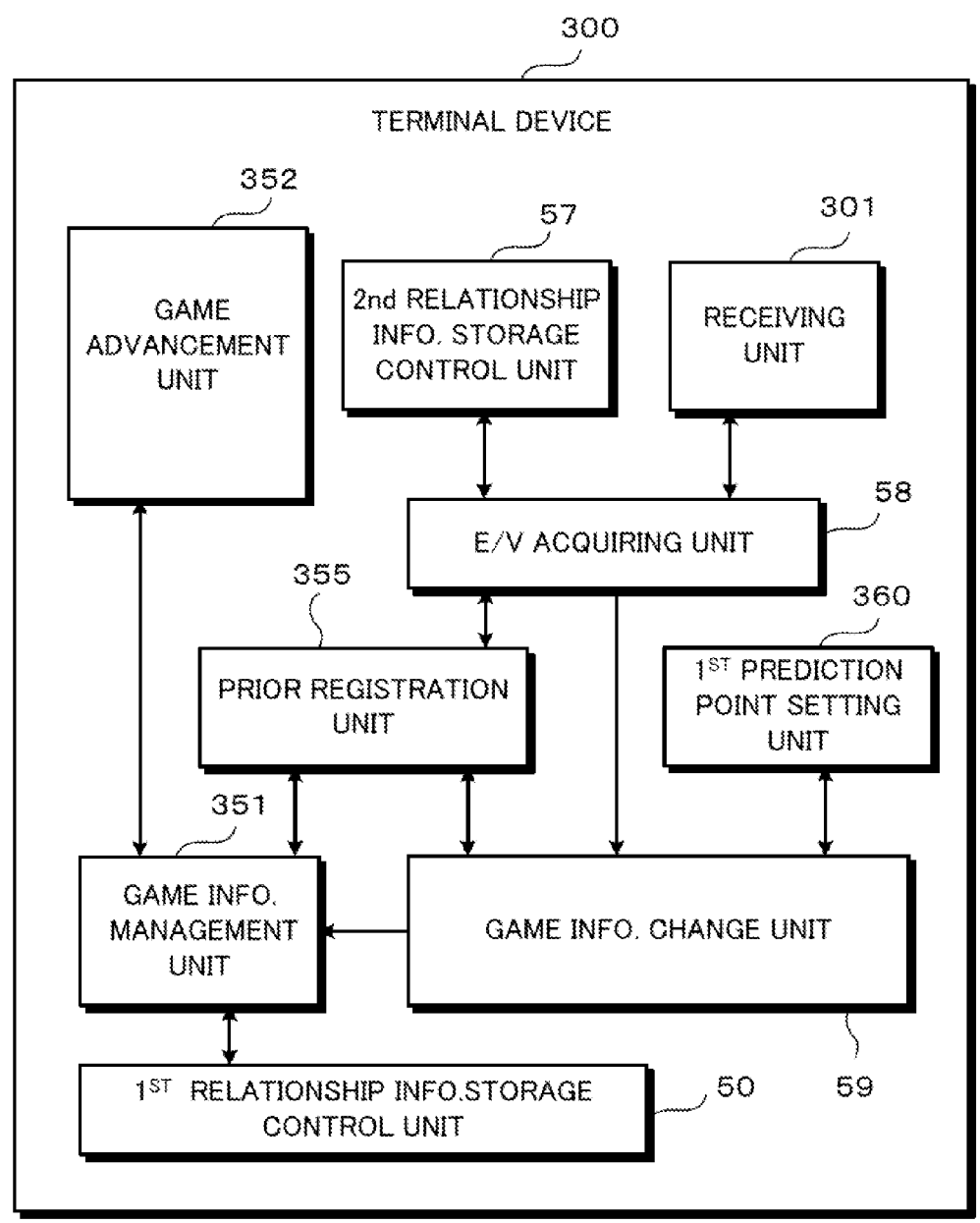
FIG. 36 is a functional block diagram showing an example of the functional configuration of the terminal device.

As shown in FIG. 36, the terminal device 300 functionally comprises a receiving unit 301, the first relationship information storage control unit 50, a game information management unit 351 (character storage control unit), the game advancement unit 352, the prior registration unit 355, the second relationship information storage control unit 57, the evaluation value acquiring unit 58, the game information change unit 59, and a first prediction point setting unit 360, etc. Here, the hardware configuration of the terminal device 300 is the same as the hardware configuration of the terminal device 3 shown in FIG. 3.

The receiving unit 301 has the function of receiving information on the real event sent from the transmission unit 201 of the server device 200. The game information management unit 351 manages various kinds of game information of a user who operates the terminal device 300. The game advancement unit 352 has a function of advancing the game according to the operation by the terminal device 300. The prior registration unit 355 has a function of setting a roster when an operation of selecting as roster players a prescribed number of player characters from the player characters owned by a user by a prediction time limit. The first prediction point setting unit 360 has a function of setting the prediction point to roster players when an operation of setting the prediction point to the roster players is performed by the prediction time limit. These units 351, 352, 355 and 360 basically have the same functions as the game information management unit 51, the game advancement unit 52, the prior registration unit 55, and the first prediction point setting unit 60 shown in FIG. 4. Namely, respective units 351, 352, 355, and 360 of the terminal device 300 execute processes according to the operations performed with the terminal device 300, whereas the respective unit 51, 52, 55 and 60 of the game server 1 execute operations while performing communications between the game server and the terminal device 300. Other than this difference, the respective functions and the configurations of these units are the same.

Moreover, the terminal device 300 also comprises the prior registration unit 355, the second relationship information storage control unit 57, the evaluation value acquiring unit 58, and the game information change unit 59, etc., of the game server 1. The game system which comprises this server device 200 and the terminal device 300 exhibits the same effect as the game system comprising the game server 1 and the terminal device 3 shown in FIG. 1. Here, explanations have been given through the case of the configuration shown in FIG. 4 as one example. However, the same can be said for other configurations of the game server 1.

Moreover, the computer-readable programs according to this embodiment are recorded in various computer-readable recording mediums such as a hard disk, optical disc (CD-ROM, DVD-ROM or the like), flexible disk, and semiconductor memory, and the programs are read from the recording medium and executed by the CPU of the game management device or the terminal device. Moreover, the means for providing the program to the game management device or the terminal device is not limited to the foregoing recording medium, and the program can also be provided via a communication network such as the internet.

Summary of Embodiments

1) As described above, the game management device according to one aspect of the present invention is a game management device which manages a game, and which comprises: a first relationship information storage control unit that stores in a storage device, a first relationship information associating an existent object in real world with a character corresponding to the existent object; a character storage control unit that stores in a storage device, an information on characters owned by a user; a prior registration unit that sets a registered character, according to an information on an operation of selecting a prescribed number of characters from the characters owned by the user when the operation is performed by a prescribed time limit; an automatically setting unit that automatically sets an automatic setting point to the registered character that produces a prescribed game result when the game, in which the registered character is applied, is performed by the prescribed time limit, on a basis of a result of executing the game; a real event accepting unit that accepts an information on a real event produced by the existent object after the prescribed time limit; and a game information change unit that changes a user's game information on a basis of the automatic setting point set to the registered character when it is determined that the existent object corresponding to the registered character produced a prescribed real event based on the information on the real event accepted by the real event accepting unit.

The game management device of the foregoing configuration can be configured by an information processing device such as a server that can be communicated with a terminal device of each user, etc., and is capable of managing various types of games, such as online games or social games.

According to this game management device, by storing in the memory device beforehand, the first relationship information associating the existent object in the real world with the character corresponding to the existent object, the existent object and the character in the game are linked. Here, "the existent object in the real world" indicates "a person or an animal in the real world". Examples of the existent object includes existent players in a variety of sports games based on baseball, soccer, American football, basketball and the like, a television personality, a celebrity who answers quizzes in a program broadcast by television, radio, internet, cable, satellite, etc., and a racehorse entered into a horse race and the like. Then, the information on the characters owned by the user is stored in a storage device by the character storage control unit. Here, since the storage device itself is not included in the configuration, the storage device may be provided irrespective of the inside or the outside of the game management device.

This game management device comprises the prior registration unit, which permits a user to predict an existent object that is expected to be active from existent objects corresponding to characters owned by the user, and set the character corresponding to the expected existent object beforehand. Namely, the prior registration unit sets a registered character, according to the information on an operation of selecting a prescribed number of characters from the characters owned by the user when the operation is performed by the prescribed time limit. For instance, when the foregoing configuration is explained through an example of a baseball game, a user predicts an existent player expected to be active in the match of MLB within a prescribed number of characters (for instance, 16 player characters (9 fielders and 7 pitchers) in total). However, target existent players for the user's prediction on their activities are limited to existent players corresponding to the player characters owned by the user. Then, the user performs an operation of selecting the player character(s) in possession corresponding to the predicted existent player(s) as a registered character(s) within the prescribed time limit (for instance, before a MLB match start time).

Then, when a user performed a game in which the registered character is applied by the prediction time limit, an automatically setting unit sets automatically an automatic setting point to the registered character that produced a prescribed game result on the basis of a result of executing the game. For instance, considered is the case of performing a game in which a user's baseball team consisting of registered characters plays a baseball match against an opponent (other user's baseball team or a CPU). In this example, the result of executing the game can be a result of simulation of a baseball game using registered characters, for instance. In this game, examples of "prescribed game result" include hitting a single, two-base, three-base or a home run as a batter, performing a successful stealing as a base runner, or striking out as a pitcher. With this configuration, an automatic setting point is set automatically to the registered character according to the prescribed game result.

Namely, a user predicts an existent object which will play an active role in real world from the existent objects corresponding to the owned characters, and the character corresponding to the existent object which the user predicted is set to a registered character beforehand by the prediction time limit. Furthermore, when the user performs a game to which the registered character is applied by the prescribed time limit, the automatic setting point is set automatically to the registered character according to the game result.

The game management device of the present embodiment is further configured that when the existent object, corresponding to the registered character set by the user by the prescribed time limit, produced the prescribed real event (namely, when the existent object played a prescribed active role or the like), the user's game information is changed based on the automatic setting point set to the registered character. This configuration is explained below.

Namely, the real event accepting unit accepts after the above prescribed time limit, the information on the real event (for instance, making a hit by the existent player, etc.) that is an event in real world produced by the existent object. Namely, the real event accepting unit has the function of taking the information on real events into the game management device. Here, the information on real event may be directly input manually to the game management device by a person who observed the real event or may be provided via a network, etc., or may be the information provided from the server of a company that sells information on real events or a company related to such company. In the case of a baseball game, for instance, there exist many information providing servers which provide information such as hitting made by a player every after a pitch, an inning or a match. Therefore, it is possible to take the information on real events into the game management device using the information provided by the above server. Moreover, the information on real event may be the information automatically acquired by analyzing an image and voice, etc. of a real event.

Then, the game information change unit of this game management device changes the user's game information, for instance, to offer a reward on the basis of the information on the real event accepted by the real event accepting unit. Namely, when it is determined that the existent object corresponding to the registered character produced a prescribed real event, the game information change unit changes user's game information to offer a reward, for instance, to be advantageous in the game.

As an example, in the case where the existent player corresponding to the registered character, set by the user on the basis of the user's activity prediction, produced a prescribed real event such as hitting (any of a single hit, a two-base, a three-base and a home run), (i.e., played an active role satisfying the condition of offering a reward), the user's game information is changed to improve the ability of the player character corresponding to the existent player only for a prescribed time period (for instance, 24 hours). Here, the prescribed time period is not limited to the time period of prescribed length, but may be set to, for instance within the day the real event occurred (for instance until 24 o'clock etc., of that day), or a period until the next real event (game) is produced, etc. Furthermore, the reward to be advantageous in the game can be generating various merits on the game according to the kind or the content of the game without being limited to the above merit of improving the character's ability. Furthermore, for the game in which an object can be acquired via drawing, considered may be an advantage of increasing the probability of drawing a rare item (an item in which the drawing probability is lower than a standard item and which has a higher rarity value than the standard item).

As other example of changing the user's game information to offer a reward, it may be configured to change the user's game information to offer the user an item having a high rarity value that is hard to obtain (a rare item for collection or the like) though it will not directly affect the advancement of the game.

Furthermore, in an example in which a racehorse entered into a horse race is an existent object, when the existent racehorse (existent object), corresponding to a registered character set by the user on the basis of the user's activity prediction, played an active role to produce a prescribed real event such as being finished with the third arrival order or better, the user's game information is changed to improve the ability of the registered character corresponding to the racehorse only for a prescribed period of time (for instance, 24 hours).

Here, a reward to be offered to a user is set such that the larger the point automatically set to the registered character corresponding to the existent object produced a prescribed real event (i.e., played an active role) is, the larger the reward to be offered to the user is. Namely, when the automatic setting point is set by the automatically setting unit to the registered character corresponding to the existent object which produced a prescribed real event, a larger reward (advantage) to be offered to the user is set as compared to the case where the automatic setting point is not set. For instance, in the case where the ability of the registered character is improved as a reward, the reward is set such that the larger the automatic setting point set to the registered character is, the higher the improved ratio of the ability is. Similarly, in the case where a point or an item is offered to the user as a reward, the reward is set such that the larger the automatic setting point set to the registered character is, the larger the point to be offered to the user is, or the higher the rarity level of the item to be offered to the user is.

On the other hand, the existent object corresponding to the registered character set by the user on the basis of the user's activity prediction may make an error or the like without playing an active role. In this case, the game information change unit may be configured so as to change the user's game information to offer a disadvantage instead of a reward when the existent object corresponding to the registered character produced a prescribed real event. As one example, when the existent player corresponding to the registered character expected to play an active role produced a prescribed real event of striking out, making a fielding error, or the like (playing an action satisfying the condition of offering a disadvantage, etc.), the user's game information is changed to offer a disadvantage based on the automatic setting point set to the registered character. For instance, the larger the automatic setting point set to the registered character is, the more reduced a game point or an item owned by the user is.

In the case where the game in which the registered character is applied is performed by the prescribed time limit, the registered character generates a negative result (for instance, a fielding error, an easy fly, failing to take an advantage of a chance, many runs charged to a pitcher, etc.), the automatically setting unit may be configured to automatically set an automatic setting point to the registered character indicating that the active role of the registered character cannot be expected much. Namely, the automatic setting point can be applied to both positive prediction and negative prediction. For the automatic setting point on the basis of the negative prediction, it may be configured such that when the prediction is correct, the reward is set to be larger (or the disadvantage is set to be smaller), or the disadvantage is set to be larger (or the reward is set to be smaller).

Therefore, for the configuration wherein the game information change unit changes the user's game information on the basis of the automatic setting point, the following can be adopted:

a) as described in the above, the game information change unit changes the user's game information such that the larger the automatic setting point set to a registered character is, the larger the reward is, or the smaller the disadvantage is;

b) the game information change unit changes the user's game information such that the larger the automatic setting point set to a registered character is, the smaller the reward is, or the larger the disadvantage is; and c) the game information change unit changes the user's game information such that the smaller the automatic setting point set to a registered character is, the larger the reward is, or the smaller the disadvantage is As described, according to the foregoing configuration, it is possible for a user to make a prediction on an existent object's activity instead of merely using in the game the information on a fact occurred in the real world one-sidedly, and further to reflect the result of prediction into the game. As a result, an approach can be made from the game into the real world, and an improvement in properties of the game can be realized by merging the real world into the game. Namely, conventionally, for instance, a batting average, or the like of the existent player is merely reflected one-sidedly from the real world into the game. In contrast, this configuration first enables an approach from a user to the real world by way of the user's prediction on an existent player, etc., who will or will not play an active role. Then, according to the activity, etc., of the existent player, etc., to whom a user made a prediction, a reward (or disadvantage) is given to advance the game advantageously or disadvantageously, etc., thereby creating an interactive flow between the real world and the game.

2) In the foregoing configuration, it is preferable that the game information change unit changes the user's game information when it is determined that the existent object corresponding to the registered character produced the prescribed real event such that the larger the automatic setting point set to the registered character is, the larger a reward to be offered to the user is.

According to the foregoing configuration, when the existent object corresponding to the registered character, to which the automatic setting point is set, produced a prescribed real event in real world (played an active role satisfying the condition of obtaining a reward), a reward can be obtained such that the larger the automatic setting point is, the larger the reward is. Therefore, each user is given a motivation to actively play a game in which a registered character is applied, thereby activating the game.

3) In the foregoing configuration, it is preferable to further comprises a second relationship information storage control unit that stores, in a storage device, a second relationship information associating the real event with an evaluation value for evaluating the existent object produced the real event; and an evaluation value acquiring unit that acquires the evaluation value of the existent object corresponding to the registered character on a basis of the second relationship information, wherein the game information change unit determines if the existent object corresponding to the registered character produced the prescribed real event, on a basis of the evaluation value acquired by the evaluation value acquiring unit.

According to the foregoing configuration, it is detected if the existent object corresponding to the registered character produced the prescribed real event (played an active role satisfying the condition of obtaining a reward) on the basis of the evaluation value. Namely, this game management device performs an evaluation on an activity, etc., after being selected of the existent object corresponding to the registered character selected by the user by the time limit. Here, the second relationship information is the information indicative of the association between a real event and an evaluation value for evaluating the existent player who produced the real event. For instance, in the case of a baseball game, an evaluation value of "1 point" is stored in association with the real event of "single hit", an evaluation value of "4 point" is stored in association with the real event of "home run" as the second relationship information. In the case of horse racing, an evaluation value of "3 point" is stored in association with the real event of "the first place", and an evaluation value of "2 point" is stored in association with the real event of "the second place", and an evaluation value of "1 point" is stored in association with the real event of "the third place" as the second relationship information. Then, the evaluation value acquiring unit acquires the evaluation value of the existent object corresponding to the registered character on a basis of the second relationship information. For instance, when a certain existent player hits 4 singles in the match of MLB, the evaluation value of the existent player, indicative of the activity in the game will be "4 point".

Then, the game information change unit of this game management device changes the user's game information to offer a reward on the basis of the evaluation value acquired by the evaluation value acquiring unit. As an example, an evaluation value of the existent player to which the user made an activity prediction is more than 3 point; the user's game information is changed to improve the ability of the character corresponding to the existent player according to the automatic setting point set to the registered character.

4) In the foregoing configuration, it is preferable to further comprise an automatic setting point information storage control unit that stores an automatic setting point information in a storage device beforehand, the automatic setting point information indicating a correspondence between the prescribed game result and the automatic setting point to the registered character which produced the prescribed game result, wherein the automatically setting unit automatically sets the automatic setting point to the registered character which produced the prescribed game result on the basis of the automatic setting point information.

Here, examples of the automatic setting point information are shown. For instance, in the case of a baseball game, an automatic setting point of "1 point" is associated with the game result of "single hit", an automatic setting point of "2 point" is associated with the game result of "two-base hit", an automatic setting point of "3 point" is associated with the game result of "three-base hit", and an automatic setting point of "4 point" is associated with the game result of "home run". In the case of this example, in the game in which the registered character is applied, for the registered character which made a "single hit", the automatic setting point of "1 point" is set to automatically. For the registered character which made "home run", the automatic setting point of "4 point" is set to automatically.

5) In the foregoing configuration, it is preferable that the game management device further comprise an arbitrary setting point storage control unit that stores in a storage device, an arbitrary setting point which is acquired by the user in the game, and which can be set to the registered character arbitrarily; and an arbitrary setting unit that sets the arbitrary setting point to the registered character when an operation of setting the arbitrary setting point to the registered character is performed by the prescribed time limit according to the information on the operation, wherein the game information change unit changes the user's game information when it is determined that the existent object corresponding to the registered character which produced a prescribed real event, on the basis of the automatic setting point and the arbitrary setting point.

According to the foregoing configuration, a user can acquire an arbitrary setting point that can be set to the registered character arbitrarily in the game. This arbitrary setting point acquired by the user is stored in a storage device by the arbitrary setting point storage control unit. This game management device further comprises the arbitrary setting unit wherein the user, who owns the arbitrary setting point separately from the automatic setting point to be set automatically, can set the arbitrary setting point additionally to the registered character arbitrarily. For instance, assumed that the user sets a prescribed number (for instance, 16) of registered characters, with respect to the registered character of the existent player whom the user particularly expects to play an active role among these 16 existent players corresponding to the registered characters, the user is allowed to additionally set the arbitrary setting point according to the degree of expectation.

The automatic setting point and the arbitrary setting point are typically in the form expressible by number (for instance, a visualized object in a shape of a star, a stone or a coin or the like). However, the form of expressing the prediction point is not limited to the above, and may be those counted by the number of sheets (paper, plate or the like), or by weight, volume (placer gold, water or the like).

6) In the foregoing configuration, it is preferable that the game in which the registered character is applied is a game in a match mode in which the user's group constituted by a prescribed number of registered characters makes a match against an opponent user's group; and the result of executing the game is a result of simulation of the match.

According to this configuration, the game in which an automatic setting of the automatic setting point is performed is a game in a match mode. In the case of a baseball game, for instance, a match between a user's baseball team consisting of registered characters and the baseball team of the opponent (other user or a CPU) corresponds to the above game in the match mode. In this case, it may be configured to automatically set the automatic setting point to the registered character based on the result of simulation of the match.

7) In the foregoing configuration, it is preferable that the game in which the registered character is applied is a game in a match mode in which the user's group constituted by a prescribed number of registered characters makes a match against an opponent user's group, and the game management device further comprises: an adjusting unit that adjusts the automatic setting point to be set to the registered character by the automatically setting unit such that the automatic setting point to be set to the registered character when the user performs a match with an opponent in a higher level in the match mode is larger than the automatic setting point to be set to the registered character when the user performs the match with the opponent in a same level or a lower level.

Here, the "opponent in an upper level" indicates an opponent whose parameter related directly or indirectly to the strength in match is larger than that of the user, such as an opponent in a higher game level than the user or an opponent whose group strength is larger than that of the user. Here, if the difference between the opponent's game level and the user's game level is within a prescribed range (for instance, not more than 5), the opponent's game level would be much the same as the user's game level, and the opponent in that game level can be considered as the opponent in the same level.

According to the foregoing configuration, when the user performs a match with an opponent in a higher level in the match mode the automatic setting point to be set to the registered character by the automatically setting unit is larger (for instance, is increased by twice) than the automatic setting point to be set to the registered character by the automatically setting unit when the user performs the match with the opponent in a same level or a lower level. For instance, it may be configured such that when a match is made with the opponent in a lower level, as a result of simulation of the match, a prescribed game result satisfying the condition of automatically setting the automatic setting point is likely to be produced; on the other hand, when a match is made with the opponent in a higher level, as a result of simulation of the match, a prescribed game result satisfying the condition of automatically setting the automatic setting point is difficult to be produced, but when such prescribed game result is produced, a larger automatic setting point is set automatically.

8) It is preferable that the foregoing configuration 7) is further configured that the adjusting unit adjusts the automatic setting point to be set to the registered character such that the stronger the opponent is, the larger the automatic setting point to be set to the registered character is.

According to the foregoing configuration, the automatic setting point to be set to the registered character is adjusted such that the stronger the opponent is, the more increased the automatic setting point is. In this case, the adjusting unit may be configured to change the automatic setting point continuously for each one level difference of the opponent's strength level, or may be configured to change the automatic setting point in stages (for instance, when the opponent's game level is 1 to 10 level higher, 11 to 20 level higher, 21 to 30 level higher, 31 to 40 level higher and not less than 41 level higher, the automatic setting point is increased to 1.2, 1.4, 1.6, 1.8 and 2.0 times respectively).

9) In the foregoing configuration, it is preferable that the game enables a fellow user relationship to be established between users, and the game management device further comprises: a fellow user's information storage control unit that stores, in a storage device, a fellow user's information of each user; and an upper limit management unit that places an upper limit to the automatic setting point that can be set to the registered character, the upper limit being set according to a number of fellow users of each user, such that the larger the number of the fellow users is, the higher the upper limit is.

10) A game system according to another aspect of the present invention is a game system which includes a game management device that manages a game, and a terminal device that communicates with the game management device, wherein either the game management device or the terminal device comprises: a first relationship information storage control unit that stores in a storage device, a first relationship information associating an existent object in real world with a character corresponding to the existent object; a character storage control unit that stores in a storage device, an information on characters owned by a user; a prior registration unit that sets for setting a registered character, according to an information on an operation of selecting a prescribed number of characters from the characters owned by the user when the operation is performed by a prescribed time limit; an automatically setting unit that automatically sets an automatic setting point to the registered character that produces a prescribed game result when the game, in which the registered character is applied, is performed by the prescribed time limit, on a basis of a result of executing the game; a real event accepting unit that accepts an information on a real event produced by the existent object after the prescribed time limit; and a game information change unit that changes a user's game information on a basis of the automatic setting point set to the registered character when it is determined that the existent object corresponding to the registered character produced a prescribed real event based on the information on the real event accepted by the real event accepting unit.

11). A recording medium according to yet another aspect of the present invention is a non-transitory computer-readable recording medium having recorded thereon a program for causing a computer to operate as respective units of the game management device according to any one of the foregoing configurations.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A game management device which manages a game, comprising:
    a first relationship information storage control unit that stores in a storage device, a first relationship information associating an existent object in real world with a character corresponding to the existent object;
    a character storage control unit that stores in a storage device, an information on characters obtained in the game and owned by a user;
    a prior registration unit that sets a registered character, according to an information on an operation of selecting a prescribed number of characters in a user's team in the game from the characters owned by the user when the operation is performed within a prediction time limit;

an automatically setting unit that automatically sets an automatic setting point for a weighting of a prediction to the registered character that produces a prescribed game result when the game, in which the user's team including the registered character is applied, is performed within the prediction time limit, on a basis of a result of executing the game;

a real event accepting unit that accepts an information on a real event produced by the existent object after the prescribed time limit; and a game information change unit that changes a user's game information on a basis of the automatic setting point set to the registered character when it is determined that the existent object corresponding to the registered character produced a prescribed real event based on the information on the real event accepted by the real event accepting unit.

2. The game management device according to claim 1, wherein:

the game information change unit changes the user's game information when it is determined that the existent object corresponding to the registered character produced the prescribed real event such that the larger the automatic setting point set to the registered character is, the larger a reward to be offered to the user is.

3. The game management device according to claim 1, further comprising:

a second relationship information storage control unit that stores, in a storage device, a second relationship information associating the real event with an evaluation value for evaluating the existent object produced the real event; and an evaluation value acquiring unit that acquires the evaluation value of the existent object corresponding to the registered character on a basis of the second relationship information, wherein the game information change unit determines if the existent object corresponding to the registered character produced the prescribed real event, on a basis of the evaluation value acquired by the evaluation value acquiring unit.

4. The game management device according to claim 1, further comprising:

an automatic setting point information storage control unit that stores an automatic setting point information in a storage device beforehand, the automatic setting point information indicating a correspondence between the prescribed game result and the automatic setting point to the registered character which produced the prescribed game result, wherein the automatically setting unit automatically sets the automatic setting point to the registered character which produced the prescribed game result on the basis of the automatic setting point information.

5. A game management device which manages a game, comprising:

a first relationship information storage control unit that stores in a storage device, a first relationship information associating an existent object in real world with a character corresponding to the existent object;

a character storage control unit that stores in a storage device, an information on characters owned by a user;

a prior registration unit that sets a registered character, according to an information on an operation of selecting a prescribed number of characters from the characters owned by the user when the operation is performed by a prescribed time limit;

an automatically setting unit that automatically sets an automatic setting point to the registered character that produces a prescribed game result when the game, in which the registered character is applied, is performed by the prescribed time limit, on a basis of a result of executing the game;

a real event accepting unit that accepts an information on a real event produced by the existent object after the prescribed time limit;

a game information change unit that changes a user's game information on a basis of the automatic setting point set to the registered character when it is determined that the existent object corresponding to the registered character produced a prescribed real event based on the information on the real event accepted by the real event accepting unit;

an arbitrary setting point storage control unit that stores in a storage device, an arbitrary setting point which is acquired by the user in the game, and which can be set to the registered character arbitrarily; and an arbitrary setting unit that sets the arbitrary setting point to the registered character when an operation of setting the arbitrary setting point to the registered character is performed by the prescribed time limit according to the information on the operation, wherein the game information change unit changes the user's game information when it is determined that the existent object corresponding to the registered character which produced a prescribed real event, on the basis of the automatic setting point and the arbitrary setting point.

6. The game management device according to claim 1, wherein the game in which the registered character is applied is a game in a match mode in which the user's group constituted by a prescribed number of registered characters makes a match against an opponent user's group; and the result of executing the game is a result of simulation of the match.

7. A game management device which manages a game, comprising:

a first relationship information storage control unit that stores in a storage device, a first relationship information associating an existent object in real world with a character corresponding to the existent object;

a character storage control unit that stores in a storage device, an information on characters owned by a user;

a prior registration unit that sets a registered character, according to an information on an operation of selecting a prescribed number of characters from the characters owned by the user when the operation is performed by a prescribed time limit;

an automatically setting unit that automatically sets an automatic setting point to the registered character that produces a prescribed game result when the game, in which the registered character is applied, is performed by the prescribed time limit, on a basis of a result of executing the game;

a real event accepting unit that accepts an information on a real event produced by the existent object after the prescribed time limit; and a game information change unit that changes a user's game information on a basis of the automatic setting point set to the registered character when it is determined that the existent object corresponding to the registered character produced a prescribed real event based on the information on the real event accepted by the real event accepting unit;

wherein the game in which the registered character is applied is a game in a match mode in which the user's group constituted by a prescribed number of registered characters makes a match against an opponent user's group, and the game management device further comprises:

an adjusting unit that adjusts the automatic setting point to be set to the registered character by the automatically setting unit such that the automatic setting point to be set to the registered character when the user performs a match with an opponent in a higher level than the user is in the match mode is larger than the automatic setting point to be set to the registered character when the user performs the match with the opponent in a same level as or a lower level than the user is.

8. The game management device according to claim 7, wherein the adjusting unit adjusts the automatic setting point to be set to the registered character such that the stronger the opponent is, the larger the automatic setting point to be set to the registered character is.

9. A game management device which manages a game, comprising:

a first relationship information storage control unit that stores in a storage device, a first relationship information associating an existent object in real world with a character corresponding to the existent object;

a character storage control unit that stores in a storage device, an information on characters owned by a user;

a prior registration unit that sets a registered character, according to an information on an operation of selecting a prescribed number of characters from the characters owned by the user when the operation is performed by a prescribed time limit;

an automatically setting unit that automatically sets an automatic setting point to the registered character that produces a prescribed game result when the game, in which the registered character is applied, is performed by the prescribed time limit, on a basis of a result of executing the game;

a real event accepting unit that accepts an information on a real event produced by the existent object after the prescribed time limit; and a game information change unit that changes a user's game information on a basis of the automatic setting point set to the registered character when it is determined that the existent object corresponding to the registered character produced a prescribed real event based on the information on the real event accepted by the real event accepting unit;

wherein the game enables a fellow user relationship to be established between users, and the game management device further comprises:

a fellow user's information storage control unit that stores, in a storage device, a fellow user's information of each user; and an upper limit management unit that places an upper limit to the automatic setting point that can be set to the registered character, the upper limit being set according to a number of fellow users of each user, such that the larger the number of the fellow users is, the higher the upper limit is.

10. A game system comprising a game management device that manages a game, and a terminal device that communicates with the game management device, wherein either the game management device or the terminal device comprises:

a first relationship information storage control unit that stores in a storage device, a first relationship information associating an existent object in real world with a character corresponding to the existent object;

a character storage control unit that stores in a storage device, an information on characters obtained in the game and owned by a user;

a prior registration unit that sets for setting a registered character, according to an information on an operation of selecting a prescribed number of characters in a user's team in the game from the characters owned by the user when the operation is performed within a prediction time limit;

an automatically setting unit that automatically sets an automatic setting point for a weighting of a prediction to the registered character that produces a prescribed game result when the game, in which the user's team including the registered character is applied, is performed within the prediction time limit, on a basis of a result of executing the game;

a real event accepting unit that accepts an information on a real event produced by the existent object after the prescribed time limit; and a game information change unit that changes a user's game information on a basis of the automatic setting point set to the registered character when it is determined that the existent object corresponding to the registered character produced a prescribed real event based on the information on the real event accepted by the real event accepting unit.

11. A non-transitory computer-readable recording medium having recorded thereon a program for causing a computer to operate as the game management device according to claim 1, which causes the computer to function as respective units of the game management device.

* * * * *